US012611602B2

(12) United States Patent
Dohta et al.

(10) Patent No.: US 12,611,602 B2
(45) Date of Patent: Apr. 28, 2026

(54) STORAGE MEDIUM, INFORMATION PROCESSING SYSTEM, INFORMATION PROCESSING DEVICE, AND GAME PROCESSING METHOD

(71) Applicant: NINTENDO CO., LTD., Kyoto (JP)

(72) Inventors: Takuhiro Dohta, Kyoto (JP); Atsushi Asakura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 444 days.

(21) Appl. No.: 18/332,277

(22) Filed: Jun. 9, 2023

(65) Prior Publication Data

US 2024/0131427 A1 Apr. 25, 2024
US 2024/0226742 A9 Jul. 11, 2024

(30) Foreign Application Priority Data

Oct. 19, 2022 (JP) ................................. 2022-167796
Oct. 19, 2022 (JP) ................................. 2022-167797
Oct. 19, 2022 (JP) ................................. 2022-167798

(51) Int. Cl.
*A63F 13/5378* (2014.01)
*A63F 13/52* (2014.01)
(Continued)

(52) U.S. Cl.
CPC .......... *A63F 13/5378* (2014.09); *A63F 13/52* (2014.09); *A63F 13/55* (2014.09);
(Continued)

(58) Field of Classification Search
CPC ...... A63F 13/5378; A63F 13/52; A63F 13/55; A63F 13/5372; A63F 13/69; A63F 2300/6653; G06T 11/001; G06T 11/10
(Continued)

(56) References Cited

U.S. PATENT DOCUMENTS 5,757,290 A 5/1998 Watanabe et al.
6,320,580 B1 * 11/2001 Yasui ...................... G06T 15/40
345/421
(Continued)

FOREIGN PATENT DOCUMENTS

EP 1 049 048 11/2000
JP H08-285619 11/1996
(Continued)

OTHER PUBLICATIONS

Anonymous: "Fog of War / Advance Wars By Web Wiki / Fandom", Jul. 4, 2022, XP093127237, Retrieved from Internet: URL: https://web.archive.org/web/2022070411206/https://awbw.fandom.con/wiki/Fog_of_War (retrieved on Feb. 5, 2024) pp. 1-4.
(Continued)

*Primary Examiner* — Allen Chan
(74) *Attorney, Agent, or Firm* — Nixon & Vanderhye PC

(57) ABSTRACT
An example of an information processing system sets a target range in a virtual space when a predetermined event occurs based on a game process. In a rendering process of rendering the virtual space, the information processing system renders a portion of at least some terrain objects in the virtual space included in the target range while reflecting a light source set in the virtual space, and render a portion thereof not included in the target range in a predetermined color or with reduced brightness.

52 Claims, 28 Drawing Sheets

(51) Int. Cl.
| | |
|---|---|
| *A63F 13/55* | (2014.01) |
| *A63F 13/69* | (2014.01) |
| *G06T 11/10* | (2026.01) |
| *A63F 13/5372* | (2014.01) |

(52) U.S. Cl.
CPC .............. *A63F 13/69* (2014.09); *G06T 11/10* (2026.01); *A63F 13/5372* (2014.09); *A63F 2300/6653* (2013.01)

(58) Field of Classification Search
USPC ......................................................... 463/31
See application file for complete search history.

(56) References Cited

U.S. PATENT DOCUMENTS

| | | | |
|---|---|---|---|
| 6,368,210 B1 | 4/2002 | Toyohara et al. | |
| 6,657,624 B2 * | 12/2003 | Olano ..................... | G06T 15/80 |
| | | | 345/426 |
| 7,327,364 B2 * | 2/2008 | Ohba ..................... | G06T 15/60 |
| | | | 345/426 |
| 10,410,378 B2 * | 9/2019 | Lyren ................. | G09B 19/0038 |
| 11,776,203 B1 | 10/2023 | Krol et al. | |
| 2008/0146328 A1 | 6/2008 | Ishii et al. | |
| 2011/0250966 A1 | 10/2011 | Ohara et al. | |
| 2015/0290539 A1 | 10/2015 | Lemer | |
| 2016/0125643 A1 | 5/2016 | Tokuyoshi | |
| 2018/0093183 A1 | 4/2018 | Leblanc et al. | |
| 2020/0376382 A1 | 12/2020 | Hiromatsu et al. | |
| 2021/0067677 A1 | 3/2021 | Ikumori | |
| 2021/0225067 A1 | 7/2021 | Guo | |
| 2021/0370175 A1 | 12/2021 | Sato et al. | |
| 2024/0040086 A1 | 2/2024 | Krol et al. | |

FOREIGN PATENT DOCUMENTS

| | | |
|---|---|---|
| JP | 11-191161 | 7/1999 |
| JP | 2005-310071 | 11/2005 |
| JP | 2008-148860 | 7/2008 |
| JP | 2011-118542 | 6/2011 |
| JP | 2016-091238 | 5/2016 |
| JP | 2020-032265 | 3/2020 |
| JP | 2020-192168 | 12/2020 |
| JP | 2021-186370 | 12/2021 |

OTHER PUBLICATIONS

Anonymous: "Fog of War—Wikipedia", Oct. 4, 2022, XP093127468, Retrieecd from Internet: URL: https://en.wikipedia.org/w/index.php?title=Fog_of_war&oldid=1114047534 (retrieved on Feb. 5, 2024 *section "Simulations and game"* pp. 1-4.
Valencia-Rosado Luis Oswaldo et al: "Methods for Procedural Terrain Generation: A Review", May 18, 2019, Advances in Databases and Information Systems; [Lecture Notes in Computer Science; Lect.Notes Computer], Springer International Publishing, Cham, pp. 58-67, XP047510967, ISBN: 978-3-319-10403-4 (retrieved on May 18, 2019) *abstract* *paragraph "Tiling" on p. 3*.
The Legend of Zelda Breath of the Wild: Nintendo Official Guidebook, Shogakukan Inc., May 11, 2017, p. 211, with English Translation.
"The Legend of Zelda: Breath of the Wild", Explore Hyrule, [online], Nintendo of America Inc., [searched on Sep. 5, 2022], internet https://www.zelda.com/breath-of-the-wild/features/.

Mori et al., U.S. Appl. No. 18/332,343, filed Jun. 9, 2023.
Dohta et al., U.S. Appl. No. 18/332,218, filed Jun. 9, 2023.
Feb. 20, 2024 Office Action issued in Japanese Patent Application No. 2022-167797, pp. 1-3 [machine translation included].
Feb. 19, 2024 Office Action issued in Japanese Patent Application No. 2022-167798, pp. 1-3 [machine translation included].
A new numbering work for the first time in 16 years "Age of Empires IV" released. The deep gameplay is reminiscent of previous series works and irresistible, 4Gamer, net [online], Oct. 29, 2021, https://www.4gamer.net/game/391/G039193/20211026099/ [Searched on Feb. 14, 2024]: pp. 1-17.
Wonder Life Special [Nintendo Official Guidebook] The Legend of Zelda Breath of the Wild, 1st edition, Shogakukan Inc., Masaki Nawata, May 16, 2017, pp. 1-6.
Feb. 26, 2024 Office Action issued in Japanese Patent Application No. 2022-167796, pp. 1-4 [machine translation included].
Full Understanding "3DMARK11" (First part)—The secret of a rendering engine, 4Gamer.net [online], Apr. 4, 2011, https//www.4gamer.net/games/110/G011050/20110401056/, [Searched on Feb. 20, 2024] pp. 1-22.
May 8, 2024 Office Action issued in Japanese Patent Application No. 2022-167796, pp. 1-3 [machine translation included].
Minecraft: Method for producing "torch" and blocking spawning. You can feel relieved even on dangerous nights!, Appliv Topics [online], Sep. 1, 2017, Internet URL: https://mag.app-liv.jp/archive/120 [Searched on May 1, 2024] pp. 1-11.
Mini-Map, Wikipedia.org, Online, Mar. 11, 2022, Accessed via the Internet, Accessed Nov. 14, 2025, <URL:https://en.wikipedia.org/w/index.php?title=Mini-map&oldid=1076476058> (Year: 2022).
Redstone Lamp, Minecraft.fandom.com, Online, Aug. 6, 2022, Accessed via the Internet, Accessed Nov. 14, 2025 <URL: https://minecraft.fandom.com/wiki/Redstone_Lamp?oldid=2160090> (Year: 2022).
Block, Minecraft.fandom.com, Online, Aug. 27, 2022, Accessed via the Internet, Accessed Oct. 31, 2025, <URL: https://minecraft.fandom.com/wiki/Block?oldid=2167077> (Year: 2022).
Light, Minecraft.fandom.com, Online, Oct. 5, 2022, Accessed via the Internet, Accessed Oct. 31, 2025, <URL: https://minecraft.fandon.com/wiki/Light?oldid=2179565> (Year: 2022).
Redstone Lamp, Minecraft.fandom.com, Online, Aug. 6, 2022, Accessed via the Internet, Accessed Oct. 31, 2025, <URL: https://minecraft.fandom.com/wiki/Redstone?Lamp?oldid=2160090> (Year: 2022).
Minecraft, Are light sources additive? Gaming.stackexchange.com, Online, 2015, Accessed via the Internet, Accessed Oct. 31, 2025, <URL: https:/gaming.stackexchange.com/questions/219441/minecraft-are-the-light-sources-additive> (Year: 2015).
Minecraft, Wikipedia.org. Online, Sep. 1, 2022, Accessed via Internet, Accessed Oct. 31, 2025, URL:https://en.wikipedia.org/w/index.php?title=Minecraft&oldid=107959926 (Year: 2022).
Increase the block placing distance in creative mode, feedback. minecrat.net, Onlince, Oct. 2, 2022, Accessed via the Internet, Accessed Oct. 31, 2025, URL:https://feedback.minecraft.net/hc/en-us/community/posts/360066398431-Increase-the-block-placing-distance-in-creative-mode (Year: 2022).
Minimap, Terraria.fandom.com, Online, Feb. 8, 2022, Accessed via Internet, Accessed Oct. 31, 2025, <URL: https://terraria.fandom.com/wiki/Minimapfoldid=1170963> (Year: 2022).
Additive Light Levels for Better In-Game Lighting? Reddit.com, Online, 2018, Accessed via the Internet, Accessed Oct. 31, 2025, <URL: https://www.reddit.com/r/minecraftsuggestions/comments/9pg74h/additive_light_levels_for_better_ingame_lighting/>(Year: 2018).

\* cited by examiner

Fig.8

ORIGINAL MAP IMAGE

MAP MASK

IMAGE REPRESENTING
UNLIBERATED STATE

MAP IMAGE

STORAGE MEDIUM, INFORMATION PROCESSING SYSTEM, INFORMATION PROCESSING DEVICE, AND GAME PROCESSING METHOD

CROSS REFERENCE TO RELATED APPLICATION

This application claims priority to Japanese Patent Applications No. 2022-167796, No. 2022-167797, and No. 2022-167798 filed on Oct. 19, 2022, the entire contents of which are incorporated herein by reference.

FIELD

The present disclosure relates to a storage medium, an information processing system, an information processing device and a game processing method for rendering a virtual space.

BACKGROUND AND SUMMARY

There are conventional game apparatuses that execute a game in which the player searches around an area with low visibility (e.g., an area displayed dark) in a virtual space using an item that serves as a light source. In such a game, in a dark area in the game field (e.g., an area in a cave), the player character can hold an item that serves as a light source, such as a torch, for example, to brighten the vicinity of the player character to ensure visibility.

In the game described above, as a result of the light source being set, it merely brightens the vicinity of the light source, but does not ensure brightness for a desired range in the virtual space.

Thus, the present application discloses a storage medium, an information processing system, an information processing device and a game processing method, with which it is possible to dynamically change, based on the game process, between an area of low visibility and an area of ensured visibility in the virtual space.

(1)

An example of a storage medium described herein stores a game program configured to cause a computer of an information processing device to: a process of set a target range in a virtual space when a predetermined event occurs based on a game process; and in a rendering process of rendering the virtual space, render a portion of at least some terrain objects in the virtual space included in the target range while reflecting a light source set in the virtual space, and rendering a portion thereof not included in the target range in a predetermined color or with reduced brightness.

With configuration (1) above, it is possible to dynamically change, based on the game process, between an area of low visibility (i.e., an area outside the target range) and an area of ensured visibility (i.e., an area within the target range) in the virtual space.

(2)

In configuration (1) above, the game program may cause the computer to, in the rendering process: for the at least some terrain objects, generate mask data that at least represents, for each pixel, whether a position corresponding to the pixel of the terrain objects is included in the target range; render to a frame buffer while reflecting the light source for a pixel indicating, in the mask data, that the position of the at least some terrain objects is included in the target range; and render to the frame buffer in the predetermined color or with reduced brightness for a pixel indicating, in the mask data, that the position of the at least some terrain objects is not included in the target range.

With configuration (2) above, it is possible by using the mask data to perform a rendering process in which areas outside the target range are rendered in an invisible or hardly visible manner.

(3)

In configuration (2) above, the rendering process may be based on deferred rendering. The game program may cause the computer to, in the rendering process: in a first stage, write to a G buffer and a depth buffer for at least some terrain objects in the virtual space; in a second stage, for each pixel, generate the mask data based on a position corresponding to the pixel, a depth value stored in the depth buffer and the target range; and in a third stage, render to the frame buffer based at least on data stored in the G buffer and the mask data.

With configuration (3) above, it is possible using the deferred rendering technique to render objects outside the target range in an invisible or hardly visible manner.

(4)

In configuration (3) above, in the rendering process, the game program may cause the computer further to: in the first stage, for a predetermined object, write to the G buffer and the depth buffer for each pixel, and generate exempt mask data indicating that pixels corresponding to the object are exempted from application of the mask data; and in the third stage, render pixels indicated by the exempt mask data by such a method that it is possible to visually distinguish between a portion of the at least some terrain objects not included in the target range and the predetermined object.

With configuration (4) above, a predetermined object can be rendered visible even if it is outside the target range.

(5)

In any one of configurations (2) to (4) above, the mask data may be data that indicates, for each pixel, a degree to which the predetermined color is rendered or a degree to which the brightness is reduced. The game program may cause the computer to, in the rendering process: write a pixel value to the frame buffer, wherein the pixel value is obtained by combining the predetermined color with a pixel value calculated while reflecting the light source in accordance with the degree or by reducing the brightness from the pixel value calculated while reflecting the light source in accordance with the degree.

With configuration (5) above, it is possible to generate an image of the virtual space whose visibility changes gradually depending on the position, and it is possible to generate an image showing the virtual space so that it appears more natural.

(6)

In any one of configurations (1) to (5) above, at least a light source that is set with a predetermined brightness irrespective of the position in the virtual space may be set as the light source in the virtual space.

With configuration (6) above, it is possible to ensure a certain level of brightness for the target range, and it is possible to ensure visibility of the target range irrespective of the shape of the terrain, etc., in the virtual space.

(7)

In any one of configurations (1) to (6) above, the game program may cause the computer to: in response to occurrence of the predetermined event, set a point to be reference of the target range in the virtual space; and based on a distance from the point to be reference, set the target range so as to include a range where the distance is less than or equal to a threshold value.

With configuration (7) above, in response to the occurrence of a predetermined event, the position according to the event and the vicinity thereof can be set as the target range.

(8)

In configuration (7) above, the game program may cause the computer to: after the point to be reference is set in response to occurrence of the predetermined event, expand the target range by increasing the threshold value over time.

With configuration (8) above, it is possible to generate an image so that an area where visibility is ensured gradually expands in the virtual space in response to the occurrence of a predetermined event.

(9)

In configuration (7) of (8) above, the game program may cause the computer to: further set a point light source in the virtual space in response to occurrence of the predetermined event.

With configuration (9) above, it is easy to make the player recognize that a predetermined event has occurred and that the virtual space has become brighter through the occurrence of the predetermined event.

(10)

In any one of configurations (7) to (9) above, the event may be an event of arranging a predetermined item in the virtual space. The game program may cause the computer to: set a position of the point to be reference based on a position at which the predetermined item is arranged.

With configuration (10) above, the player can arrange an item at a desired position in the virtual space, thereby setting a target range at the position.

(11)

In any one of configurations (7) to (10) above, the game program may further cause the computer to: control a player character in the virtual space based on an operation input. The predetermined event may be an event in which a vicinity of the player character becomes the target range based on an operation input. The game program may cause the computer further to: set a position of the player character as a position of the point to be reference.

With configuration (11) above, it is possible to continuously ensure visibility for the vicinity of the player character.

(12)

In any one of configurations (2) to (6) above, the game program may cause the computer further to: control a player character in the virtual space based on an operation input. The event may occur in response to a predetermined operation input performed when the player character is located at an event occurring position set in the virtual space. The game program may cause the computer further to: in response to occurrence of the event, update two-dimensional range data that represents the target range in the virtual space in a plan view so that at least a range of the virtual space that corresponds to the event occurring position becomes the target range; and generate the mask data based further on the two-dimensional range data.

With configuration (12) above, it is possible to provide a game in which the range where visibility is ensured is expanded in the virtual space by the player character arriving at event occurring positions.

(13)

In configuration (1) of (2) above, the game program may cause the computer to, in the rendering process: determine, for each pixel, whether the at least some terrain objects are included in the target range; render pixels included in the target range to a frame buffer while reflecting the light source; and render pixels not included in the target range to the frame buffer in the predetermined color or with reduced brightness.

With configuration (13) above, it is possible using the forward rendering technique to render objects outside the target range in an invisible or hardly visible manner Note that the present specification discloses an example of an information processing device and an information processing system that execute processes of (1) to (13) above. The present specification also discloses an example of a game processing method for executing processes of (1) to (13) above.

With the storage medium, the information processing system, the information processing device and the game processing method described above, it is possible to dynamically change, in response to occurrence of events, between an area of low visibility and an area of ensured visibility in the virtual space.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view showing an overview of an example game according to the present embodiment;

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, a game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of a game system 1 according to the exemplary embodiment is described, and then, the control of the game system 1 according to the exemplary embodiment is described.

Figure 1:
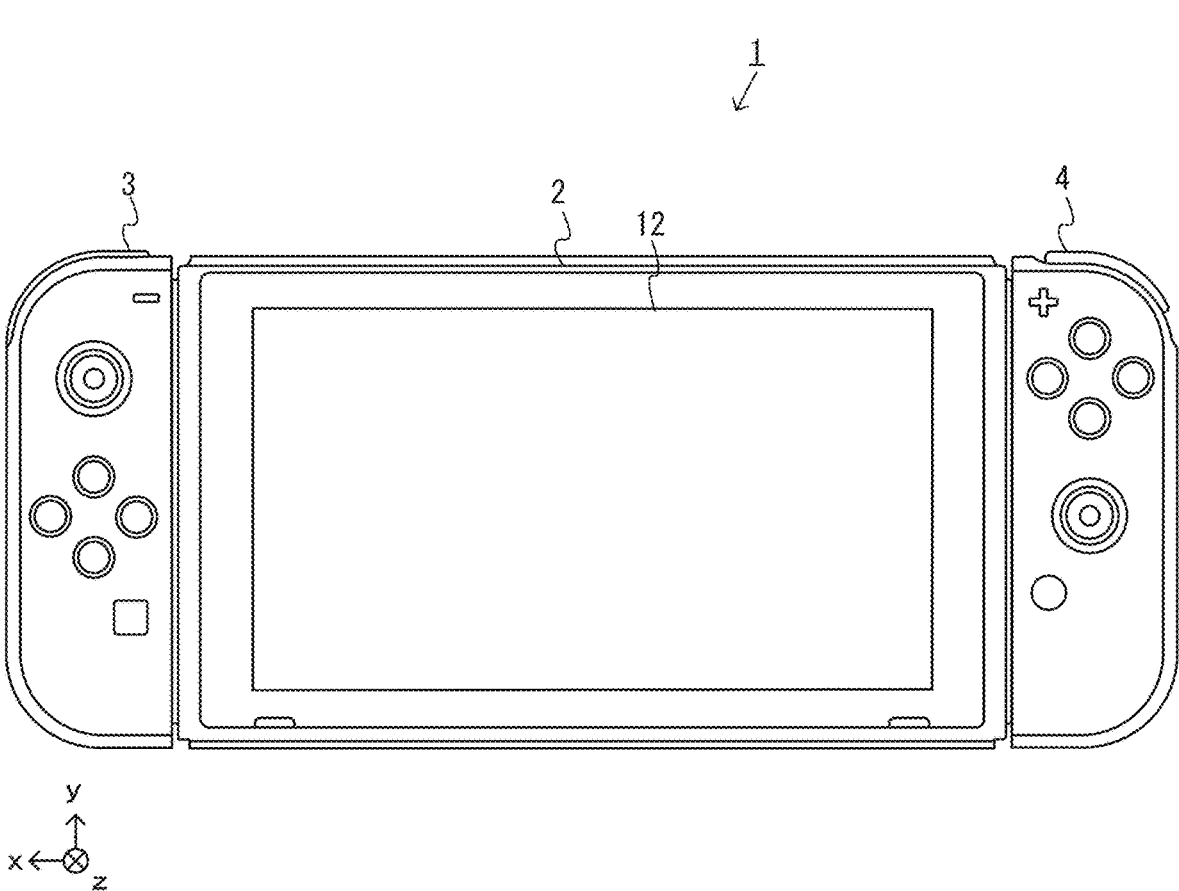
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
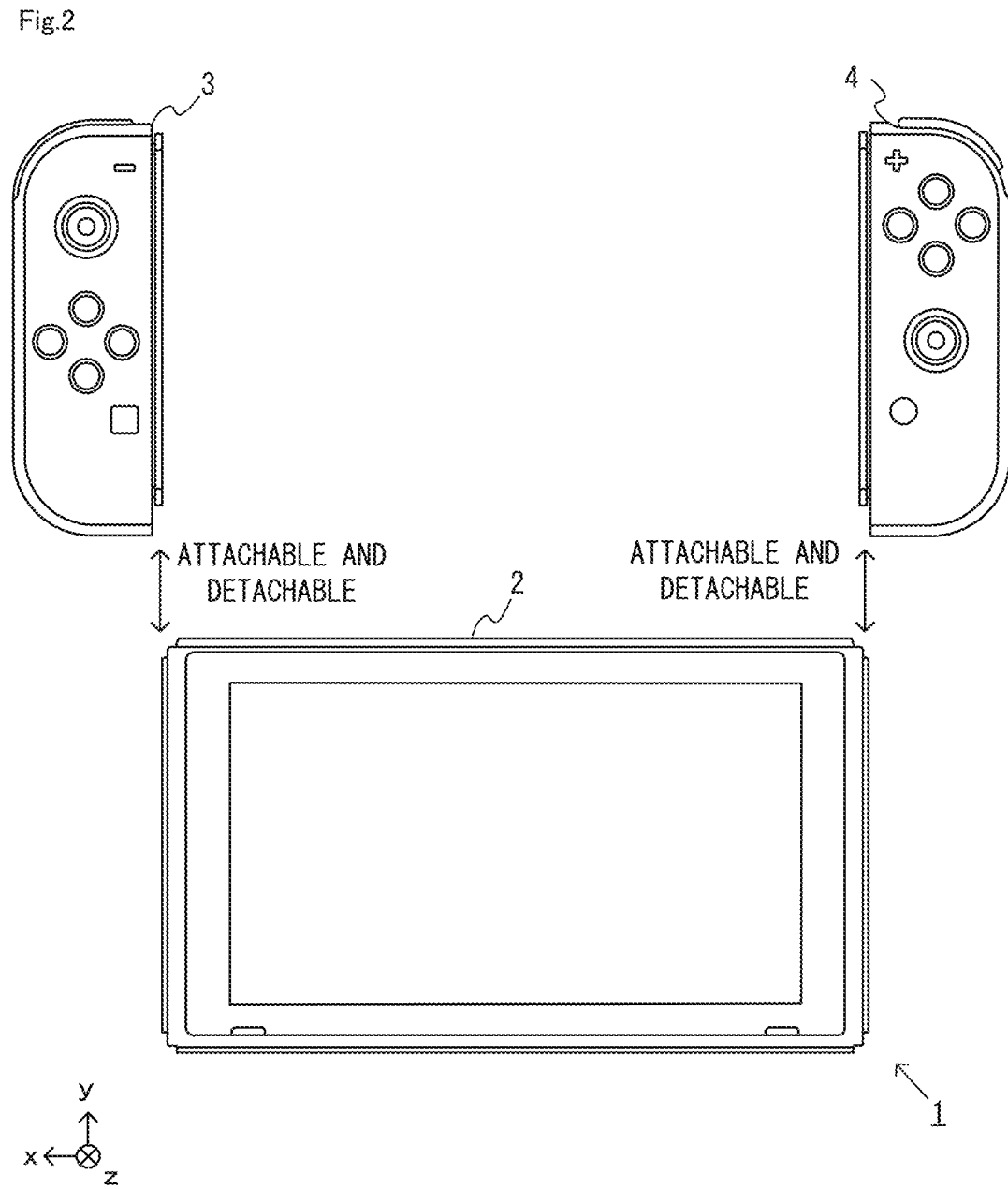
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIG. 1 and FIG. 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
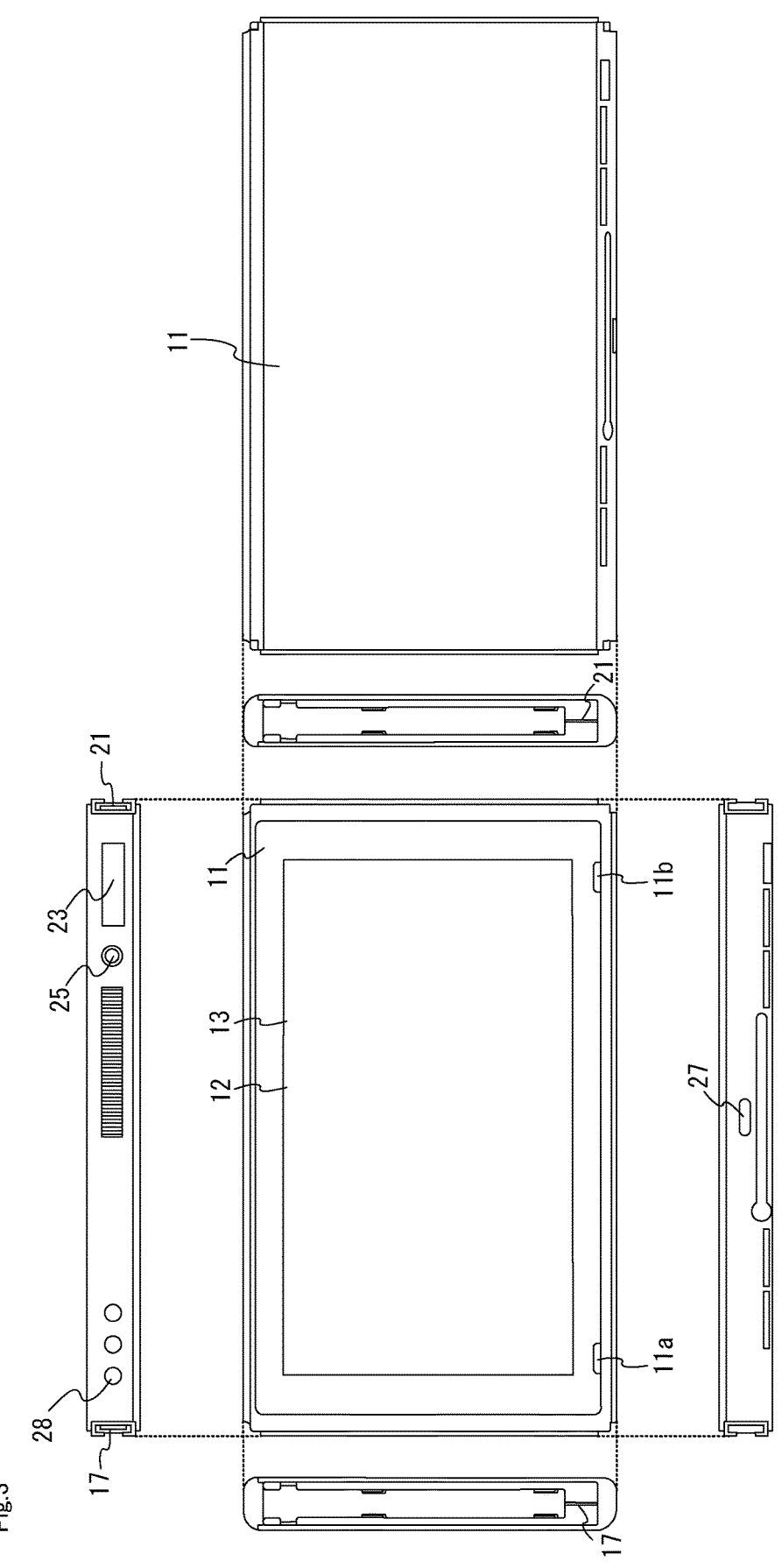
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
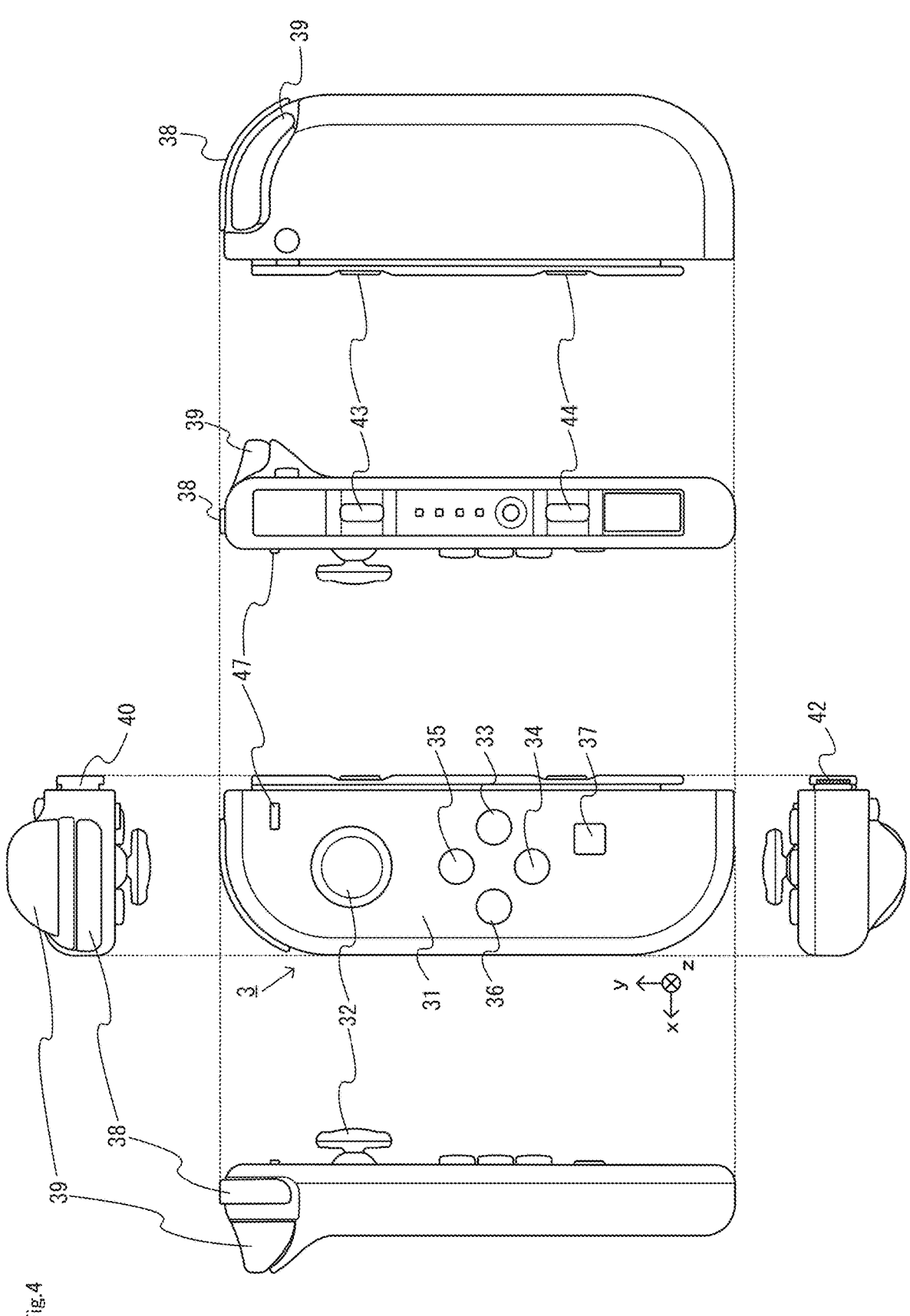
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIG. 1 and FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
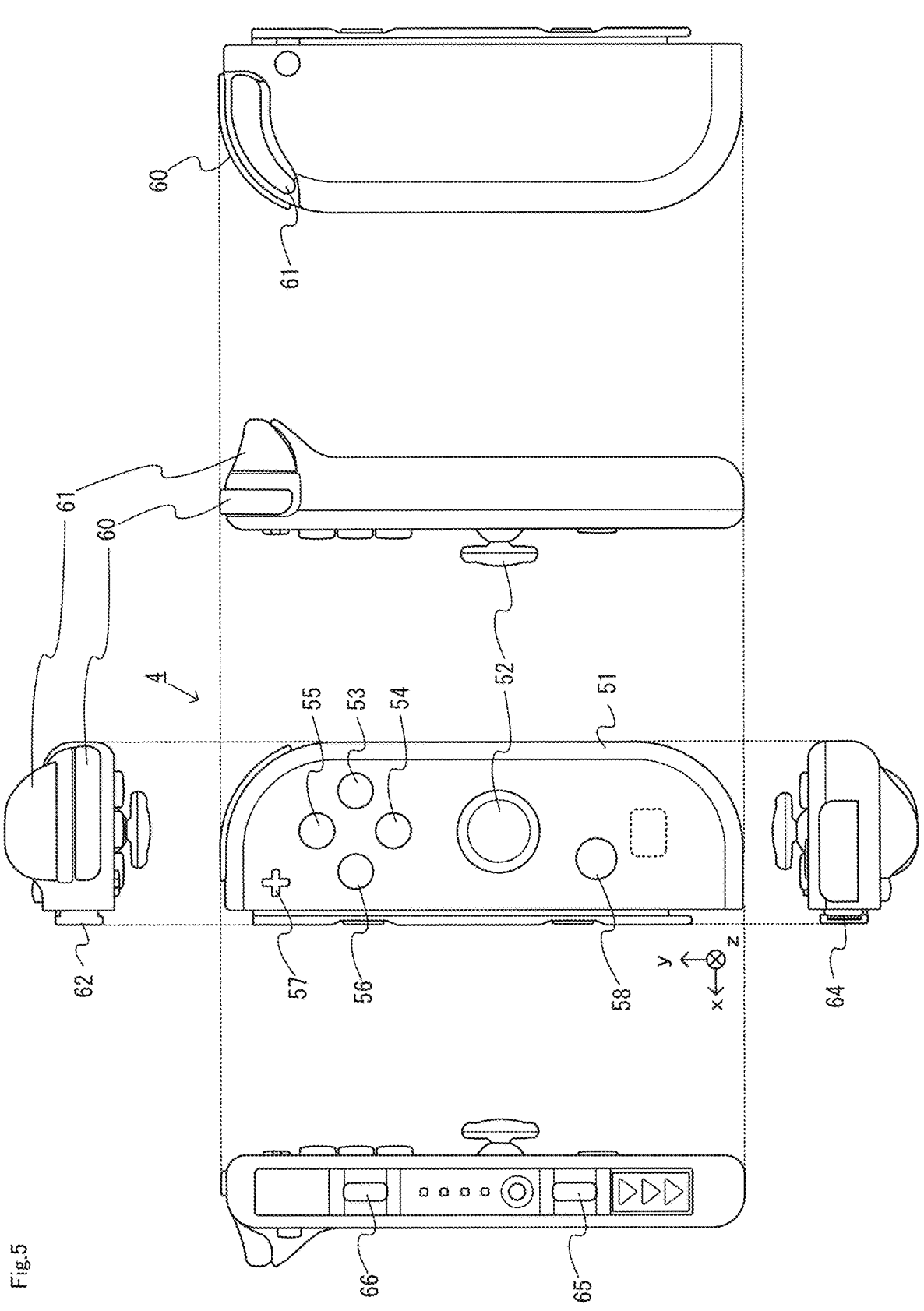
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
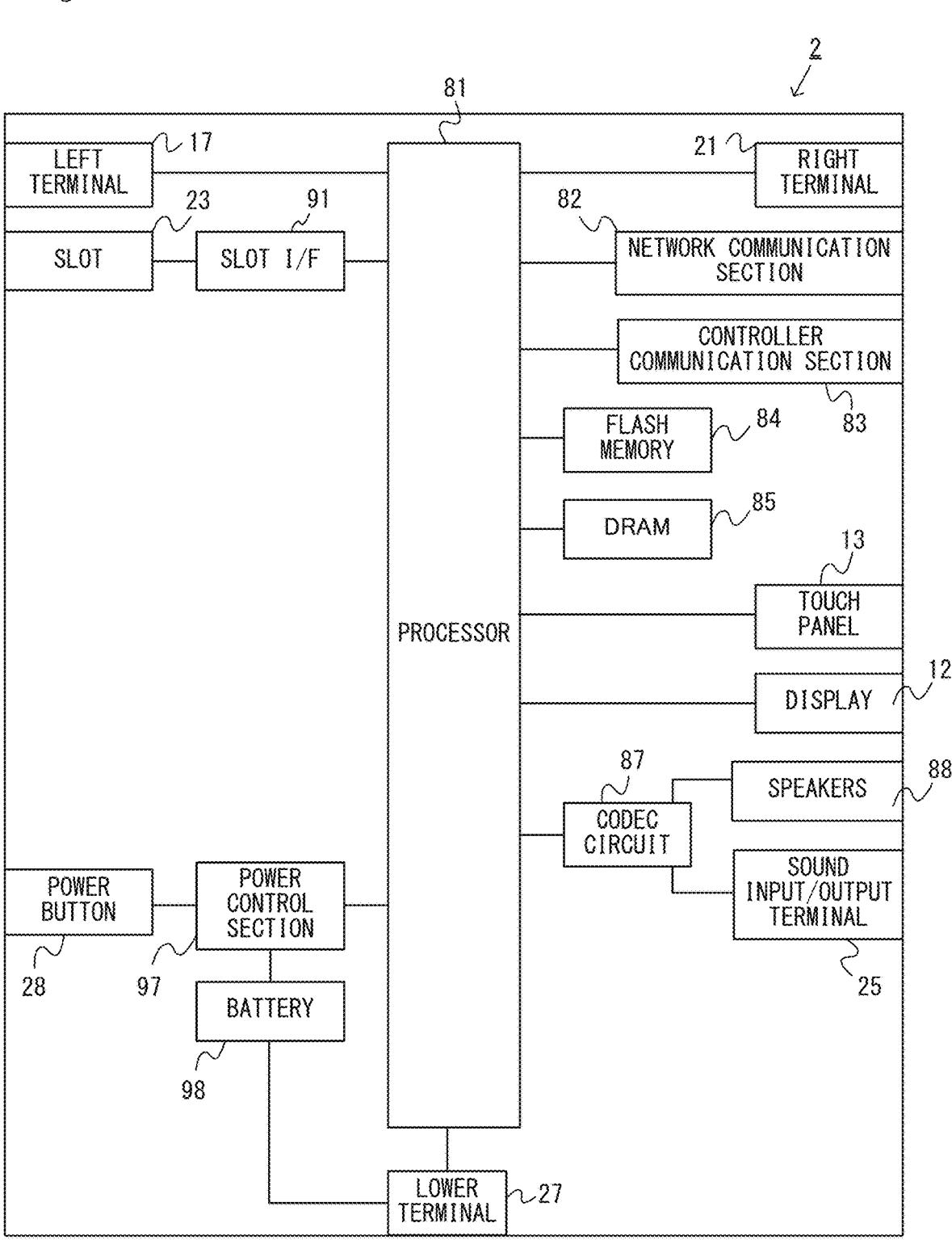
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
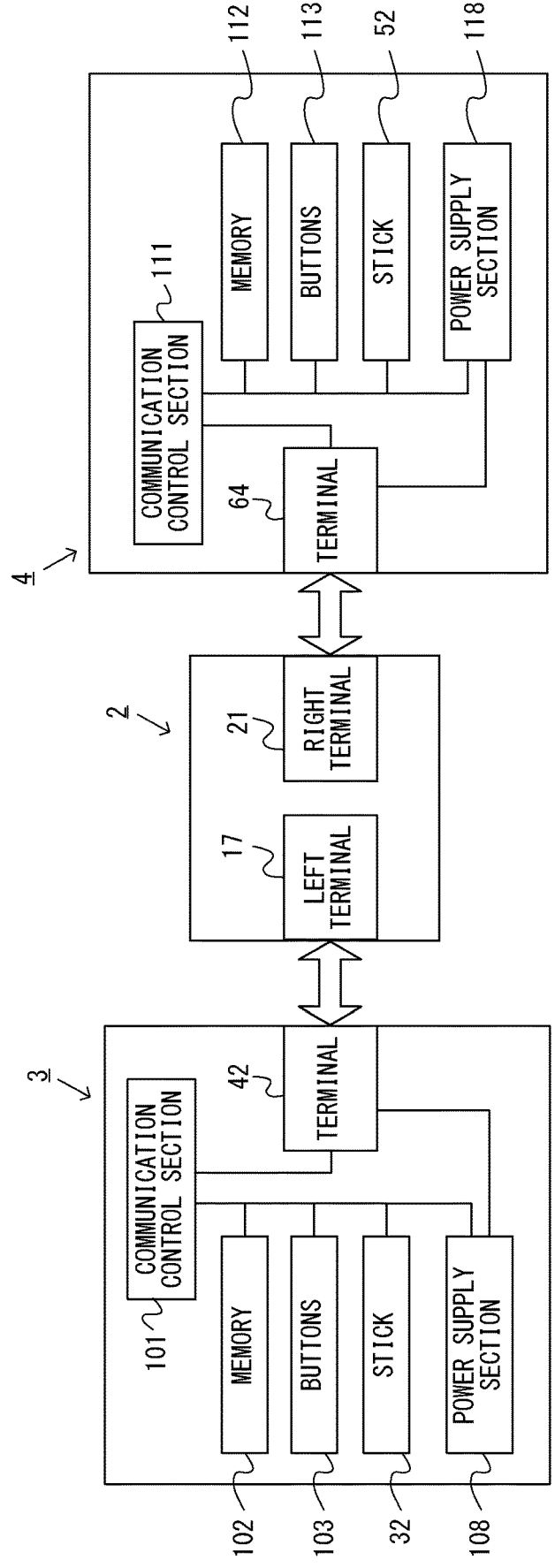
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Overview of Process in Game System]

Referring to FIG. 8 to FIG. 22, an overview of the process to be executed in the game system 1 will be described. In the present embodiment, the game system 1 executes a game in which the player character, which can be controlled by the player (i.e., the user of the game system 1), moves around in the game field (hereinafter referred to simply as "field"), which is a three-dimensional virtual space. In addition to displaying a field image showing the field in which the player character is arranged, the game system 1 can also display a map image showing the map of the field. In the present embodiment, the map image may be displayed by being switched from the field image by an instruction by the player, or at least a part of the map image may always be displayed with the field image.

Figure 8:
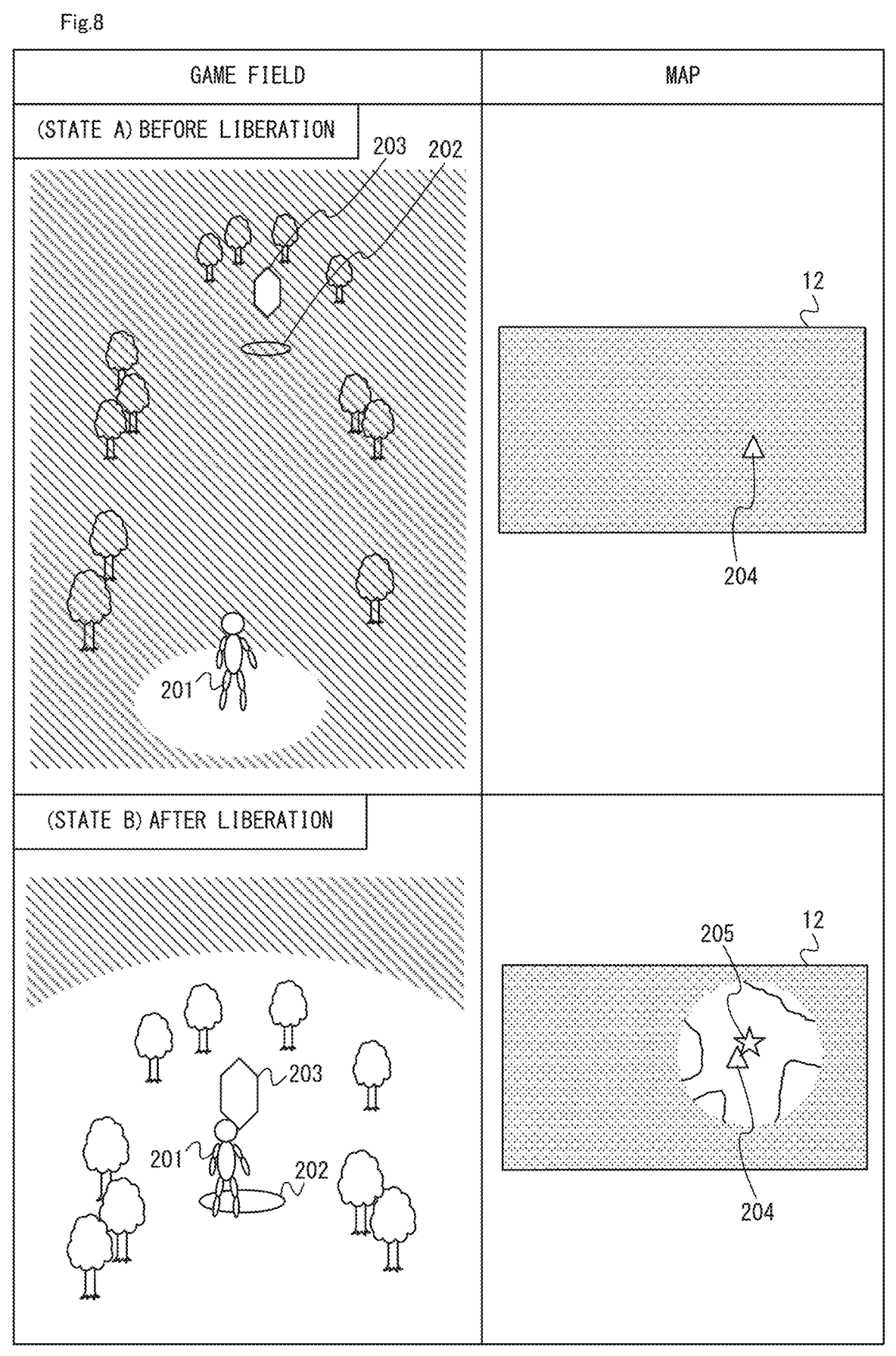

FIG. 8 is a view showing an overview of an example game according to the present embodiment. The left column shown in FIG. 8 shows the situations of the field, and the right column shows an example of the map image to be displayed. Here, in the present embodiment, a plurality of reference locations (e.g., a reference location 202 shown in FIG. 8) are set in the field. A reference location is liberated in response to a predetermined operation input by the player (e.g., an operation input to cause the player character to perform an operation of examining the reference location) while the player character 201 is located at or in the vicinity of the reference location. That is, the player character 201 can liberate the reference location by arriving at the reference location and performing a predetermined operation (e.g., an operation of examining the reference location). Hereinafter, a game event in which a reference location is liberated will be referred to as a "liberation event". Note that a reference location may be, for example, a place where the player character 201 can warp to another reference location that has already been liberated (so-called "fast travel"), where the player character 201 can recover, or where the player character 201 can change its equipment, skills, or possessed items.

In the present embodiment, before a reference location is liberated, the field is in the state of darkness (state 'a' shown in FIG. 8), excluding some exceptions (e.g., the player character 201 itself or the vicinity thereof and a landmark object 203 to be described below). Note that while the range of darkness is indicated by hatching in FIG. 8 for the purpose of clarity, the game system 1 displays the dark field in such a manner that the field is invisible or hardly visible to the player (see FIG. 15, etc., to be discussed below). In the state 'a' shown in FIG. 8, the field is dark except for the vicinity of the player character 201 and the landmark object 203 that represents the reference location 202, and it can be said that it is difficult to search the field.

Before the reference location is liberated, the map image is displayed in such a manner that no field information is shown (the state 'a' shown in FIG. 8). Field information is information regarding the field, such as information of the terrain that forms the field (specifically, the shape of the terrain, etc.), information of objects arranged in the field, information of items arranged in the field, or information of characters that are present on the field. In the state 'a' shown in FIG. 8, the map image is displayed in such a manner that only a mark 204 representing the position and the orientation of the player character 201 is shown, and no field information other than the mark 204 is shown. Thus, the map image before the reference location is liberated may be displayed in such a manner that at least some field information is not shown, while some other field information (e.g., the mark 204 shown in FIG. 8) may be shown before liberation.

On the other hand, when the reference location (the reference location 202 in the example shown in FIG. 8) is liberated by the player character 201, an area of the field around the reference location becomes an area that is not dark but is illuminated (the state 'b' in FIG. 8). Hereinafter, the illuminated range of the field is referred to as the "irradiated range". Although the details will be described later, the game system 1 displays the irradiated range in such a manner that it is visible to the player (see FIG. 17, etc., to be discussed below).

When the reference location is liberated, the map image is displayed in such a manner that field information is shown for the vicinity of the reference location (the state 'b' shown in FIG. 8). In the example shown in FIG. 8, lines representing the shape of the terrain and a mark 205 representing the reference location are shown around the liberated reference location, in addition to the mark 204 related to the player character 201.

As described above, when a liberation event occurs, the area around the liberated reference location in the field is displayed to be visible, and field information is displayed in the map image for the area around the reference location. This makes it easier for the player to have the player character 201 search around the liberated reference location. In the present embodiment, the player proceeds in the game with one of the objectives being to liberate reference locations in the field, thereby increasing the number of areas that can be easily searched by liberating reference locations.

[2-1. Setting Liberated Areas in Map]

Figure 9:
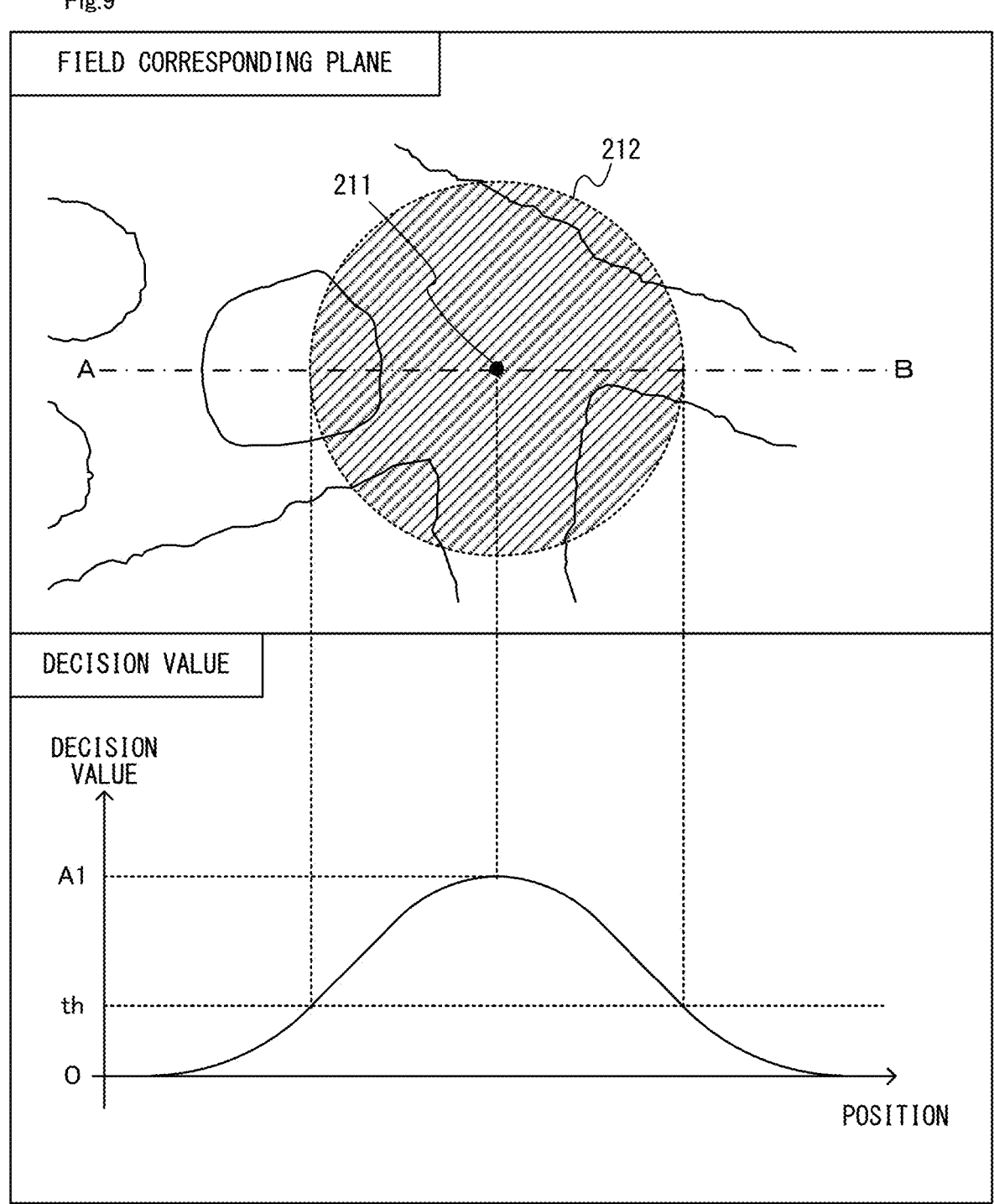
FIG. 9 is a view showing the relationship between the field corresponding plane and the decision value where one reference location is liberated.

Referring to FIG. 9 to FIG. 14, an example of a method for setting an area (referred to as a "liberated area") where field information is displayed in the map image when the reference location is liberated will be described. FIG. 9 is a view showing the relationship between the field corresponding plane and the decision value when one reference location is liberated. Here, the field corresponding plane is a two-dimensional plane corresponding to the three-dimensional field. The field corresponding plane can be said to be a plane onto which the three-dimensional field is projected in the vertical direction, and a two-dimensional position on the field corresponding plane is the position represented by two-dimensional coordinates in the horizontal direction in the field (i.e., two-dimensional coordinates obtained by deleting coordinates in the height direction from the three-dimensional coordinates representing the position in the field). In FIG. 9, the field corresponding plane is shown on the upper side, and a graph showing how the decision value changes on the field corresponding plane is shown on the lower side. Specifically, the graph described above shows the change in the decision value on the straight line AB (the one-dot-chain line in FIG. 9) passing through the liberated reference location 211.

The decision value is a value used to determine the liberated area in the field corresponding plane. In the present embodiment, the game system 1 calculates a decision value for each position on the field corresponding plane to determine the liberated area in the field corresponding plane. Note that the decision value is calculated for each position in the field corresponding plane for each predetermined unit section (referred to as the "calculation position"). Specifically, a decision using the decision value is made for each of positions corresponding to the pixels in the map image.

In the present embodiment, the decision value at each calculation position is calculated based on the reference value set at the reference location. That is, the game system 1 sets a reference value for the reference location, and calculates the decision value at each calculation position based on the reference value. Note that in the present embodiment, the magnitude of the reference value at the reference location is set for each reference location, and the magnitude of the reference value may vary for different reference locations. For example, the reference value at each reference location may be set so that the entire field becomes a liberated area when all reference locations are liberated.

In the present embodiment, the decision value for a position which is calculated based on a reference location (i.e., the decision value calculated based on the reference value set at a reference location) is calculated based on the distance from that reference location, and more specifically, calculated so as to decrease as the distance from that reference location increases (see FIG. 9). For example, in the example shown in FIG. 9, a reference value A1 is set for the liberated reference location 211, and the decision value at each calculation position on the straight line AB becomes the reference value A1 at the reference location 211 and changes so as to decrease in accordance with the distance from the reference location 211 to that position. The decision value becomes 0 at a position where this distance is equal to or greater than a certain distance. Note that there is no limitation on the specific calculation method for determining the decision value for each calculation position based on the reference value.

In the present embodiment, when only the reference location 211 is liberated as shown in FIG. 9, the game system 1 sets the liberated area while taking into consideration only the decision value based on the reference location 211. Specifically, the game system 1 sets, as the liberated area, an area in the field corresponding plane that consists of positions where the decision value based on the reference location 211 is equal to or greater than a predetermined threshold value (the threshold value th in FIG. 9). As described above, the decision value attenuates in accordance with the distance from the reference location 211 to that position, and in the example shown in FIG. 9, the circular area 212 centered about the reference location 211 is the liberated area.

Figure 10:
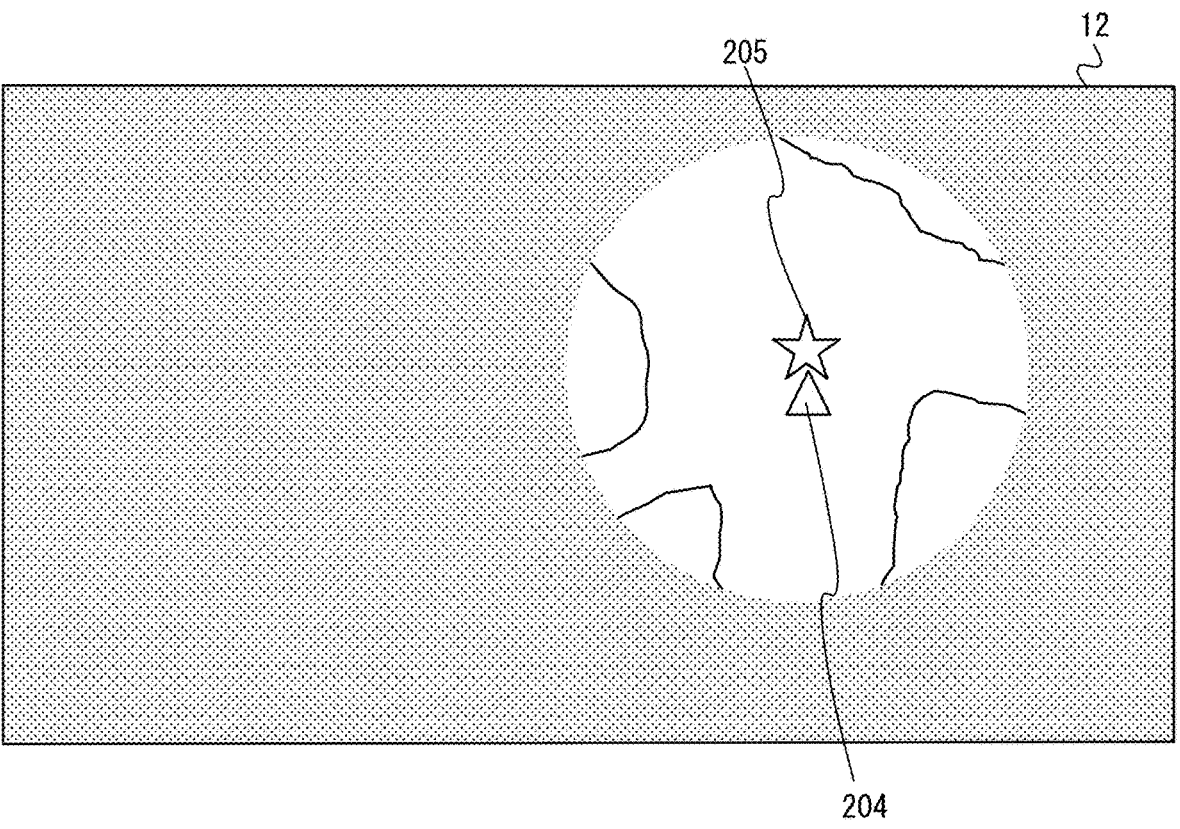
FIG. 10 is a view showing an example of a map image to be displayed when the circular area shown in FIG. 9 is a liberated area.
Figure 15:
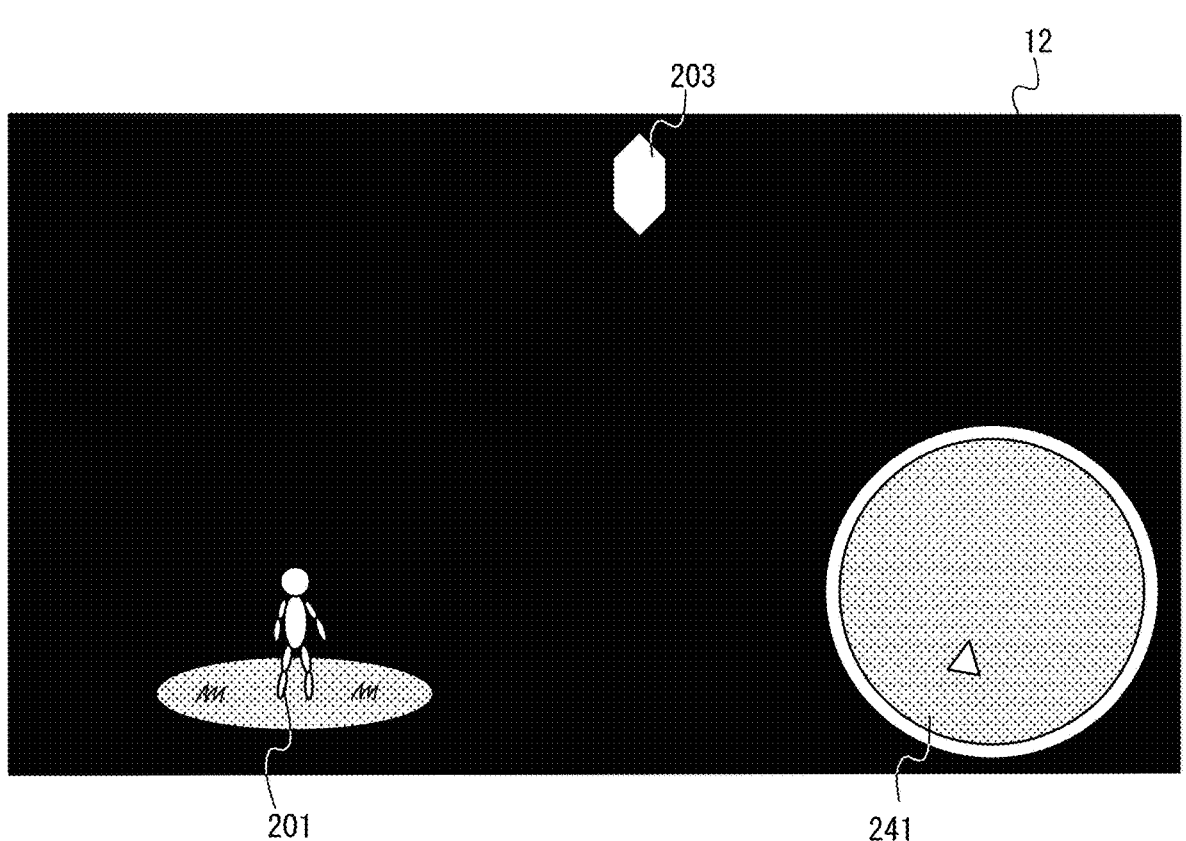
FIG. 15 is a view showing an example of a game image including a field image showing the field including the player character.

FIG. 10 is a view showing an example of a map image to be displayed when the circular area 212 shown in FIG. 9 is a liberated area. In the above case, as shown in FIG. 10, a map image is displayed in which field information is rendered for the pixels of the map image that correspond to positions in the field corresponding plane where the decision value is equal to or greater than the threshold value. As shown in FIG. 9 and FIG. 10, the range in which field information is rendered in the map image corresponds to the circular area 212. In FIG. 10, lines representing the shape of the terrain are displayed as field information for the range corresponding to the area 212. Note that in the present embodiment, the mark 205 representing the reference location is displayed when the player character 201 arrives at the reference location, regardless of whether the position of the reference location is within the liberated area. Note that in the present embodiment, the map image may be displayed on the entire screen of the display 12, as shown in FIG. 10, or it may be displayed on a portion of the screen of the display 12 in such a manner that it is superimposed on the field image representing the field, as shown in FIG. 15 to be discussed below.

As described above, in the present embodiment, the map image is a two-dimensional image showing field information. The decision value is a value that attenuates in accordance with the two-dimensional distance (i.e., the distance on the field corresponding plane) from the two-dimensional position corresponding to the reference location. According to the above, since liberated areas can be set on the two-dimensional plane, it is possible to set areas with high affinity to a two-dimensional map with a small processing load. According to the above, the liberated area can be set according to the distance from the reference location (e.g., so that the range within a certain distance from the reference location becomes the liberated area). Note that in other embodiments, the game system 1 may calculate a decision value for each position in the three-dimensional field and set the liberated area on the three-dimensional field. In this case, based on the liberated area on the three-dimensional field, the game system 1 determines the range corresponding to the liberated area in the two-dimensional map image, and generates a map image showing field information within the range. In other embodiments, the map may be three-dimensional, and a map image showing the three-dimensional map may be generated and displayed while setting liberated areas on the three-dimensional map.

When a plurality of reference locations are liberated, the game system 1 calculates the decision value based on each of the liberated reference locations, and the sum of the decision values (referred to as the "total decision value") is calculated for each calculation position. Liberated areas are set based on the total decision value. Note that when only one reference location is liberated (see FIG. 9), it can be said that the decision value based on the reference value set for that reference location is the total decision value.

Figure 11:
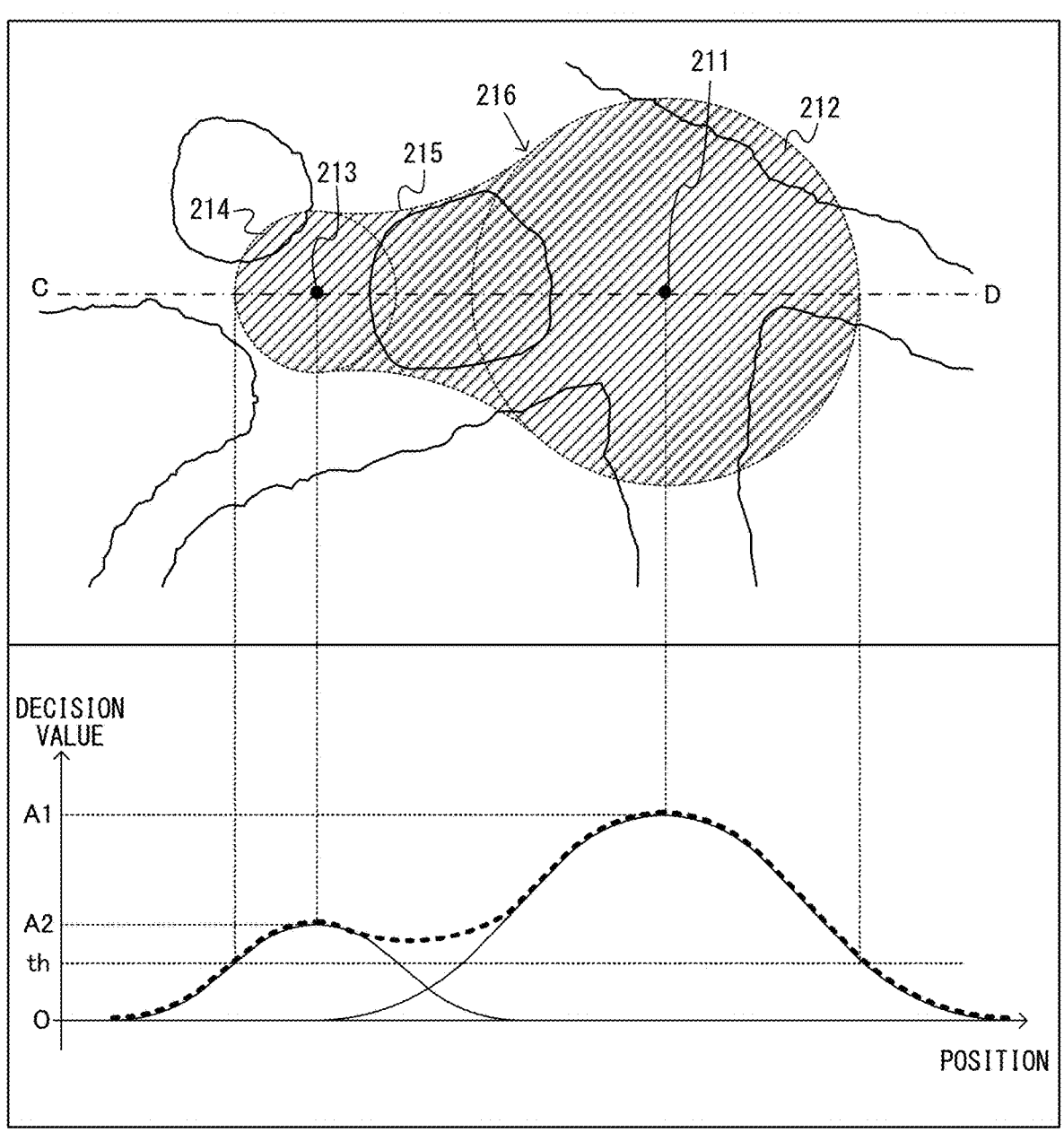
FIG. 11 is a view showing the relationship between the field corresponding plane and the decision value where two reference locations are liberated.

FIG. 11 is a view showing the relationship between the field corresponding plane and the decision value where two reference locations are liberated. Also in FIG. 11, as in FIG. 9, the field corresponding plane is shown on the upper side, and a graph showing the change in the decision values and the total decision value on a straight line passing through the liberated reference locations (the straight line CD in FIG. 11) is shown on the lower side. Note that the straight line CD shown in FIG. 11 passes through the two liberated reference locations 211 and 213.

In the case shown in FIG. 11, the game system 1 calculates the total decision value for each of the calculation positions described above. The total decision value is the sum of the decision values based on the liberated reference locations 211 and 213. That is, the game system 1 calculates the decision value based on the reference location 211 and calculates the decision value based on the reference location 213 for each of the calculation positions. The decision value based on the reference location 211 is calculated as a value where the reference value A1 set for the reference location 211 attenuates in accordance with the distance from the reference location 211 to that position. The decision value based on the reference location 213 is calculated as a value where the reference value A2 set for the reference location 213 attenuates in accordance with the distance from the reference location 213 to that position. The game system 1 calculates the total decision value for each calculation position by adding the decision value based on the reference location 211 and the decision value based on the reference location 213. In the graph on the lower side of FIG. 11, the peak on the right side indicated by the solid line represents the change in the decision value based on the reference location 211, the peak on the left side indicated by the solid line represents the change in the decision value based on the reference location 213, and the curve indicated by the thick dotted line shows the change in the total decision value.

The game system 1 sets, as a liberated area, an area in the field corresponding plane that consists of positions where the total decision value is greater than or equal to the threshold value th described above. In the example shown in FIG. 11, an area 216 (the area indicated by hatching in FIG. 11), which includes the circular area 212 centered about the reference location 211, a circular area 214 centered about the reference location 213, plus an area 215 that connects together these two circular areas, is the liberated area. That is, the liberated area in the case where a plurality of reference locations are liberated can also be said to be generated by a two-dimensional metaball technique.

Figure 12:
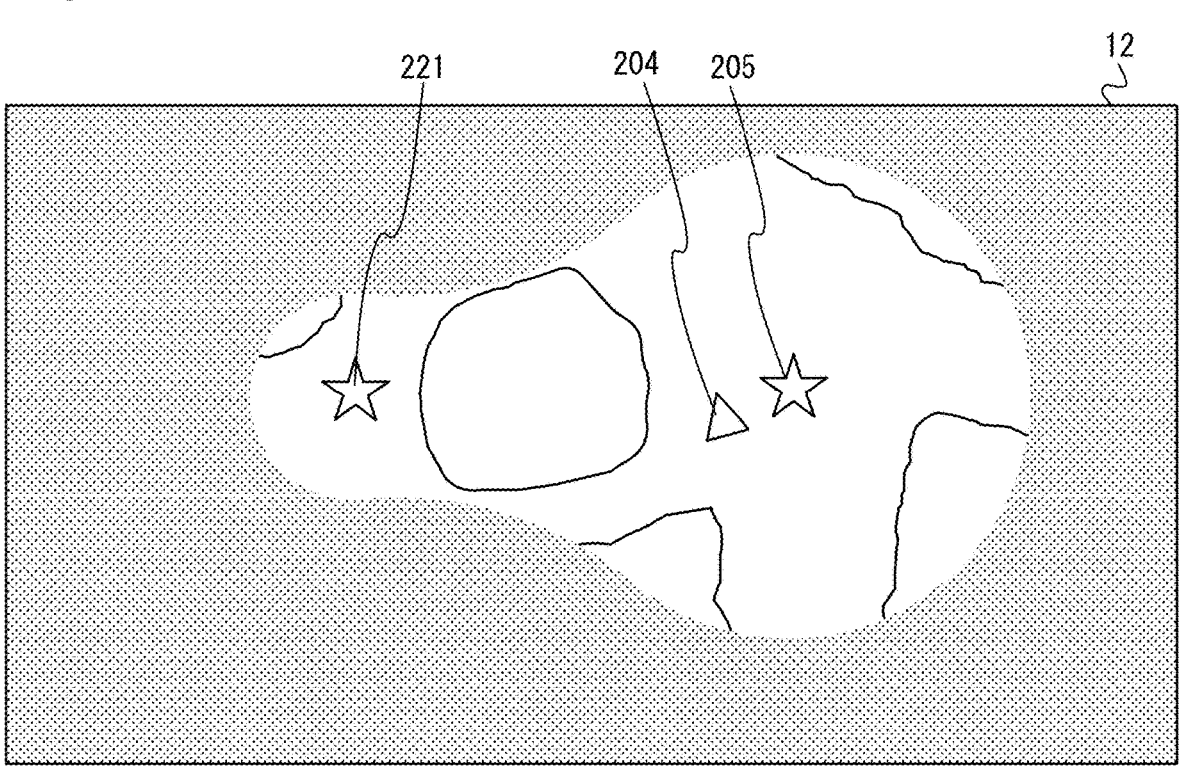
FIG. 12 is a view showing an example of a map image to be displayed when the area shown in FIG. 11 is a liberated area.

FIG. 12 is a view showing an example of a map image to be displayed when the area 216 shown in FIG. 11 is a liberated area. As shown in FIG. 12, a map image is displayed in which field information is rendered for pixels of the map image for which the total decision value is equal to or greater than the threshold value in the field corresponding plane. The range where field information is rendered corresponds to the circular area 216. In FIG. 12, lines representing the shape of the terrain are displayed as field information. In the example shown in FIG. 12, in addition to the mark 204 representing the position and the orientation of the player character 201, marks 205 and 221 representing the two reference locations at which the player character 201 has arrived are displayed. Thus, in the present embodiment, the total decision value described above is used to set the liberated area, so that when the reference location 211 and the reference location 213 are both liberated, an area that is not to be a liberated area when only the reference location 211 is liberated or when only the reference location 213 is liberated (i.e., the area 215 shown in FIG. 11) may be set to be a liberated area.

As described above, in the present embodiment, the magnitude of the reference value (i.e., the maximum value of the decision value) set for each of the plurality of reference locations is set for each reference location. Then, when a reference location is liberated, it is possible to set, for each reference location, the size of an area that is to be a liberated area based on the reference location. For example, in the example shown in FIG. 11, the size and the shape of the liberated area when the reference locations 211 and 213 are liberated can be changed by changing the magnitude of the reference value A1 set for the reference location 211 or the reference value A2 set for the reference location 213. For example, by changing the reference value A1 and/or the reference value A2 to smaller values, the liberated area in the case where the reference locations 211 and 213 are liberated may be two circular areas that are not connected to each other. Note that in other embodiments, the reference value set for each of a plurality of reference locations may be set to the same value. Furthermore, even if the reference values for a plurality of reference locations are the same value, the range of the liberated area may be changed for each reference location by setting the method for calculating the decision value so that the degree of attenuation in accordance with the distance varies for each reference location.

As described above, in the present embodiment, the game system 1 identifies, as a liberated area, an area that consists of positions at which the total decision value is equal to or greater than a predetermined value (i.e., the threshold value th described above), wherein the total decision value is obtained by summing together one or more decision values based on one or more reference locations that have been liberated of the plurality of reference locations. According to the above, the shape and the size of the liberated area can be changed in accordance with the respective liberated states of the plurality of reference locations.

Figure 13:
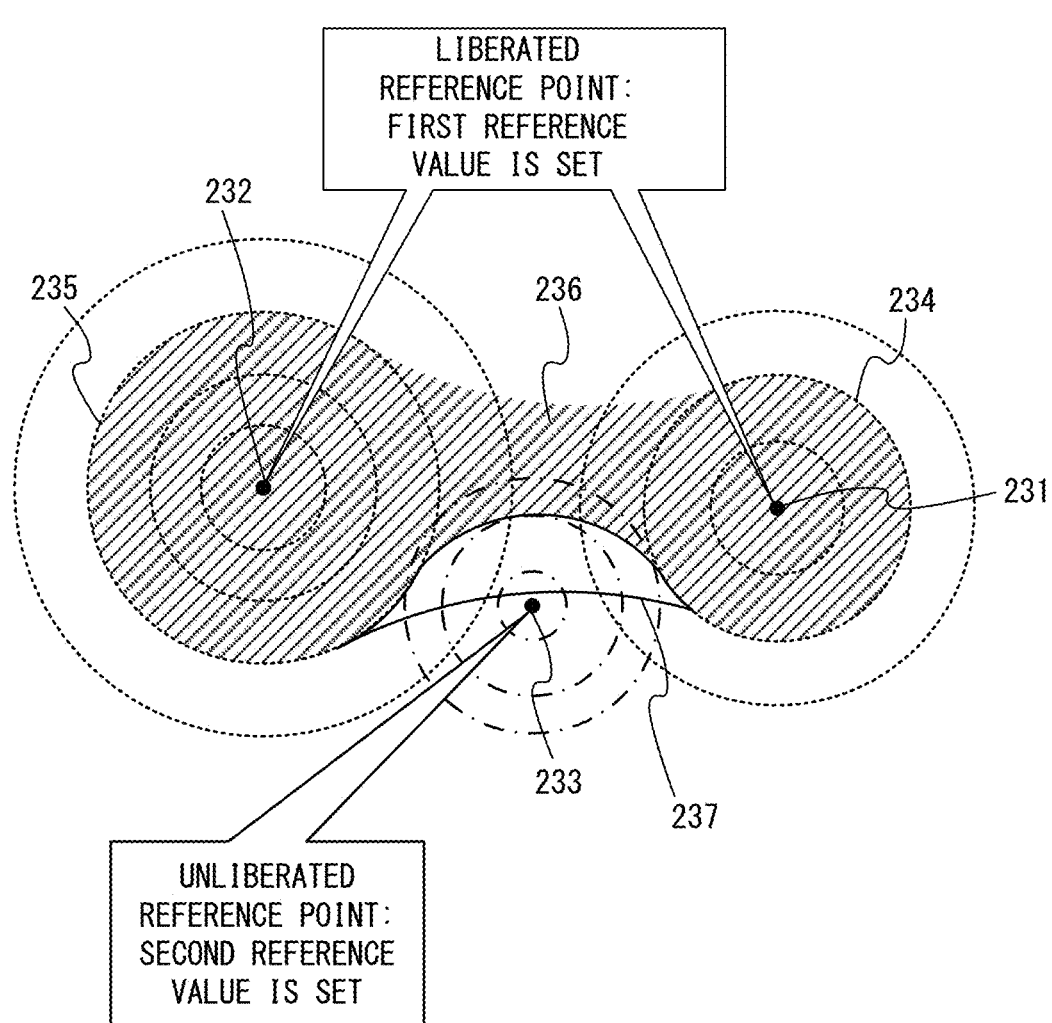
FIG. 13 is a view showing an example of a field corresponding plane in which a liberated area is set where two reference locations are liberated and one reference location is unliberated.

In the embodiment described above, the game system 1 calculates the total decision value based on the reference values set for the liberated reference locations, but the game system 1 may further calculate the total decision value based also on the reference values set for the unliberated reference locations in addition to the liberated reference locations. Referring to FIG. 13, an example of calculating the total decision value based on the reference values set for unliberated reference locations will be described below.

FIG. 13 is a view showing an example of a field corresponding plane in which a liberated area is set where two reference locations are liberated and one reference location is unliberated. In FIG. 13, it is assumed that three reference locations 231 to 233 are arranged in the field. In FIG. 13, it is also assumed that the reference locations 231 and 232 have been liberated and that the reference location 233, which is between the reference locations 231 and 232, has not been liberated.

In the example shown in FIG. 13, a reference value is set for the liberated reference locations 231 and 232 as in the embodiment described above. Here, in this variation, a reference value different from that for a liberated reference location is set for the unliberated reference location 233. Hereinafter, the reference value set for a liberated reference location will be referred to as the "first reference value" and the reference value set for an unliberated reference location will be referred to as the "second reference value". That is, when the reference location 233 is liberated in FIG. 13, the first reference value is set for the reference location 233 as for the reference locations 231 and 232.

In the example shown in FIG. 13, as in the examples shown in FIG. 9 and FIG. 11, the game system 1 calculates, for each calculation position, the decision value (based on the first reference value (referred to as the "first decision value"). In the example shown in FIG. 13, the first decision value based on the first reference value set at the reference location 231 and the first decision value based on the first reference value set at the reference location 232 are calculated for each calculation position. Furthermore, in the example shown in FIG. 13, the decision value based on the second reference value (referred to as the "second decision value") is calculated for each calculation position. In the example shown in FIG. 13, a second decision value based on the second reference value set at the reference location 233 is calculated for each calculation position. The second decision value is a value that is equal to the second reference value at the reference location and decreases as the distance from the reference location increases to be 0 at a position where the distance is equal to or greater than a certain length.

In FIG. 13, the circular dotted lines centered about the reference locations 231 and 232 are lines that connect together positions where the first decision value based on the first reference value is equal to a predetermined value. Of these dotted lines, dotted lines 234 and 235 are lines that connect together positions where the first decision value is equal to the threshold value described above. In FIG. 13, circular one-dot-chain lines centered about the reference location 233 are lines that connect together positions where the second decision value based on the second reference value is equal to a predetermined value.

In the example shown in FIG. 13, the game system 1 calculates the total decision value based further on the second decision value in addition to the first decision value. Specifically, the total decision value at a calculation position is obtained by subtracting the sum of second decision values at the calculation position from the sum of first decision values at the calculation position. In the example shown in FIG. 13, the game system 1 calculates the total decision value by subtracting the second decision value based on the second reference value at the reference location 233 from the sum of the first decision value based on the first reference value at the reference location 231 and the first decision value based on the first reference value at the reference location 232. Note that the calculation method for the total decision value described above is synonymous with calculating the sum of the first and second decision values while setting the second reference value to a negative value (as a result, the second decision value becomes a negative value). The absolute values of the first reference value and the second reference value may be equal to each other or different from each other. The method for calculating the first reference value based on the first reference value and the method for calculating the second reference value based on the second reference value may be the same or may be different.

In the example shown in FIG. 13, since the second decision value is subtracted from the sum with the first decision value, at positions affected by the second decision value (i.e., positions where the second decision value is a positive value), the total decision value is smaller than when the second decision value is not taken into consideration (for example, in the case of the embodiment described above). Therefore, in the example shown in FIG. 13, a part of the area that is to be a liberated area in the case where the second judgment value is not taken into consideration is not set as a liberated area. In the example shown in FIG. 13, the hatched area 236 is a liberated area, and the area (the area indicated by a solid line) 237 that is to be a liberated area when the second decision value is not taken into consideration does not become a liberated area. Thus, in the example shown in FIG. 13, at positions in the vicinity of an unliberated reference location, the absolute value of the second decision value is large, so the positions are unlikely to be a liberated area.

In the example shown in FIG. 13, the total decision value is a value obtained by subtracting the sum of one or more second decision values for one or more reference locations that are unliberated of the plurality of reference locations from the sum of one or more first decision values for one or more reference locations that have been liberated of the plurality of reference locations. According to this, an unliberated reference location and positions in the vicinity thereof are unlikely to be a liberated area.

Here, if the total decision value were calculated without reflecting the second decision value based on the unliberated reference location, even positions in the vicinity of the unliberated reference location 233 would become a liberated area in the case shown in FIG. 13, for example. As a result, there is a risk that the map may be liberated (i.e., field information is displayed in the map image) including positions in the vicinity of the unliberated reference location 233, and the area may become the irradiated range described above. Then, the motivation for the player to liberate the unliberated reference location 233 may become weak, thereby detracting from the gameplay of having to liberate reference locations in order to expand the search range. In contrast, according to the variation described above, since the unliberated reference location or positions in the vicinity of thereof are unlikely to become a liberated area, it is possible to reduce the possibility of weakening the motivation to liberate unliberated reference locations, thus improving the gameplay.

In the present embodiment, the game system 1 generates a map mask as data indicating the liberated areas described above. That is, the map mask is two-dimensional data indicating an area in the field that is a liberated area. Then, the game system 1 generates a map image, using the map mask, that shows the field information for the liberated area.

Figure 14:
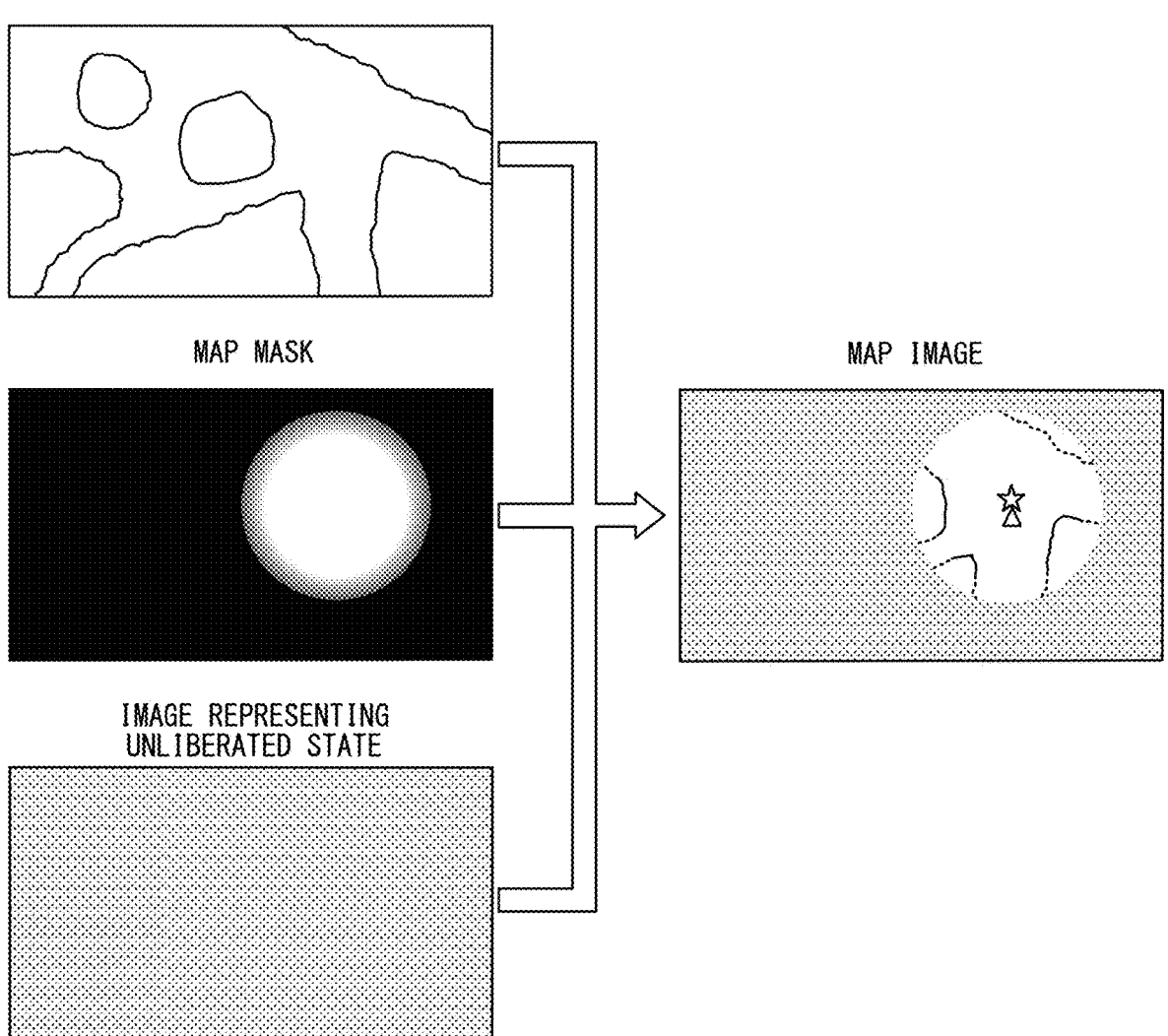
FIG. 14 is a view showing an example of a method for generating a map image according to the present embodiment.

FIG. 14 is a view showing an example of a method for generating a map image according to the present embodiment. In the present embodiment, the game system 1 generates a map image to be displayed based on the original map image and the map mask. The original map image is a source image for generating the map image to be displayed, and indicates a map image including the field information. The original map image can be said to be a map image for a case where the entire field is the liberated area.

In the present embodiment, data of the map mask is data representing the map mask value for different two-dimensional positions. The map mask value represents the degree to which the original map image is reflected for the generation of the map image. For example, the map mask value is a value whose maximum value is 1 and minimum value is 0. In this case, for pixels where the map mask value is 1, the original map image is reflected in the map image as is, and for pixels where the map mask value is 0, the map image is generated so that the original map image is not reflected. In the present embodiment, the map mask value is a multi-valued value ranging from 0 to 1. Although the details will be described later, by using a multi-valued value as the map mask value, the map image can be displayed blurred in the vicinity of the boundaries of liberated areas. Note that in other embodiments, the map mask value may be a binary value of 0 or 1.

The map mask value is set for each calculation position described above based on the total decision value described above. Specifically, if the total decision value for a certain position is greater than the first value, the map mask value for that position is set to 1, and if the total decision value for a position is less than the second value, the map mask value for that position is set to 0. Note that the second value is smaller than the first value and larger than the threshold value th described above. If the total decision value for a position is equal to or greater than the second value and less than or equal to the first value, the map mask value for that position is set to a value in the range of greater than 0 and less than 1 in accordance with the magnitude of the total decision value. According to the above, the map mask value is set to 1 for positions within a predetermined distance from the reference location, and is set to a value that decreases in accordance with the distance from the reference location for positions outside of that range, and is set to 0 for positions where the total decision value is smaller than the threshold value th (i.e., positions outside the liberated area). Note that in the map mask shown in FIG. 14, positions where the map mask value is 1 are shown in white, positions where the map mask value is 0 are shown in black, and positions where the map mask value is an intermediate value (i.e., a value greater than 0 but less than 1) are shown in gray so that the larger the value, the closer it is to white.

Note that as an example of a calculation method based on the total decision value, the map mask value $M_p$ may be calculated by the following expression.

$$M_p = K * \mathrm{Max}\left(\mathrm{Min}\left(\left(\sum_{i=0}^{n}(O_i * \exp(-a_i * l_{i,p}))\right) - \mathrm{thresh}_2 \mathrm{Over}\right) - \left(\sum_{i=0}^{n}(C_i * \exp(-b_i * l_{i,p}))\right)^2, 0.0\right)$$

In the expression above, K, thresh and Over are constants, where thresh is the threshold value th described above. Oi is a variable that is 1 if the $i^{th}$ reference location (i is a natural number from 1 to n, where n is the number of reference locations) has been liberated and 0 if it is unliberated. Ci is a variable that is 0 if the $i^{th}$ reference location has been liberated and 1 if it is unliberated. The constant ai is a constant that represents the degree to which the first decision value to be the first reference value at the $i^{th}$ reference location attenuates in accordance with the distance. In the example of the expression above, the first reference value is 1. The constant bi is a constant that represents the degree to which the second decision value to be the second reference value at the $i^{th}$ reference location attenuates in accordance with the distance. In the example of the expression above, the second reference value is 1. The variable 1(i,p) is the length (specifically, the length on the field corresponding plane) from the $i^{th}$ reference location to the position p (specifically, the calculation position described above). In the expression above, in order to avoid a result that the sum of the first decision values is too large to be effective in subtracting the sum of the second decision values no matter how close it is to an unliberated reference location, when the sum of the first decision values is larger than the constant Over, a calculation is performed to replace the sum with the constant Over. On the other hand, to prevent the influence of the sum of the second decision values from becoming excessive, a calculation of subtracting a value obtained by squaring the sum of the second decision values is performed. If the result of the subtraction is negative, the calculation is performed to set the value to 0.

While the reference values are set to 1 in the expression above, the first reference value and the second reference value may be set to different values for each reference location. For example, by replacing "Oi" in the expression above with "Oi*Ai" while deleting the constant ai, and replacing "Ci" with "Ci*Bi" while deleting the constant bi, it is possible to calculate the map mask value Mp in the case where first reference value and the second reference value are set for each reference location. Note that the variable Ai is the first reference value at the $i^{th}$ reference location, and the variable Bi is the second reference value at the $i^{th}$ reference location. Other embodiments may employ an expression that is obtained by replacing "Oi" with "Oi*Ai" and replacing "Ci" with "Ci*Bi" while leaving the constants ai and bi in the expression above. When either one of the first reference value and the second reference value is set to a fixed value (=1), it is possible to calculate the map mask value Mp by using an expression obtained with the replacement described above for either "Oi" or "Ci". Note that the expression used for calculating the map mask value is not limited to the expression above. In other embodiments, for example, any expression may be used in which the decision value at a certain position is calculated so that the decision value attenuates in accordance with the distance from the reference position to this certain position (e.g., so that the decision value is inversely proportional to the square of this distance).

The game system 1 generates a map image by referring to the map mask and combining the original map image and the image indicating the unliberated state at a proportion according to the map mask value for each pixel. Specifically, the game system 1 generates the map image so that the original map image is reflected as it is for pixels where the map mask value is 1, the original map image is not reflected for pixels where the map mask value is 0, and the original map image is reflected at a proportion in accordance with the map mask value for pixels where the map mask value is an intermediate value. An image indicating the unliberated state may be a single color or may be rendered as a predetermined pattern, etc. The combined map image may be further combined with a grid, etc., to make the coordinates easier to understand. This causes the map image to be displayed faded in the vicinity of the boundary in the liberated area (specifically, at positions where the map mask value is an intermediate value) (see FIG. 14). Note that areas of the map image that are displayed faded are indicated by dotted lines in FIG. 14.

As described above, in the present embodiment, when a liberation event occurs, the game system 1 generates two-dimensional mask data (i.e., a map mask) that represents the range that is a liberated area in the field. By applying the mask data to the original map image including field information, the game system 1 generates a map image that shows field information for the portion corresponding to the liberated area. According to this, it is possible to easily generate a map image showing the portion of the liberated area. Note that in other embodiments, there is no limitation on the specific method for generating the map image and it is not limited to the method using mask data.

Note that in the present embodiment, the mask data is data indicating for each position a multi-valued value in accordance with the magnitude of the total decision value at the position in the field. The game system 1 generates the map image by combining together the original map image and the image indicating the unliberated state for each pixel at a proportion in accordance with the multi-valued value represented by the mask data. According to this, it is possible to generate a map image in which the vicinity of the boundary of the liberated area is blurred. Thus, the liberated map can be made to look natural.

[2-2. Setting of Irradiated Range]

With reference to FIG. 15 to FIG. 21, an example of a method for setting the irradiated range described above in the field will be described. In the present embodiment, in response to the occurrence of a predetermined irradiation event in the game, a range of the field in accordance with the irradiation event becomes an irradiated range. The liberation event described above is one of the irradiation events. In the present embodiment, in addition to the liberation event described above, a character illumination event and an item arrangement event can also occur as the irradiation event. Note that in addition to an irradiated range set in response to the occurrence of an irradiation event, there may also be irradiated ranges, or the like, pre-set on the field.

A character illumination event is an event in which the vicinity of the player character becomes an irradiated range. In the present embodiment, a character illumination event is an event in which the player character is equipped with an illuminating garment. A character illumination event may be, for example, an event in which the player character holds an illuminating item or boards an illuminating vehicle.

An item arrangement event is an event of arranging an item for which a light source is set (referred to as a "light source item") on a terrain object, such as the ground, in a field, and the vicinity of the light source item becomes an irradiated range.

FIG. 15 is a view showing an example of a game image including a field image showing the field including the player character. In FIG. 15, a character illumination event has occurred and no other irradiation events have occurred. In the present embodiment, the game system 1 causes a character illumination event to occur in response to an instruction by the player (e.g., in response to an operation input to equip the player character with an illuminating garment). As shown in FIG. 15, when a character illumination event occurs, a range around the player character 201 (referred to as the "character affected range") is set as an irradiated range. The character affected range is, for example, a range within a predetermined distance from the position of the player character 201. Note that in the situation shown in FIG. 15, since the range outside the character affected range is not set as an irradiated range, the range is displayed dark (i.e., in an invisible or hardly visible manner), except for the landmark object 203. Note that objects (exempted objects to be described below) such as the player character 201 itself and the landmark object 203, which are displayed visible even outside the irradiated range, will be described later.

In the present embodiment, the game system 1 sets ambient light in the field and renders the irradiated range by the character affected range so as to reflect the ambient light, thereby displaying the irradiated range as visible. Ambient light is a light source whose brightness is set to a predetermined level regardless of the position in the field. Although the details will be described later, in the present embodiment, the game system 1 displays the range outside the irradiated range in an invisible or hardly visible manner by rendering the range without reflecting the light source (e.g., ambient light or a point light source).

Note that in the present embodiment, the game system 1 displays a map image 241 in a partial area of the screen of the display 12 (in this case, the lower right area of the screen) together with the field image representing the field. In the situation shown in FIG. 15, since the liberation event has not yet occurred, the map image 241 is displayed that does not include field information other than a mark representing the position and the orientation of the player character 201. Note that in other embodiments, the map image does not have to be displayed when the field image is displayed.

As described above, in the present embodiment, an example of an irradiation event is an event in which the vicinity of the player character becomes an irradiated range (i.e., a character illumination event) based on an operation input by the player. In this case, the game system 1 sets the position of the player character as the position of the point to be the reference, and based on the distance from the point to be the reference, sets an irradiated range so as to include a range where the distance is less than or equal to the threshold value. According to this, the vicinity of the player character can be displayed continuously visible, thereby reducing the risk of a situation in which it is difficult to search the field because the vicinity of the player character is not visible at all. Note that in other embodiments, the game system 1 may always set the vicinity of the player character as an irradiated range regardless of whether or not a character illumination event occurs. In other embodiments, the game system 1 does not have to generate a character illumination event as an irradiation event.

Note that although a character illumination event is an event related to the player character in the description above, the game system 1 may execute a character illumination event for another character other than the player character (e.g., characters who are teammates of the player character or enemy characters) in addition to (or instead of) the player character, and set an irradiated range also for the other character. For example, an irradiated range may be set based on the position of the other character in response to a character illumination event in which the other character changes to a self-luminous state.

Figure 16:
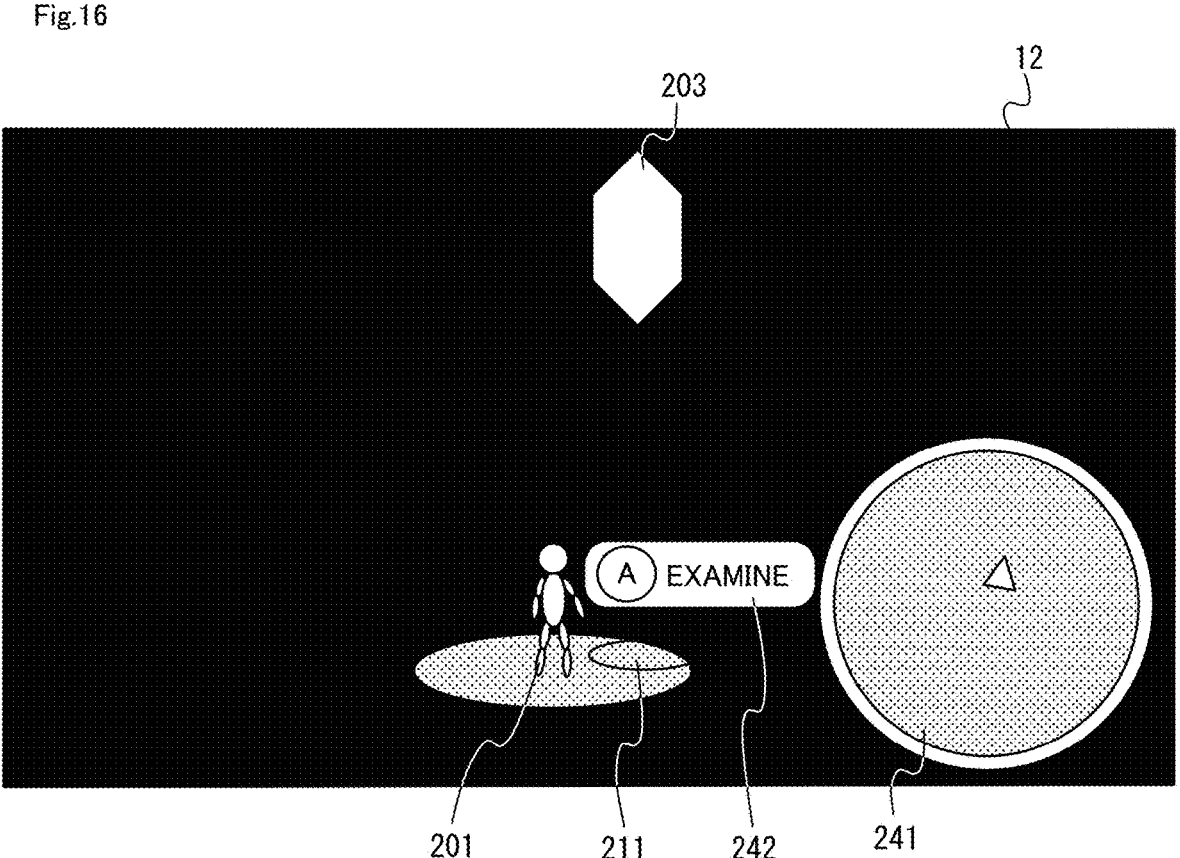
FIG. 16 is a view showing an example of a game image when the player character is located in the vicinity of a reference location.

FIG. 16 is a view showing an example of a game image when the player character is located in the vicinity of a reference location. The situation shown in FIG. 16 is a situation where the player character 201 has moved to the vicinity of the unliberated reference location 211 from the situation shown in FIG. 15. Note that in the present embodiment, the landmark object 203 is displayed visible even outside the irradiated range, so the player can move the player character 201 toward the reference location 211 outside the irradiated range using the landmark object 203 as a target.

If the player character 201 is located in the vicinity of the reference location 211 (specifically, within a predetermined distance from the reference location 211) as shown in FIG. 16, the player character 201 can perform an operation to liberate the reference location 211. That is, in the case described above, the game system 1 accepts an operation input to liberate the reference location 211, and liberates the reference location 211 in response to the operation input by the player. In the present embodiment, the operation input is an input to execute a command to "examine" (i.e., a command to make the player character 201 perform an action to examine the vicinity), and specifically, it is an input to press the A button 53 of the right controller 4. In the case described above, the game system 1 displays a command image 242 indicating that the command can be executed (see FIG. 16) to notify the player that the player is ready to perform the operation input. Note that in order to facilitate the operation described above after arriving at the reference location 211, a limited range, such as directly below the landmark object 203, may be used as a pre-set irradiated range (i.e., set regardless of whether or not an irradiation event occurs).

When an operation input to liberate the reference location 211 is performed, the game system 1 sets a range around the reference location 211 as the irradiated range. At this time, in the present embodiment, the game system 1 displays an animation of the event scene showing the liberation event. For example, as the event scene, an animation is displayed showing the vicinity of the reference location 211 being gradually brightened.

Figure 17:
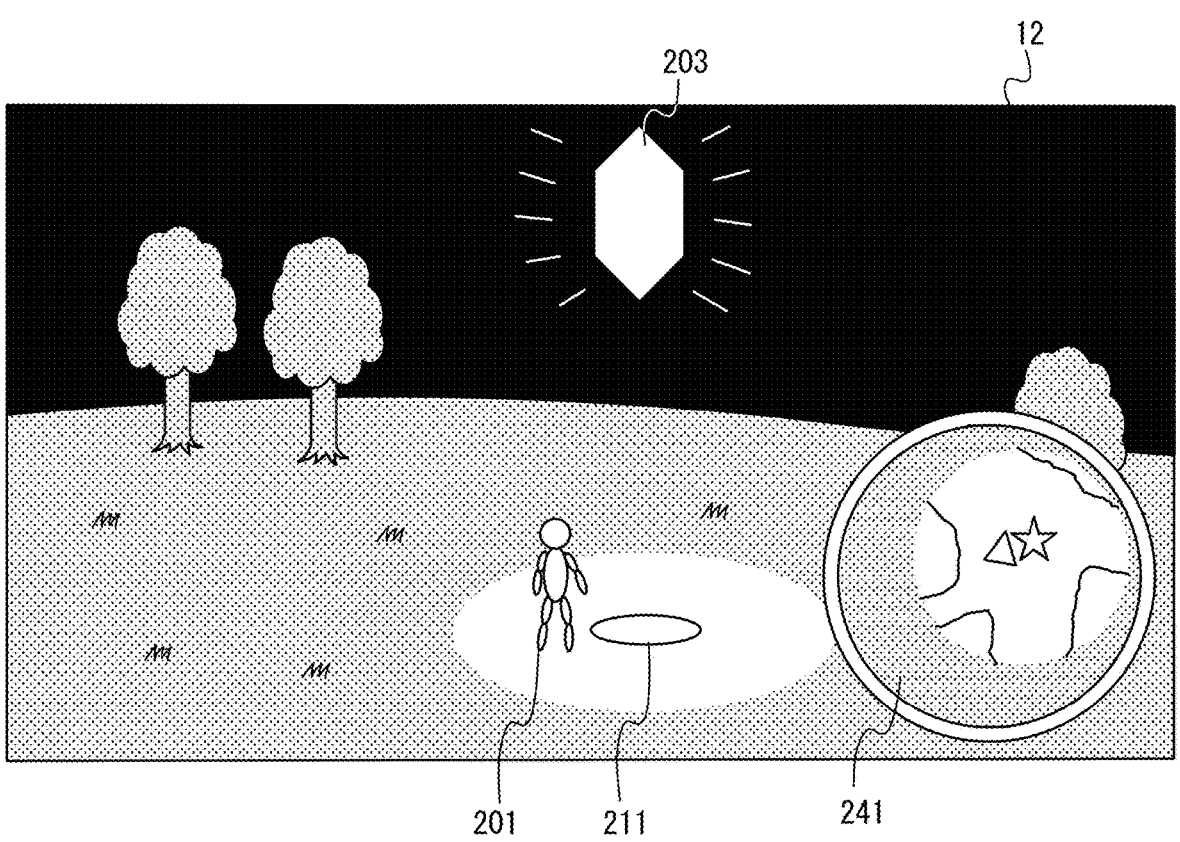
FIG. 17 is a view showing an example of a game image showing the field after the reference location is liberated.

FIG. 17 is a view showing an example of a game image showing the field after the reference location is liberated. As shown in FIG. 17, when a liberation event occurs in which the reference location 211 is liberated, a range around the reference location 211 is set as the irradiated range, and this range is displayed as visible. Note that in FIG. 17, a part of the field that is a hill around the reference location 211 is included in the irradiated range and displayed as visible, while an area beyond the hill is outside the irradiated range and remains displayed in an invisible manner. In the situation shown in FIG. 17, the map around the reference location 211 is liberated (i.e., a liberated area including the reference location 211 is set) as a result of the liberation of the reference location 211, so the map image 241 includes field information for inside the liberated area.

Note that the landmark object 203, which is visible even outside the irradiated range, is displayed visible also within the irradiated range. Here, in the present embodiment, the game system 1 further sets a point light source at a predetermined position in the field, e.g., at the position of the landmark object 203, in response to the occurrence of a liberation event. Although the details will be described later, in the rendering process, the game system 1 renders a part of the terrain object that is included in the irradiated range while further reflecting the point light source. Therefore, the vicinity of the landmark object 203 is rendered while reflecting the ambient light and the point light source, and is thus displayed to appear brighter than the part of the irradiated range that is rendered while reflecting only the ambient light. That is, brightness based on the point light source can also be expressed while ensuring the visibility of a predetermined range. Note that in FIG. 17, a bright portion within the irradiated range that particularly reflects light from the point light source set at the position of the landmark object 203 is shown as a white area, and a portion of the irradiated range that is less affected by the point light source is shown as a shaded area. With the point light source described above, it is easy to make the player recognize that a liberation event has occurred.

Figure 18:
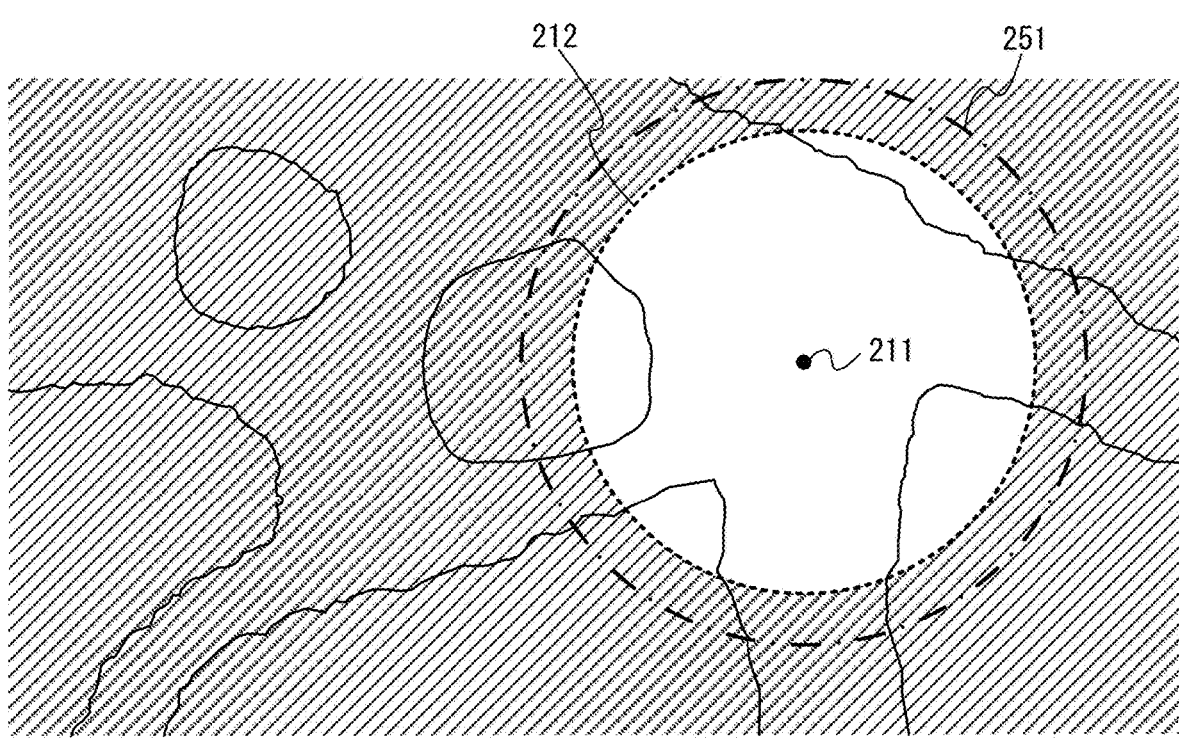
FIG. 18 is a view showing the field where one reference location is liberated as viewed from above.
Figure 19:
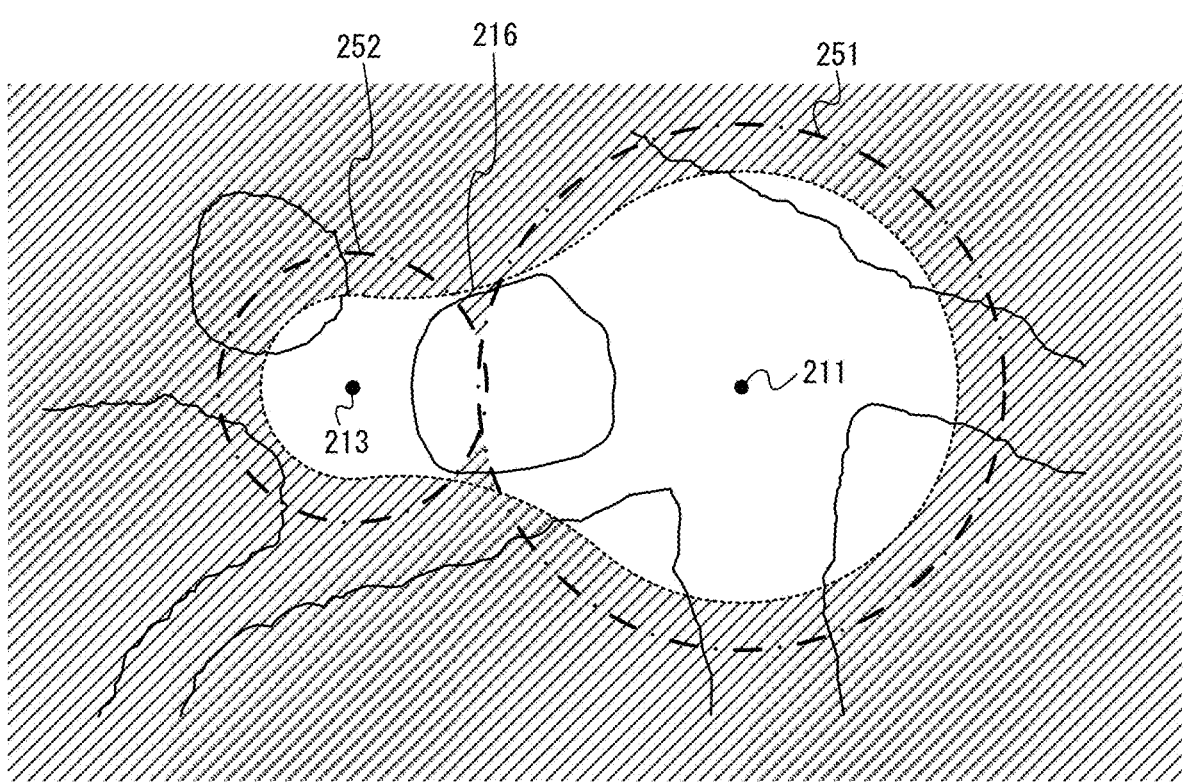
FIG. 19 is a view showing the field where two reference locations are liberated as viewed from above.

The irradiated range set in response to the occurrence of a liberation event as an irradiation event is set based on the reference location corresponding to this liberation event. Referring to FIG. 18 and FIG. 19, the method for setting the irradiated range in response to the occurrence of a liberation event will be described.

FIG. 18 is a view showing the field where one reference location is liberated as viewed from above. The situation shown in FIG. 18 is the situation where the reference location 211 shown in FIG. 9 is liberated. In the present embodiment, the game system 1 sets the irradiated range based on the liberated area (the area 212 in FIG. 18) based on the liberated reference location and the location affected range corresponding to the reference location (a location affected range 251 in FIG. 18). Note that the "location affected range corresponding to the reference location" is a range predetermined for each reference location. In the present embodiment, the range within a predetermined distance from the reference location is set as the location affected range. Note that this predetermined distance is set for each reference location, and may be a different value for each reference location or the same value for different reference locations. For example, the location affected range at each reference location may be set so that a part of the field is outside the location affected range even when all the reference locations are liberated, or may be set so that the entire field is within the location affected range in that case. In the former case, there will be portions of the field that are outside the irradiated range even if all the reference locations are liberated.

In the present embodiment, the game system 1 sets, as the irradiated range, a range of the field that is within the location affected range and within the liberated area. In the example shown in FIG. 18, since the liberated area 212 is inside the location affected range 251, the same range as the liberated area 212 is the irradiated range. Note that in FIG. 18, the area outside the irradiated range is shown as a hatched area. In the present embodiment, the location affected range is set for each reference location as described above, and is independent of the liberated area corresponding to the location affected range. Therefore, the location affected range may be set to be larger than the liberated area corresponding to the location affected range (i.e., so that the liberated area is included within the location affected range), may be set to be smaller than the liberated area (i.e., so that the location affected range is included within the liberated area), or may be set to be the same as the liberated area. Note that "the liberated area corresponding to the reference location" is the liberated area set when only the reference location is liberated.

Note that the irradiated range may be set by any method to include at least a part of the liberated area. For example, in other embodiments, the game system 1 may set the liberated area as it is as the irradiated range, or may set a range that is within at least one of the liberated area and the location affected range as the irradiated range.

FIG. 19 is a view showing the field where two reference locations are liberated as viewed from above. The situation shown in FIG. 19 is a situation where the reference locations 211 and 213 shown in FIG. 11 have been liberated.

When the two reference locations 211 and 213 are liberated as shown in FIG. 19, the liberated area 216 indicated by the dotted line in FIG. 19, as shown in FIG. 11. As described above, the game system 1 sets, as the irradiated range, a range that is within the location affected range corresponding to the liberated reference location and within the liberated area. Therefore, in the example shown in FIG. 19, the irradiated range is a range that is within at least one of the location affected range 251 corresponding to the reference location 211 and the location affected range 252 corresponding to the reference location 213, and within the liberated area 216. Note that in FIG. 19, the area outside the irradiated range is shown as a hatched area.

In the example shown in FIG. 19, the location affected range 251 is set to be larger than the liberated area in the case where only the reference location 211 is liberated (i.e., the area 212 shown in FIG. 18) and the location affected range 252 is set to be larger than the liberated area in the case where only the reference location 213 is liberated. Therefore, when the two reference locations 211 and 213 are liberated, even a range that is not to be an irradiated range when only one of the reference locations 211 and 213 is liberated becomes an irradiated range. For example, in the example shown in FIG. 19, the location affected ranges 251 and 252 are set to partially overlap with each other, so that when the two reference locations 211 and 213 are liberated, one irradiated range is set that continuously extends from the reference location 211 to the reference location 213. According to the above, by liberating the two reference locations 211 and 213, the player can easily search the field between these two reference locations 211 and 213.

On the other hand, for two other reference locations that are different from the reference locations 211 and 213, the location affected range corresponding to the reference locations may be set to be equal to or smaller than the liberated area when only the reference locations are liberated. In this case, unlike the example shown in FIG. 19, even when the two reference locations are liberated, the irradiated range is not set to continuously extend between the two reference locations, but two non-continuous irradiated ranges are set.

As described above, in the present embodiment, the size and the shape of the irradiated range can be set freely by setting the location affected range independently of the liberated area and setting the irradiated range based on the liberated area and the location affected range. For example, when two reference locations are liberated, the irradiated range can be set to continuously extend between the two reference locations, or two non-continuous irradiated ranges can be set.

Note that although the details will be described later, in the present embodiment, for the irradiated range set by a liberation event, the game system 1 displays the irradiated range as visible by the ambient light described above.

As described above, in the present embodiment, an example of an irradiation event is an event (i.e., a liberation event) that occurs when a predetermined operation input is performed when the player character is located at the event occurring position (i.e., a reference position) set in the field. In this case, the game system 1 sets the irradiated range so as to include a predetermined range including the event occurring position (specifically, the range of the liberated area based on the reference location or the location affected range). According to this, it is possible to provide the game in which the player character expands the irradiated range by arriving at event occurring positions. The shape of the irradiated range may be a shape based on the distance from the event occurring position as described above, or it may be in other embodiments a predetermined shape that includes the event occurring position.

Figure 20:
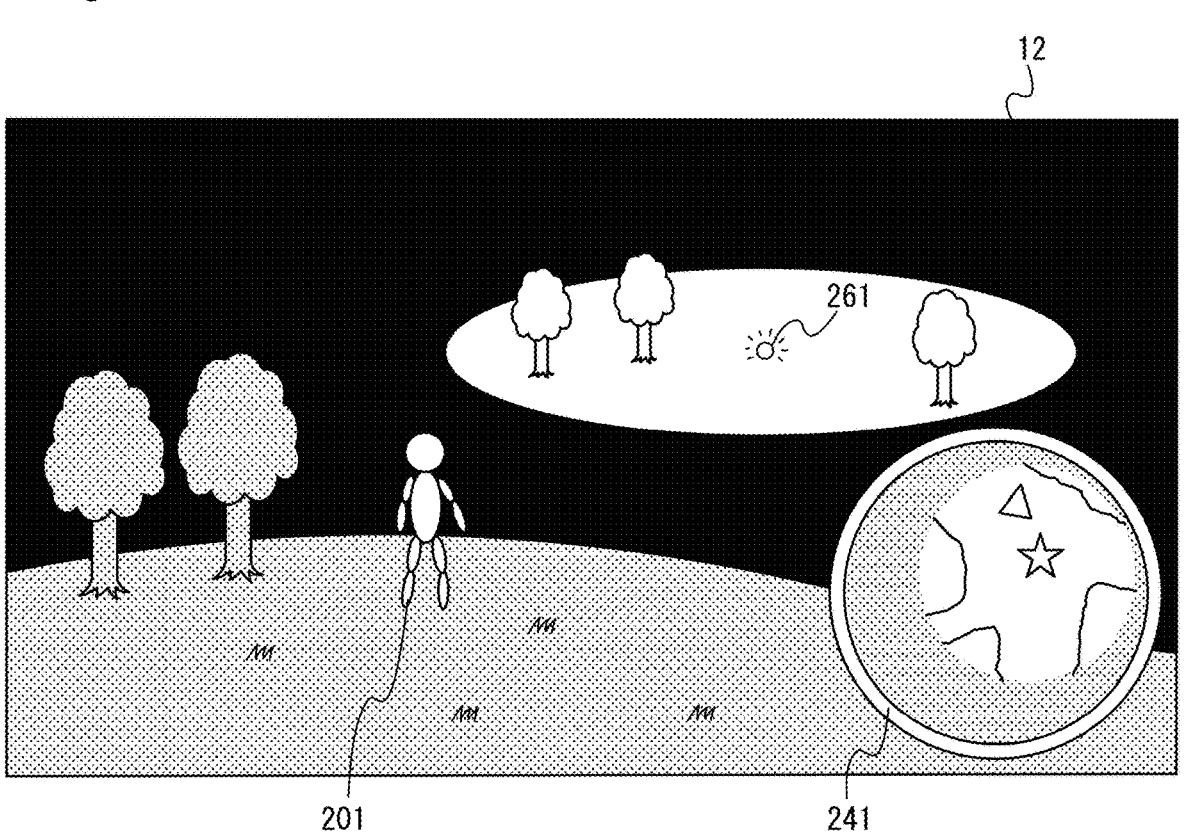
FIG. 20 is a view showing an example of a game image showing the field where a light source item is arranged.

In the present embodiment, the irradiated range is set also by the item arrangement event. FIG. 20 is a view showing an example of a game image showing the field where a light source item is arranged. The situation shown in FIG. 20 is a situation in which a light source item 261 is arranged at a position outside the irradiated range in the field. The light source item 261 is an object for which a light source (specifically, a point light source) is set at the position of the item. In the present embodiment, the player character 201 can arrange a predetermined light source item on the field. For example, the player character 201 arranges the light source item on the ground by arranging the item on the ground at the feet of the player character 201, by throwing the item, or by shooting the item with a bow and arrow. In the present embodiment, the player character 201 can own the light source item as an item and can arrange the light source item on the ground at any timing desired by the player. In other embodiments, an item such as a torch and a candle, for example, may be used as the light source item.

When the light source item 261 is arranged on the ground in the field, the game system 1 sets a range around the light source item (called the "item affected range") as the irradiated range. The item affected range is, for example, a range within a predetermined distance from the position of the light source item 261. In the example shown in FIG. 20, by arranging the light source item 261 at a position outside the irradiated range in the field, the item affected range based on that position becomes the irradiated range, and the field within that range is displayed as visible. Thus, in the present embodiment, the player can expand the visible range in the field also by arranging light source items in addition to liberating reference locations. For example, when the player character 201 advances through a dark area (i.e., an area outside the irradiated range) toward an unliberated reference location, the player can arrange a light source item in this area to advance through the field while keeping visibility.

In the present embodiment, for an irradiated range set by an item arrangement event (i.e., an item affected range), the game system 1 renders the game image while reflecting the point light source set at the position of the light source item. That is, for an irradiated range set by an item irradiation event, rendering is performed while taking into consideration the point light source in addition to the ambient light described above. Note that the details of the game image rendering process will be described below.

Figure 21:
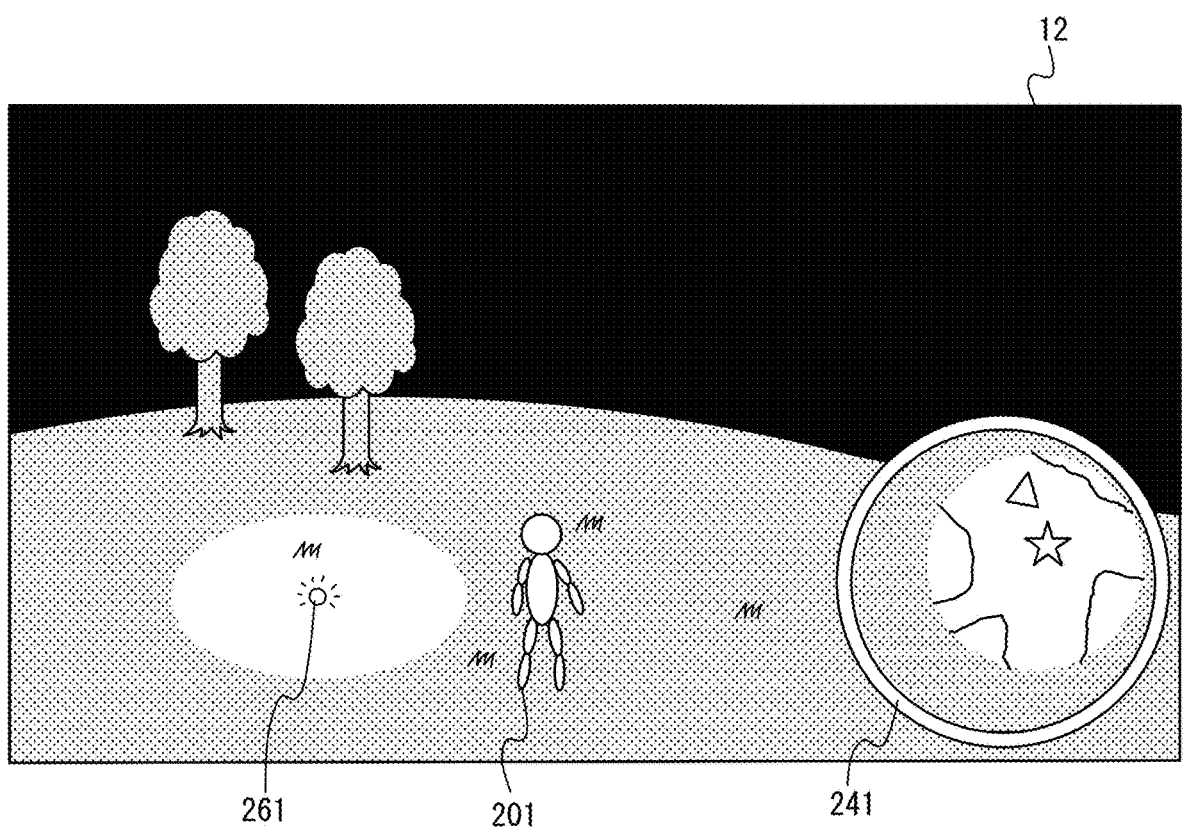
FIG. 21 is a view showing an example of a game image showing the field where a light source item is arranged within an irradiated range by a liberation event.

FIG. 21 is a view showing an example of a game image showing the field where a light source item is arranged within an irradiated range by a liberation event. In this case, the item affected range by the light source item 261 is rendered while reflecting the ambient light and the point light source, so that it is displayed brighter than outside the item affected range and within the irradiated range by the liberation event. Note that in FIG. 21, the range within the irradiated range and outside the item affected range is shown as a shaded area, and the item affected range is shown as a white area. Thus, according to the present embodiment, the player can easily recognize that the light source item 261 has been arranged.

Note that when the light source item 261 is arranged within the irradiated range by the liberation event as shown in FIG. 21, the game system 1 sets the item affected range by the light source item 261 as the irradiated range, as when the item is arranged outside the irradiated range. Note however that if the entire item affected range has already been set to the irradiated range, the irradiated range in the field does not change as a result.

As described above for the three types of irradiation events (i.e., a character illumination event, a liberation event and an item arrangement event), in the present embodiment, a light source (specifically, ambient light) is set in the field with a predetermined brightness regardless of the position in the field. In the rendering process, the game system 1 renders at least parts of the terrain objects in the field (e.g., the ground object shown in FIG. 17) that are included in the irradiated range while reflecting the light source. According to this, a certain brightness is ensured for the irradiated range, so that the irradiated range can be easily seen (e.g., without being displayed dark due to shadows of the terrain) regardless of the shape of the terrain of the field, etc.

Furthermore, in the present embodiment, a point light source is set in addition to the ambient light. That is, the game system 1 further sets up a point light source in the field in response to the occurrence of a predetermined event (specifically, a liberation event and an item arrangement event). In addition, in the rendering process, the game system 1 renders parts of at least some terrain objects in the field that are included in the irradiated range by further reflecting the point light source. According to this, it is easier for the player to recognize that the predetermined event has occurred and that the field has become brighter due to the occurrence of the predetermined event.

Note that there is no limitation on the types of light sources to be set on the field. In other embodiments, for example, a light source of a shape other than a point light source may be set in the field together with ambient light. A point light source may not be arranged and only ambient light may be set in the field.

In the present embodiment, the predetermined event is an event of arranging a predetermined item (specifically, a light source item) on the field. In this case, the game system 1 sets the position of the point to be the reference based on the position where the item is arranged, and sets the irradiated range based on the distance from the point to be the reference so that the irradiated range includes the range where the distance is less than or equal to a threshold value (i.e., the item affected range). According to this, it is easy for the player to set irradiated ranges at desired positions by arranging items.

Note that "an event of arranging a predetermined item on the field" is not limited to an event that occurs when a predetermined item is simply arranged on the field, but also includes an event that occurs when a predetermined item is arranged on the field under certain conditions. For example, an "event of arranging a predetermined item on the field" may be an event that occurs on the condition that a certain impact is applied to the item arranged on the field. The condition may be that a certain impact be applied by a fall when a predetermined item falls onto the field, or that a certain impact be applied by another object to the predetermined item arranged on the field.

Note that the event for which the point light source is set is not limited to an item arrangement event, but may be any other type of an event. For example, in other embodiments, the game system 1 may set a point light source at the position of the player character 201 in response to the occurrence of a character illumination event, and render the character affected range while reflecting the point light source to display the irradiated range as visible.

As described above for the three types of irradiation events (i.e., a character illumination event, a liberation event and an item arrangement event), in the present embodiment, a point to be the reference for the irradiated range is set in the virtual space in response to the occurrence of a predetermined event (specifically, an irradiation event). Then, based on the distance from the point to be the reference, the irradiated range is set so as to include a range where the distance is less than or equal to the threshold value. According to this, in response to the occurrence of an event, the position according to the event and the vicinity thereof can be set as the irradiated range.

Note that "the range where the distance is less than or equal to the threshold value" is a character affected range in a character illumination event, is a range of a location affected range or a liberated area in a liberation event, and is an item affected range in an item arrangement event.

In the present embodiment, "the point to be the reference for the irradiated range" is the position of the player character 201 in a character illumination event, the position of the reference location in a liberation event, and the position of the light source item in an item arrangement event. Note however that "the point to be the reference for the irradiated range" does not strictly need to be such a position, but may be a position determined based on such a position. For example, "the point to be the reference for the irradiated range" may be the position of the player character 201, the position of the reference location, or a position that is slightly off from the position of the light source item.

In the present embodiment, an irradiated range that is set in response to the occurrence of an irradiation event may be controlled so as to gradually expand from the time of occurrence. That is, the game system 1 may expand the irradiated range by increasing the threshold value for determining the irradiated range over time after the point to be the reference described above is set in response to the occurrence of an irradiation event. Note that the threshold value is a threshold value of distance that is set for the character affected range in a character illumination event, is a threshold value of distance that is set for the location affected range in a liberation event, and is a threshold value of distance that is set for the item affected range in an item arrangement event. According to this, when an irradiation event occurs, it is possible to display how a bright area in the field expands gradually. Note that in the above description, the irradiated range is controlled so as to stop expansion after passage of a predetermined period of time. The game system 1 does not need to gradually expand the irradiated range for all irradiation events, but may perform a control of gradually expanding the irradiated range for predetermined events (e.g., a liberation event and an item arrangement event) among all the irradiation events.

As described above, in the present embodiment, a predetermined object is displayed visible even when the object is located outside the irradiated range. Hereafter, such an object will be referred to as an "exempted object". Specifically, in the present embodiment, exempted objects include predetermined types of characters and self-luminous objects. More specifically, the predetermined types of characters are player characters and enemy characters. Self-luminous objects are objects that are set to be displayed as if they are glowing themselves in the render settings. For example, the landmark object 203 described above is a self-luminous object.

Although the details will be described later, when rendering the game image, the game system 1 renders exempted objects based on the rendering settings that are pre-set for the exempted objects, rather than the rendering settings that do not reflect the light source described above, even if the objects are located outside the irradiated range. In the present embodiment, when a predetermined type of a character is located outside the irradiated range, the character is rendered visible while being shaded. Thus, a predetermined type of a character appears distinguishable from other objects outside the irradiated range, which is displayed dark.

For a self-luminous object, even if it is located outside the irradiated range, it is rendered based on rendering settings such as emission that are set for the object. As a result, a self-luminous object is displayed distinguishable from other objects outside the irradiated range, which is displayed dark, like the landmark object 203 shown in FIG. 15, for example. As described above, in the present embodiment, an irradiation event is an event that occurs when a predetermined operation input is performed when the player character is located at an event occurring position that is set in association with a reference location in the field (i.e., a liberation event). Note that as shown in FIG. 15 and FIG. 16, landmark objects, which are self-luminous objects, are arranged in the field at positions corresponding to a plurality of reference locations (e.g., positions above the reference locations). The game system 1 renders a landmark object so that it is displayed distinguishable from other objects that are not included in the irradiated range, regardless of whether the landmark object is included in the irradiated range. According to this, the player can easily move the player character toward a reference location outside the irradiated range using the landmark object as a target.

[2-3 Image Generation Process]

Next, an example of a method for generating a game image in which a portion of the field outside the irradiated range is displayed dark (i.e., in such a manner that it is invisible or hardly visible) will be described. In the present embodiment, the game system 1 renders an object within the irradiated range while reflecting the light source set in the field, whereas the game system 1 renders an object outside the irradiated range (except for exempted objects described above) by rendering pixels corresponding to the object in black while not reflecting the light source. According to this, objects outside the irradiated range can be made invisible, thereby effectively motivating the player to liberate reference locations in order to search the field. A specific example of a method for generating a game image will now be described.

In the present embodiment, the game system 1 renders the game image using a method based on deferred rendering (referred to also as deferred shading or delayed shading). That is, the game system 1 executes the rendering process through the first to third stages to be described below during a single frame.

In the first stage, the game system 1 writes information used for rendering for each object in the virtual space (including character objects and terrain objects) into a G buffer (geometry buffer). The G buffer contains, for each pixel to be drawn, for example, information on the normal of the polygon corresponding to the pixel, information on the color of the polygon corresponding to the pixel, etc. In the present embodiment, in addition to these information, coordinates representing the position on the field corresponding to the pixel, information indicating that the pixel is a pixel in which an exempted object is rendered, etc., are stored in the G buffer. In the first stage, the game system 1 also writes the depth (depth) information of a position on the field to the depth buffer for each pixel corresponding to that position.

In the second stage, the game system 1 writes information regarding lighting to the light buffer based on information written to the G buffer and the depth buffer and information on the light source set in the field. In the light buffer, for example, for each pixel to be rendered, information representing the brightness at the corresponding position on the field is written. Note that while the game system 1 performs a calculation regarding lighting in the second stage in the present embodiment, a calculation regarding lighting may be performed in the third stage to be described below, where rendering to the frame buffer is performed, in other embodiments.

In the present embodiment, in the second stage, the game system 1 generates data of a darkness mask. The darkness mask is data that represents, for each pixel to be rendered, whether the position on the field corresponding to the pixel is a position to be rendered dark (i.e., outside the irradiated range), or the degree to which it is rendered dark. In the present embodiment, the darkness mask represents, for each pixel, a darkness mask value that represents the degree to which it is rendered in the color representing darkness (black in the present embodiment as described above). For example, the darkness mask value is a value that is equal to or greater than 0 and less than or equal to 1, wherein it is set to 1 for pixels to be rendered in a color representing darkness and is set to 0 for pixels that do not reflect a color representing darkness. Where the darkness mask value is an intermediate value (i.e., a value that is greater than 0 and less than 1), the larger the intermediate value, the greater the degree to which the color representing darkness is reflected in the pixel. In the present embodiment, the darkness mask value is set to 1 for pixels corresponding to positions outside the irradiated range, and the darkness mask value is set to a value less than 1 for pixels corresponding to positions within the irradiated range. Therefore, it can be said that the darkness mask is data representing the irradiated range in the field. Although the details will be described later, the darkness mask is generated based on the irradiated range in the virtual space and the coordinate data representing the position on the field stored in the G buffer. Furthermore, it is a value that does not reflect darkness for pixels corresponding to pixels where the exempted object described above is rendered. Note that in other embodiments, the darkness mask value may be set to be equal to or greater than a predetermined value (the predetermined value is a value larger than 0 and less than 1) for pixels corresponding to positions outside the irradiated range, and the darkness mask value may be set to a value less than the predetermined value for pixels corresponding to positions within the irradiated range. While the darkness mask value is a multi-valued value ranging from 0 to 1 in the present embodiment, the darkness mask value may be a binary value of 0 or 1 in other embodiments.

In the third stage, the game system 1 writes, to the frame buffer, the pixel values of the field image representing the field reflecting the influence of light from the light source and darkness based on the information written to the buffers (i.e., the G buffer, the depth buffer and the light buffer) and the darkness mask. That is, the game system 1 writes, to the frame buffer, pixel values reflecting the light source in the virtual space based on the information in the G buffer and the light buffer, wherein the pixel values are overwritten with black based on the darkness mask.

Figure 22:
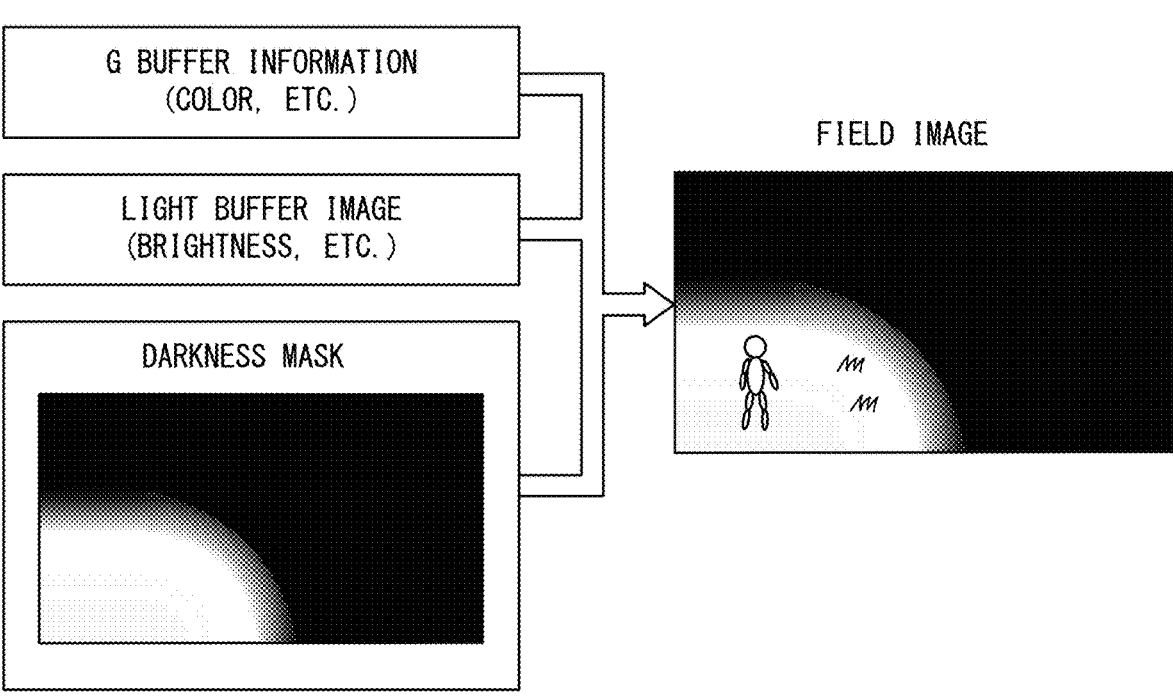
FIG. 22 is a view showing an example of a method for generating a field image to be written to the frame buffer.

FIG. 22 is a view showing an example of a method for generating a field image to be written to the frame buffer. As shown in FIG. 22, the pixel value of each pixel in the field image is calculated based on color information stored in the G buffer, brightness information stored in the light buffer, and the darkness mask value of the darkness mask. First, by reflecting the brightness information stored in the light buffer, it is possible to obtain a field image that reflects light from light sources. That is, it is possible to obtain a field image that is expressed as if it were illuminated by ambient light and point light sources. Furthermore, by using the darkness mask, it is possible to generate a field image that is expressed as darkness outside the irradiated range (see FIG. 22). Thus, the game system 1 can obtain a field image that is expressed as if it were illuminated by ambient light and light from point light sources within the irradiated range, and a field image that is expressed as darkness outside the irradiated range.

For the darkness mask shown in FIG. 22, positions where the darkness mask value is 1 are shown in black, positions where the darkness mask value is 0 are shown in white, and positions where the darkness mask value is an intermediate value are shown in gray so that the larger the value, the closer to black. For irradiated ranges based on a character illumination event or an item arrangement event, the darkness mask value is set so that it is 0 for pixels corresponding to positions within a predetermined distance from the reference point of the irradiated range, it gradually increases in accordance with the distance from the reference point for pixels corresponding to positions farther away from the reference point than the predetermined distance, and it is 1 for pixels corresponding to positions outside the irradiated range. Note that the reference point for an irradiated range is a position to be the reference for the irradiated range; specifically, it is the reference position for an irradiated range based on a liberation event, it is the position of the player character for an irradiated range based on a character illumination event, and it is the position of the light source item for an irradiated range based on an item arrangement event.

For an irradiated range based on a liberation event, the game system 1 calculates two-dimensional range data used to calculate the darkness mask value, and generates a darkness mask based on the two-dimensional range data and the horizontal plane component of the coordinate data stored in the G buffer that represents a position on the field. The two-dimensional range data is data representing the degree value used to calculate the darkness mask value for each two-dimensional position in the field corresponding plane described above. The two-dimensional range data can be said to be data representing an irradiated range in the field. Note that while two-dimensional range data regarding a position in the two-dimensional plane is generated as data representing an irradiated range in the present embodiment, data representing an irradiated range may be data representing a position in a three-dimensional field in other embodiments.

The degree value described above, like the darkness mask value, is a value representing the degree to which the image is rendered dark in the rendering process. For example, the degree value changes so that it is maximum at the reference point of the irradiated range, gradually decreases in accordance with the distance from the reference point, and becomes 0 outside the irradiated range. Therefore, the degree value can be calculated based on a value that attenuates in accordance with the distance from the reference point of the irradiated range. In the present embodiment, the irradiated range based on the liberation event is set based on the liberated area set based on the total decision value described above and the location affected range based on the distance from the reference location. Therefore, the degree value for the irradiated range based on the liberation event can be calculated based on the total decision value described above and the value that attenuates in accordance with the distance from the reference location.

Next, the game system 1 calculates the darkness mask value at each pixel based on the degree value at each position corresponding to the pixel. For example, the degree value can be scaled to a range equal to or greater than 0 and less than or equal to 1, and the darkness mask value can be obtained as a value that is obtained by subtracting the scaled value from 1. By using the darkness mask value calculated as described above, it is possible to generate a darkness mask that reflects the irradiated range based on the liberation event. Note that if the range of the liberated area is the same as the location affected range, the map mask described above may be used as two-dimensional range data.

As described above, in the present embodiment, the game system 1 generates, in response to occurrence of a liberation event, two-dimensional range data representing the irradiated range in the field in a plan view such that a range of the field that corresponds to the event occurring position (i.e., the position of the reference location) is at least the irradiated range, and a darkness mask is generated based on the two-dimensional range data.

Further, in the present embodiment, the game system 1 generates the darkness mask in the second stage of the rendering process so as to reflect an irradiated range based on the position of the player character and an irradiated range based on the position of a point light source set for a light source item. Thus, a darkness mask is generated that reflects irradiation events (i.e., a liberation event, a character illumination event and an item arrangement event).

Note that there is no limitation on the method for calculating the darkness mask value, and it is not limited to the method described above. For example, in other embodiments, the game system 1 may directly generate the darkness mask in the rendering process without generating the two-dimensional range data. That is, in the second stage of the rendering process, the game system 1 may generate a darkness mask reflecting the irradiated range based on the liberation event based on the total decision value for positions on the field corresponding to pixels and a value that attenuates in accordance with the distance from the reference location.

As described above, in the present embodiment, in the rendering process, the game system 1 generates a mask data (i.e., data of the darkness mask) at least indicating whether or not, for each pixel, a position of the terrain object corresponding to the pixel is included in the irradiated range, for at least some terrain objects. Then, for pixels where the mask data indicates that the position of the terrain object is included in the irradiated range, rendering on the frame buffer is performed while reflecting light sources. Pixels where the mask data indicates that the position of the terrain object is not included in the irradiated range are rendered on the frame buffer in a predetermined color. According to this, it is possible by using the mask data to generate a field image in which areas outside the irradiated range are expressed in an invisible or hardly visible manner. The predetermined color is black, for example. However, it is not limited to black, but can also be gray or any other color. It is not limited to a single color, but may be rendered as an image having a predetermined pattern.

In the present embodiment, the mask data is data that indicates for each pixel the degree to which the predetermined color is rendered. In the rendering process, the game system 1 writes to the frame buffer a pixel value that is obtained by combining the predetermined color to the degree described above with a pixel value calculated while reflecting light sources (i.e., a pixel value based on information of color stored in the G buffer and information of brightness stored in the light buffer). According to this, the degree of darkness can be expressed at multiple levels. For example, as described above, by setting the degree value so that it is maximum at the reference point of the irradiated range, gradually decreases in accordance with the distance from the reference point, and becomes 0 outside the irradiated range, it is possible to generate a field image in which the darkness gradually becomes darker at the boundary of the irradiated range (see FIG. 22).

In the present embodiment, the game system 1 generates, for each two-dimensional coordinate corresponding to a coordinate component other than the height direction of the field, two-dimensional range data representing the degree value that represents the degree of rendering darker in the rendering process. The game system 1 calculates the degree value based on the total decision value and, for each of the coordinates, a value that becomes the reference value at a two-dimensional position corresponding to the reference location and that attenuates in accordance with the two-dimensional distance from the two-dimensional position to the coordinate. For each pixel to be rendered in the frame buffer, the rendering process writes, to the frame buffer, a pixel value that is obtained by combining a predetermined color (i.e., black) in accordance with the degree value at the two-dimensional coordinates corresponding to the pixel (in other words, in accordance with the darkness mask value based on the degree value) represented by the two-dimensional range data with a pixel value calculated while reflecting light sources set in the field. According to the above, the predetermined color can be reflected in steps in the image representing the field. Thus, it is possible to generate a field image so as to gradually become darker in the vicinity of the boundary of the irradiated range, for example, and thus to generate a field image that looks more natural.

In the present embodiment, the game system 1 renders an exempted object described above by a method that is set for each object, rather than using black that represents darkness. Specifically, in the first stage, the game system 1 writes data of the exempt mask for the exempted object to the G buffer. The exempt mask is data that represents pixels corresponding to the position of the exempted object. It can be said that the exempt mask indicates that the pixel corresponding to the exempted object is exempted from the application of the darkness mask. Note that the game system 1 writes data representing the rendering method set for the exempted object (e.g., that it is self-luminous or that a predetermined shade is applied) to the G buffer.

In the third stage of the rendering process, the game system 1 renders pixels represented by the exempt mask in a manner that is set for the exempted object, regardless of the darkness mask value of the darkness mask. Thus, an exempted object is not rendered as dark even outside the irradiated range, but is rendered by a method that is set. Note that in the second stage, a value indicating that pixels represented by the exempt mask are not dark may be written to the darkness mask.

As described above, in the present embodiment, in the first stage of the rendering process, the game system 1 writes to the G buffer and the depth buffer for each pixel for the exempted object, and also generates the data of the exempt mask. Then, in the third stage of the rendering process, the game system 1 renders the pixels represented by the exempt mask data in such a manner that it is possible to visually distinguish between a part of the terrain object that is not included in the irradiated range and the exempted object (e.g., in a manner that makes it appear as if it is self-luminous or in such a manner that a predetermined shade is applied). According to this, the game system 1 can display the exempted object in such a manner that the exempted object is visible even if it is outside the irradiated range.

As described above, in the present embodiment, the game system 1 renders the object outside the irradiated range as dark by a rendering process based on so-called deferred rendering. That is, in the first stage, the game system 1 writes at least some terrain objects in the field to the G buffer and the depth buffer. In the second stage, for each pixel, the game system 1 generates darkness mask data based on the position corresponding to the pixel, the depth value stored in the depth buffer, and the irradiated range. In the third stage, the game system 1 renders to the frame buffer based on at least the data stored in the G buffer and the darkness mask data. According to the above, the game system 1 can render objects outside the irradiated range in an invisible or hardly visible manner by applying the technique of deferred rendering.

Note that in other embodiments, there is no limitation on the method for rendering objects outside the irradiated range as dark, and the method is not limited to the rendering process based on deferred rendering. In other embodiments, the rendering process may be executed based on forward rendering (also called forward shading). That is, in the rendering process, the game system 1 may determine for each pixel whether or not it is included in the irradiated range for at least some terrain objects (e.g., objects excluding the exempted objects), and may render pixels included in the irradiated range in the frame buffer while reflecting light sources and render pixels not included in the irradiated range in the frame buffer in a predetermined color (e.g., black). According to the above, the game system 1 can render objects outside the irradiated range in an invisible or hardly visible manner based on forward rendering.

[3. Specific Example of Process in Game System]

Next, referring to FIG. 23 to FIG. 27, a specific example of an information process in the game system 1 will be described.

Figure 23:
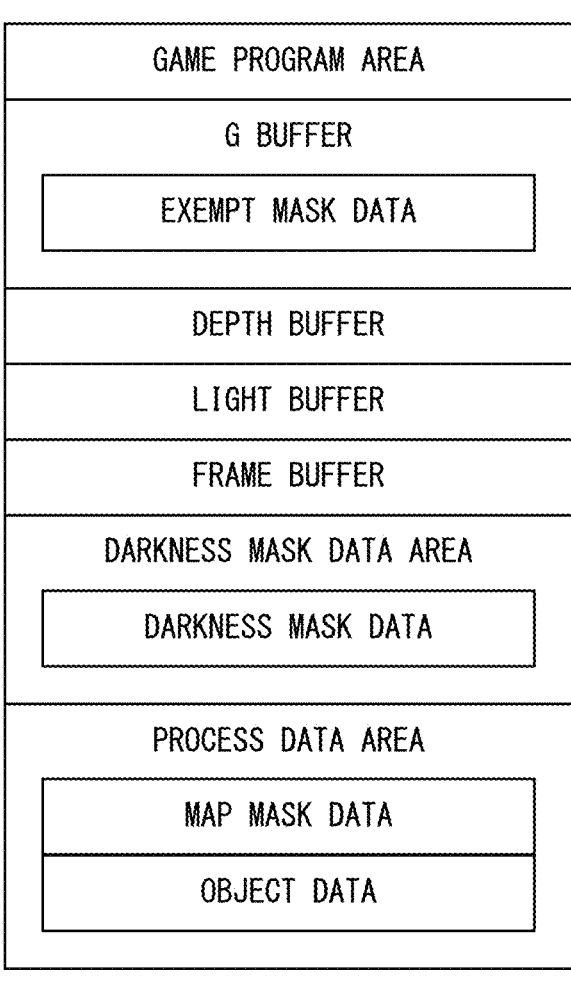
FIG. 23 is a diagram showing an example of a storage area for storing various data used in an information process in a non-limiting game system.

FIG. 23 is a diagram showing an example of a storage area for storing various data used in an information process in the game system 1. The storage areas shown in FIG. 23 are provided in a storage medium that can be accessed by the main body apparatus 2 (e.g., the flash memory 84, the DRAM 85 and/or a memory card attached to the slot 23, etc.). As shown in FIG. 23, the storage medium is provided with a game program area in which a game program is stored. The game program is for executing the game process in the present embodiment (specifically, the game process shown in FIG. 24). The storage medium is also provided with the G buffer, the depth buffer, the light buffer and the frame buffer.

The storage medium is provided with a darkness mask data area for storing data of the darkness mask described above. Note that the data of the exempt mask is stored in the G buffer. Furthermore, the storage medium is provided with a process data area for storing various data used in the game process. The process data area stores, for example, data of the map mask described above. For example, the process data area stores object data (e.g., data representing the position and the orientation of the object) regarding various objects appearing in the game (e.g., the player character and light source items).

Figure 24:
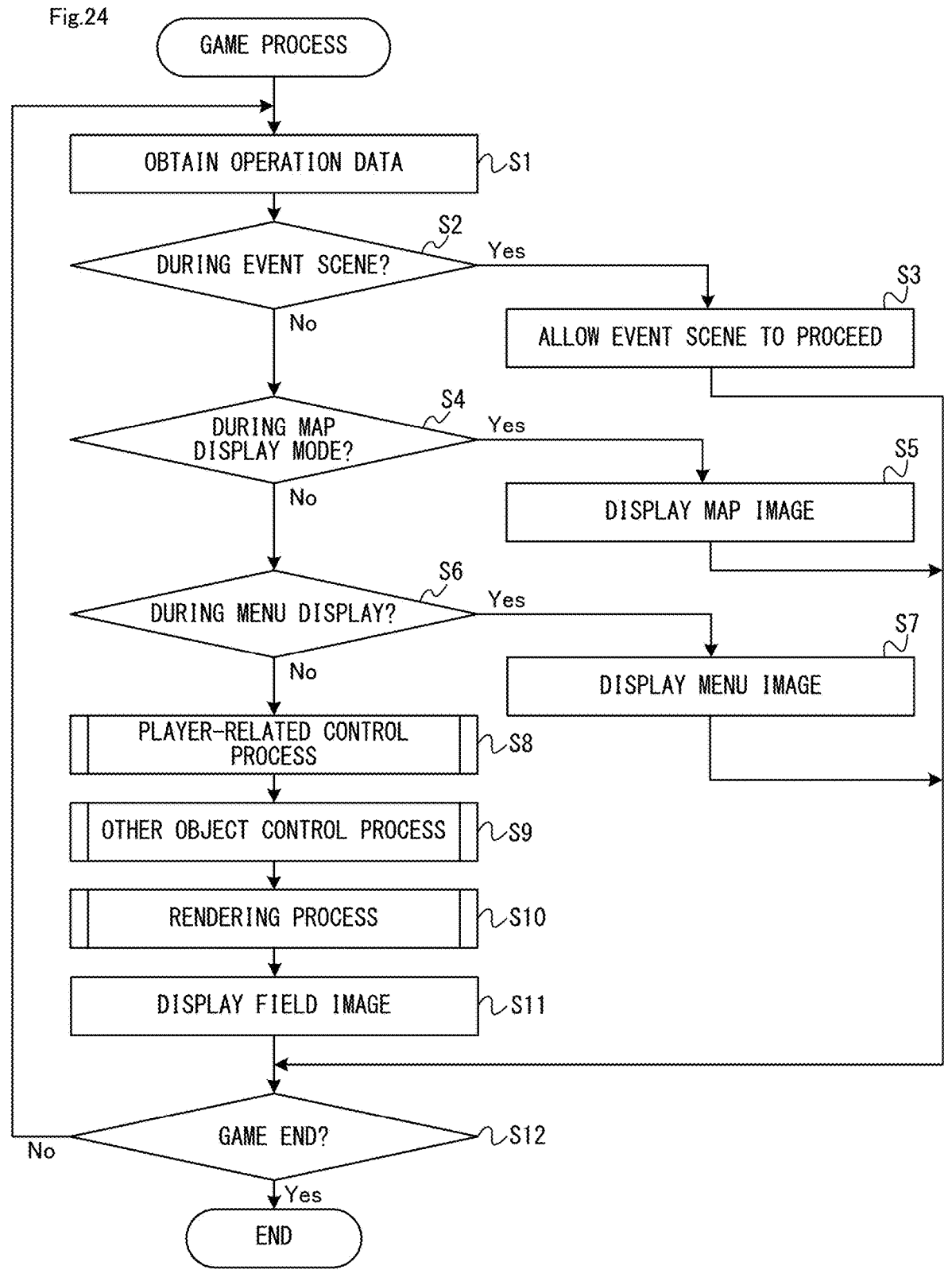
FIG. 24 is a flowchart showing an example of the flow of the game process to be executed by the non-limiting game system.

FIG. 24 is a flowchart showing an example of the flow of the game process to be executed by the game system 1. Execution of the game process is started, for example, during execution of the game program described above, in response to the game being started in response to an instruction by the player. Note that in the present embodiment, there are process modes in the game process, i.e., a field mode in which the field image representing the field is displayed, a map display mode in which the map image described above is displayed on the entire display 12, and a menu display mode in which the menu image is displayed. While there is no limitation on the process mode at the start of the game, it is assumed that the game is set to the field mode, for example.

Note that in the present embodiment, it is assumed that the processor 81 of the main body apparatus 2 executes the processes of the steps shown in FIG. 24 by executing the game program stored in the game system 1. Note however that in other embodiments, some of the processes of the steps may be executed by another processor (e.g., a dedicated circuit) different from the processor 81. When the game system 1 can communicate with another information processing apparatus (e.g., a server), some of the processes of the steps shown in FIG. 24 may be executed on the other information processing apparatus. The processes of the steps shown in FIG. 24 are merely illustrative, and the order of steps to be performed may be switched around or other processes may be executed in addition to (or instead of) the processes of the steps, as long as similar results are obtained.

The processor 81 executes the processes of the steps shown in FIG. 24 using a memory (e.g., the DRAM 85). That is, the processor 81 stores information (in other words, data) obtained in each process step in the memory, and when the information is used in a subsequent process step, the information is read out from the memory and used.

In step S1 shown in FIG. 14, the processor 81 obtains the operation data representing instructions by the player. That is, the processor 81 obtains operation data received from the controllers via the controller communication section 83 and/or the terminals 17 and 21. The process of step S2 is executed, following step S1.

In step S2, the processor 81 determines whether an event scene such as a liberation event is being executed. As described above, in the present embodiment, playback of animation of an event scene representing a liberation event is started in response to the occurrence of a liberation event (see step S26 to be described below). In step S2, the processor 81 determines whether the animation of the event scene is being played. If the determination result from step S2 is affirmative, the process of step S3 is executed. On the other hand, if the determination result from step S2 is negative, the process of step S4 is executed.

In step S3, the processor 81 advances the event scene being executed. That is, the processor 81 displays an image of the animation of the event scene on the display 12. Note that one frame of image is displayed in one iteration of step S3, and the process of step S3 is executed repeatedly during execution of the event scene, thereby playing the animation. Although rendering process similar to that performed in field mode in which the field image is displayed may be executed during an event, a different rendering process may be performed when a different scene is expressed. There is no limitation on the specific content of the different rendering process, and the details are omitted. Note that it is assumed in the present embodiment that an image generated by the game system 1 is displayed on the display 12, but the image may be displayed on another display device (e.g., a stationary monitor as described above). The process of step S12 to be described below is executed, following step S3.

In step S4, the processor 81 determines whether it is in the map display mode in which the map image is displayed. Although the details will be described later, in the present embodiment, the map display mode is started in response to a map display instruction given by the player while in the field mode in which the field image is displayed (see step S22 to be described below). If the determination result from step S4 is affirmative, the process of step S5 is executed. On the other hand, if the determination result from step S4 is negative, the process of step S6 is executed.

In step S5, the processor 81 displays the map image on the display 12. That is, the processor 81 generates the map image according to the method described in "[2-1. Setting liberated areas in map]" above, and displays the generated map image on the display 12. In step S5 (i.e., in the map display mode), the field image is not displayed but the map image is displayed over the entire area of the display 12 (see FIG. 10 and FIG. 12). In the map display mode, the processor 81 accepts an instruction to end the display of the map image, and if such an instruction is given, the processor 81 transitions the process mode to the field mode. In this case, the determination result in step S4 to be executed next becomes negative, and the field image is displayed in step S11 to be described below. The process of step S12 to be described below is executed, following step S5.

In step S6, the processor 81 determines whether it is in the menu display mode in which the menu image is displayed. Although the details will be described later, in the present embodiment, the menu display mode is started in response to a menu display instruction given by the player while in the field mode in which the field image is displayed (see step S22 to be described below). If the determination result from step S6 is affirmative, the process of step S7 is executed. On the other hand, if the determination result from step S6 is negative, the process of step S8 is executed.

In step S7, the processor 81 displays the menu image on the display 12. Here, in the present embodiment, the processor 81 accepts, in the menu display mode, at least an operation input for giving an instruction to change the equipment of the player character among various other operations. That is, the player can change the equipment of the player character in the menu image, and can equip the player character with the illuminating garment described above, for example. Note that although omitted from the flowchart shown in FIG. 24, in the menu display mode, an operation input for giving various instructions for the menu image (e.g., an instruction to change the equipment of the player character, an instruction to use an item, etc.) is accepted, and the processor 81 can change and display the content of the menu image according to such an operation input. In the menu display mode, the processor 81 accepts an instruction to end the display of the menu image, and when such an instruction is given, the processor 81 transitions the process mode to the field mode. In this case, the determination result in step S6 to be executed next becomes negative, and the field image is displayed in step S11 to be described below. The process of step S12 to be described below is executed, following step S7.

In step S8, the processor 81 executes the player-related control process. In the player-related control process, various processes (e.g., a control process related to the player character) are executed based on an operation input by the player. The details of the player-related control process will be described in the flowchart shown in FIG. 25 to be described below. The process of step S9 is executed, following step S8.

In step S9, the processor 81 executes the other object control process. In the other object control process, another object other than the player character (e.g., an enemy character, a light source item described above, etc.) is controlled. The details of the other object control process will be described in the flowchart shown in FIG. 26 to be described below. The process of step S10 is executed, following step S9.

In step S10, the processor 81 executes the process of rendering the field image representing the field. In the field image rendering process, a field image is generated in which the outside of the irradiated range is represented as dark as described above. The details of the rendering process will be described in the flowchart shown in FIG. 27 to be described below. The process of step S11 is executed, following step S10.

In step S11, the processor 81 displays the field image generated in step S10 on the display 12. Note that as shown in FIG. 15, etc., in the field mode, the processor 81 may further generate the map image in addition to the field image, and display the map image superimposed on the field image. The process of step S12 is executed, following step S11.

In step S12, the processor 81 determines whether or not to end the game. For example, when a predetermined operation input to end the game is performed by the player, the processor 81 determines to end the game. If the determination result from step S12 is negative, the process of step S1 is executed again. Thereafter, a series of processes of steps S1 to S12 is repeatedly executed until it is determined in step S12 to end the game. On the other hand, if the determination result from step S12 is affirmative, the processor 81 ends the game process shown in FIG. 24.

Figure 25:
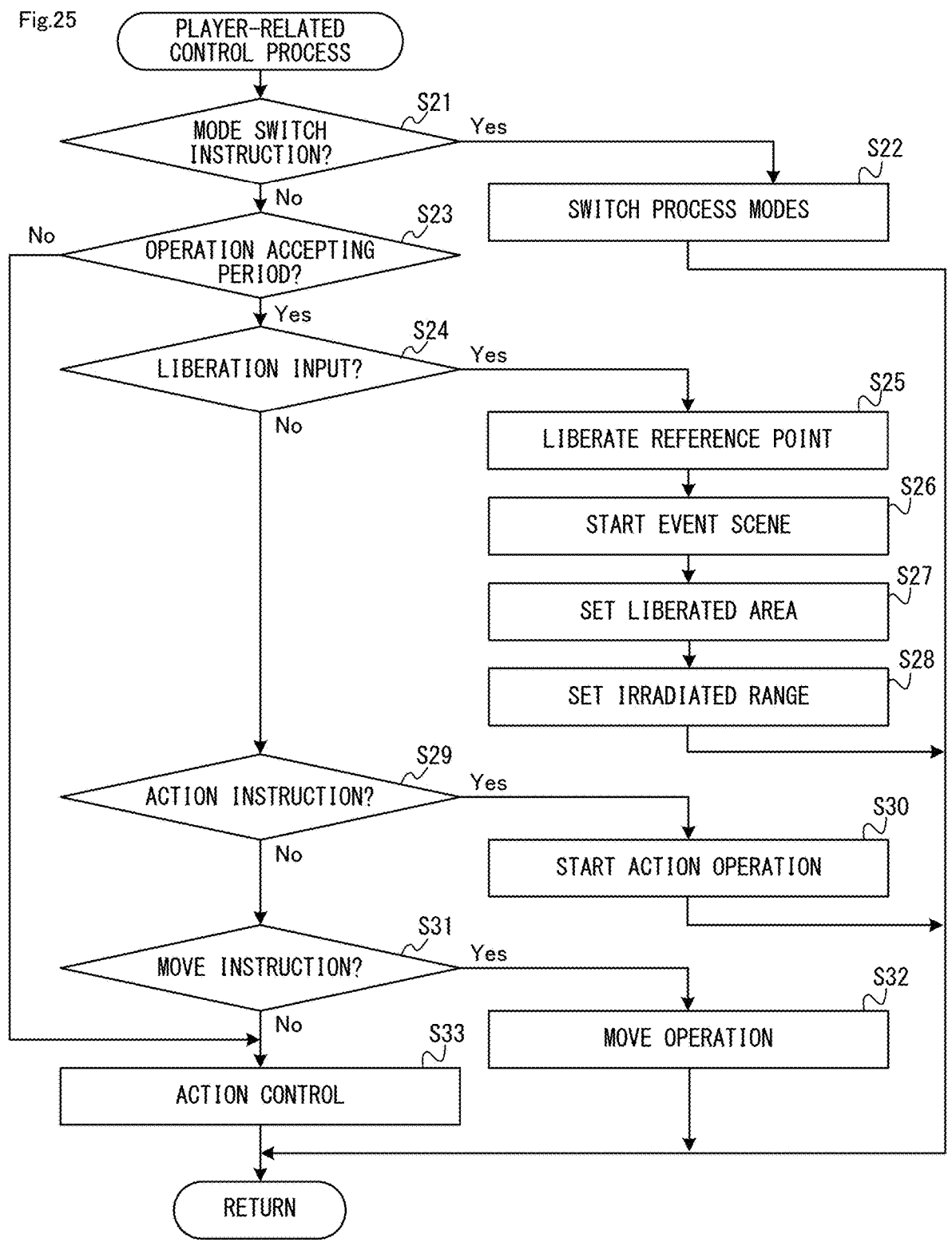
FIG. 25 is a sub-flowchart showing an example of the detailed flow of the player-related control process of step S8 shown in FIG. 24.

FIG. 25 is a sub-flowchart showing an example of the detailed flow of the player-related control process in step S8 shown in FIG. 24. In the player-related control process, first, in step S21, the processor 81 determines whether an instruction to switch the process mode described above is given by the player based on the operation data obtained in in step S1. Specifically, an instruction to switch the process mode is an instruction to display the map image or an instruction to display the menu image. If the determination result from step S21 is affirmative, the process of step S22 is executed. On the other hand, if the determination result from step S21 is negative, the process of step S23 is executed.

In step S22, the processor 81 switches the process mode in response to an instruction given in step S21. That is, if an instruction to display the map image is given, the processor 81 switches the process mode to the map display mode. In this case, the determination result in step S4 to be executed next becomes affirmative, and the process of displaying the map image is executed in step S5. When an instruction to display the menu image is given, the processor 81 switches the process mode to the menu display mode. In this case, the determination result in step S6 to be executed next becomes affirmative, and the process of displaying the menu image is executed in step S7. After step S22, the processor 81 ends the player-related control process.

In step S23, the processor 81 determines whether it is an operation accepting period during which an operation input to the player character is accepted. Here, in the present embodiment, the operation period during which the player character is performing a predetermined operation (e.g., an operation of being controlled in step S30 to be described below) in response to an operation input to the player character is excluded from the operating accepting period. If the determination result from step S23 is affirmative, the process of step S24 is executed. On the other hand, if the determination result from step S23 is negative, the process of step S33 to be described below is executed.

In step S24, the processor 81 determines whether an operation input to liberate the reference location has been performed based on the operation data obtained in step S1. That is, the processor 81 determines whether an input to execute a "examine" command has been performed while the player character is located in the vicinity of the reference location. If the determination result from step S24 is affirmative, the process of step S25 is executed. On the other hand, if the determination result from step S24 is negative, the process of step S29 to be described below is executed.

In step S25, the processor 81 sets the reference location to which the operation input has been performed in the liberated state. For example, the processor 81 updates the data stored in the memory representing the state of the reference location so as to indicate that reference location has been liberated. The processor 81 sets a point light source at the position of the landmark object representing the reference location. Thus, in the rendering process to be described below, rendering is done so that the vicinity of the landmark object is illuminated. The process of step S26 is executed, following step S25.

In step S26, the processor 81 starts an event scene for when a liberation event occurs. That is, the processor 81 starts playing an animation showing the vicinity of the liberated reference location gradually brightening. After the process of step S26, the determination result in step S2 is affirmative, thereby continuing the execution of the event scene, until the playback of the animation ends. The process of step S27 is executed, following step S26.

In step S27, the processor 81 sets the liberated area described above based on the reference location that is liberated in step S26. That is, the processor 81 generates the map mask representing the liberated area that is set according to the method described in "[2-1. Setting liberated areas in map]" above. Specifically, data of the map mask is stored in the memory at the start of the game process, and the processor 81 updates the data so that the data represents the liberated area that is set. As a result of the process of step S27, an area of the field including the liberated reference location is set as the liberated area. The process of step S28 is executed, following step S27.

In step S28, the processor 81 sets the irradiated range described above based on the reference location that is liberated in step S26. That is, the processor 81 generates the two-dimensional range data described above representing the irradiated range that is set according to the method described in "[2-2. Setting of irradiated range]" above. Specifically, the two-dimensional range data is stored in the memory at the start of the game process, and the processor 81 updates the data so that the data represents the irradiated range that is set. As a result of the process of step S27, an area of the field including the liberated reference location is set as the irradiated range. After step S28, the processor 81 ends the player-related control process. Note that the processes of step S25, S27 and S28 are not limited to this timing, but may be performed at a predetermined timing during the event scene thereafter.

In step S29, the processor 81 determines whether an operation input to give an action instruction to the player character has been performed based on the operation data obtained in step S1. The action instruction is an instruction to cause the player character to perform an attack operation or a jump operation, etc., for example. If the determination result from step S29 is affirmative, the process of step S30 is executed. On the other hand, if the determination result from step S29 is negative, the process of step S31 to be described below is executed.

In step S30, the processor 81 causes the player character to start an operation in accordance with the action instruction given in step S29. After the player character has started an operation in step S30, the player character is controlled to perform the operation over a certain period of time by the process of step S33 to be described below. After step S30, the processor 81 ends the player-related control process.

In step S31, the processor 81 determines whether an operation input to give a movement instruction to the player character has been performed based on the operation data obtained in step S1. The movement instruction is an instruction to cause the player character to move on the field. If the determination result from step S31 is affirmative, the process of step S32 is executed. On the other hand, if the determination result from step S31 is negative, the process of step S33 is executed.

In step S32, the processor 81 causes the player character to perform an operation of moving on the field in response to the movement instruction given in step S29. After step S32, the processor 81 ends the player-related control process.

In step S33, the processor 81 controls the player character to perform various operations such as continuing the operation that has been started in step S30 or an operation to be performed when no input has been given. Note that the processor 81 controls the player character to perform an operation for one frame period in one iteration of step S33. As the process of step S33 is executed repeatedly over multiple frames, the player character performs the series of operations in accordance with the action instruction. Note that if no operation to be performed by the player character is instructed by the player (e.g., if the operation started in step S30 has finished), in step S33, the processor 81 may not cause the player character to perform an operation, or may cause the player character to perform an operation for making the behavior of the player character look natural (e.g., the player character is caused to look around or sway the body back and forth). After step S33, the processor 81 ends the player-related control process.

Figure 26:
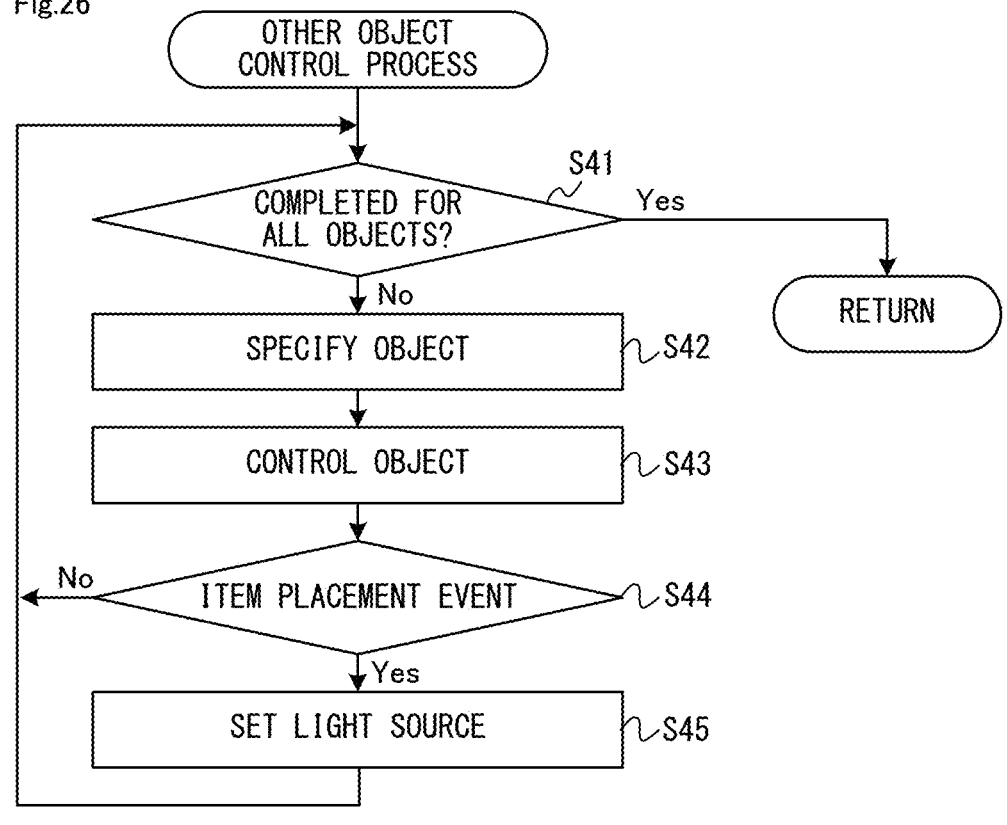
FIG. 26 is a sub-flowchart showing an example of the detailed flow of the other object control process of step S9 shown in FIG. 24.

FIG. 26 is a sub-flowchart showing an example of the detailed flow of the other object control process of step S9 shown in FIG. 24. In the other object control process, first, in step S41, the processor 81 determines whether the process has been completed for objects to be controlled, excluding the player character. That is, it is determined whether the objects have been specified in step S42 to be described below. If the determination result from step S41 is negative, the process of step S42 is executed. On the other hand, if the determination result from step S41 is affirmative, the processor 81 ends the other object control process.

In step S42, the processor 81 specifies one object to be the target of the process of step S43 to be described below, from among the objects to be controlled. Note that in step S42, an object that has not been the target of the process in the current iteration of the process loop of steps S41 to S45 is specified. The process of step S43 is executed, following step S42.

In step S43, the processor 81 controls the operation of the object specified in step S42. For example, when the object is an enemy character, the operation of the enemy character is controlled according to an algorithm defined in the game program. For example, if the object is a light source item, the movement of the light source item is controlled in response to an operation by another character such as the player character (e.g., in response to the player character performing an operation of throwing the light source item). The process of step S44 is executed, following step S43.

In step S44, the processor 81 determines whether an item arrangement event has occurred based on the result of the process of step S43. For example, for a light source item, when the light source item thrown by the player character has been arranged on the ground in the field, the processor 81 determines that an item arrangement event has occurred. If the determination result from step S44 is affirmative, the process of step S45 is executed. On the other hand, if the determination result from step S44 is negative, the process of step S41 is executed again.

In step S45, the processor 81 sets a point light source at the position of a light source item that has caused the item arrangement event. Therefore, in the rendering process to be described below, rendering is performed so that the vicinity of the light source item is illuminated. The process of step S41 is executed again, following step S45. Thereafter, a series of processes of steps S41 to S45 is repeatedly executed until it is determined in step S41 that the process has been completed for all the objects to be the target of control.

Figure 27:
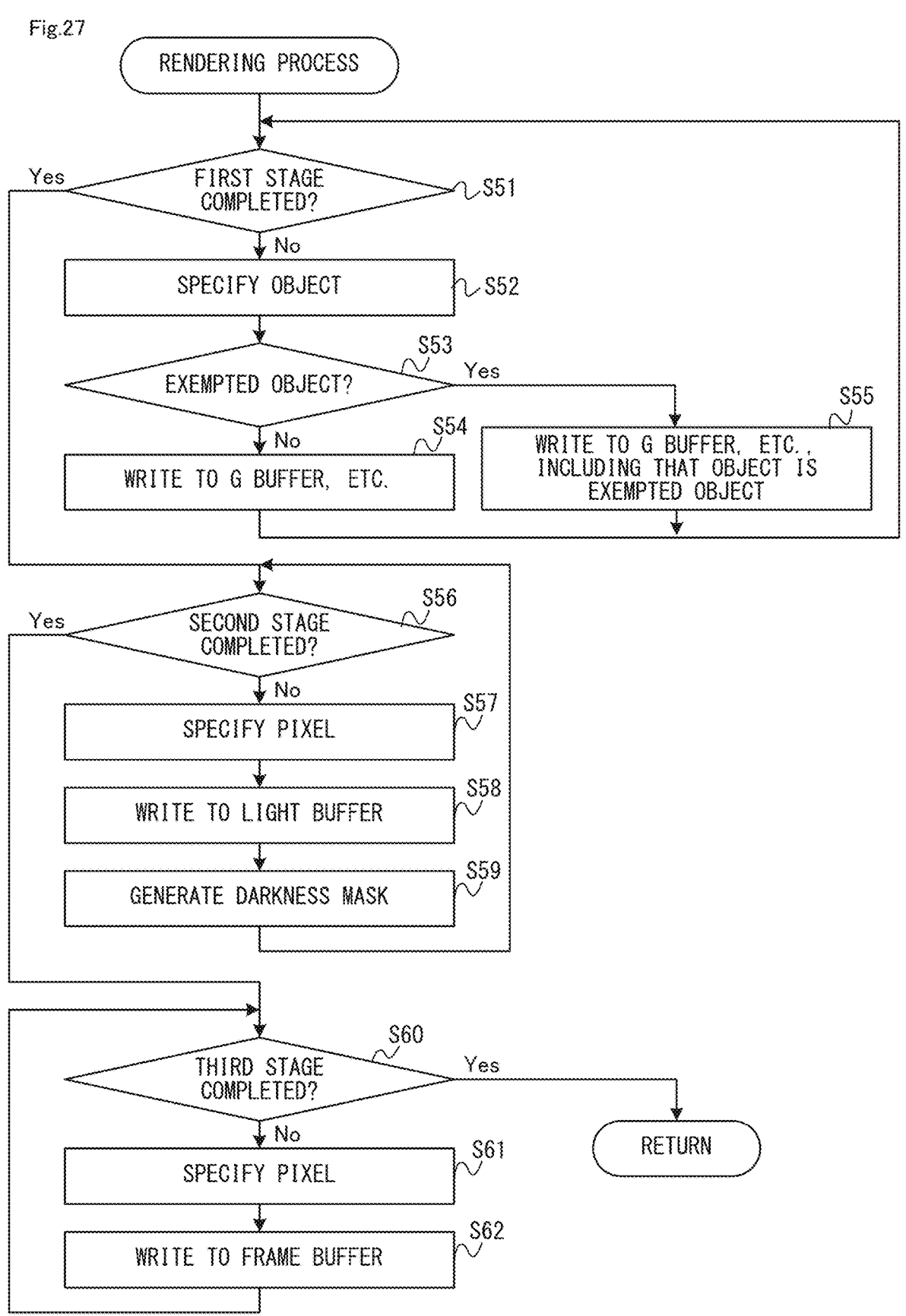
FIG. 27 is a sub-flowchart showing an example of the detailed flow of the rendering process of step S10 shown in FIG. 24.

FIG. 27 is a sub-flowchart showing an example of the detailed flow of the rendering process of step S10 shown in FIG. 24. In the rendering process, first, in step S51, the processor 81 determines whether the process in the first stage described in "[2-3 Image generation process]" above has been completed. That is, it is determined whether writing to the G buffer has been completed for the objects to be rendered (e.g., objects within the field of view of a virtual camera). If the determination result from step S51 is affirmative, the process of step S56 to be described below is executed. On the other hand, if the determination result from step SM is negative, the process of step S52 is executed.

In step S52, the processor 81 specifies one object to be the target of the process of step S53 to be described below, from among the objects to be rendered. Note that in step S52, an object that has not been the target of the process in the current iteration of the process loop of steps SM to S55 is specified. The process of step S53 is executed, following step S52.

In step S53, the processor 81 determines whether the object specified in step S52 is an exempted object described above. If the determination result from step S53 is negative, the process of step S54 is executed. On the other hand, if the determination result from step S53 is affirmative, the process of step S55 is executed.

In step S54, the processor 81 writes, to the G buffer and the depth buffer, information related to the object specified in step S52. That is, the processor 81 writes information about pixels corresponding to the polygon of the object, such as the position, the normal and the color of the polygon, to the G buffer, and depth information to the depth buffer. Note that the process of step SM may be similar to the conventional process in deferred rendering. The process of step S51 is executed again, following step SM.

On the other hand, in step S5, the processor 81 writes information related to the object specified in step S52 to the G buffer and the depth buffer, and information indicating that the object is an exempted object to the G buffer. That is, the processor 81 writes data of the exempt mask related to the exempted object to the G buffer. The process of step S51 is executed again, following step S55.

In step S56, the processor 81 determines whether the process in the second stage described in "[2-3 Image generation process]" above has been completed. That is, it is determined whether the operation of writing values to pixels in the light buffer and the darkness mask has been completed. If the determination result from step S56 is affirmative, the process of step S60 to be described below is executed. On the other hand, if the determination result from step S56 is negative, the process of step S57 is executed.

In step S57, the processor 81 specifies one pixel to be the target of the process of step S58 to be described below, from among pixels. Note that in step S57, a pixel that has not been the target of the process in the current iteration of the process loop of steps S56 to S59 is specified. The process of step S58 is executed, following step S57.

In step S58, the processor 81 writes the pixel specified in step S57 to the light buffer. That is, the processor 81 calculates the brightness information, etc., at the pixel based on the ambient light and the point light source set in step S45, and writes the calculated information to the light buffer. Note that the process in step S58 may be similar to the conventional process in deferred rendering. The process of step S59 is executed, following step S58.

In step S59, the processor 81 generates the darkness mask (i.e., sets the darkness mask value) for the pixel specified in step S57. Specifically, the processor 81 calculates the darkness mask value at the pixel according to the method described in "[2-3. Image generation process]" above. Specifically, data of the darkness mask is stored in the memory at the start of the game process, and the processor 81 updates the data in response to an irradiated range being newly set. For example, if an irradiated range based on a liberation event has been set by the process in step S28, the processor 81 updates the darkness mask based on the two-dimensional range data. When the player character is equipped with an illuminating garment by the menu display mode in which the menu display process of step S7 is executed, the darkness mask is updated so that pixels corresponding to positions within the character affected range based on the position of the player character form the irradiated range. Furthermore, if a point light source is set by the process in step S45, the darkness mask is updated so that pixels corresponding to positions within the item affected range based on the position of the light source item form the irradiated range. The process of step S56 is executed again, following step S59.

In step S60, the processor 81 determines whether the process in the third stage described in "[2-3 Image generation process]" above has been completed. That is, it is determined whether the operation of writing values to pixels in the frame buffer has been completed. If the determination result from step S60 is affirmative, the processor 81 ends the rendering process shown in FIG. 27. On the other hand, if the determination result from step S60 is negative, the process of step S61 is executed.

In step S61, the processor 81 specifies one pixel to be the target of the process of step S62 to be described below, from among pixels. Note that in step S61, a pixel that has not been the target of the process in the current iteration of the process loop of steps S60 to S62 is specified. The process of step S62 is executed, following step S61.

In step S62, the processor 81 calculates the pixel value for the pixel specified in step S61 and writes the calculated pixel value to the frame buffer. That is, the processor 81 calculates the pixel value at the pixel according to the method described "[2-3. Image generation process]" above based on the information written in the buffers (i.e., the G buffer, the depth buffer and the light buffer) and the darkness mask. Specifically, the processor 81 calculates the pixel value reflecting the influence of light from light sources based on information in the G buffer, the depth buffer and the light buffer, and calculates the pixel value reflecting darkness based on the calculated pixel value and the darkness mask value of the darkness mask. Thus, pixel values reflecting the influence of light from light sources and darkness are written to the frame buffer. The process of step S60 is executed again, following step S62.

Figure 28:
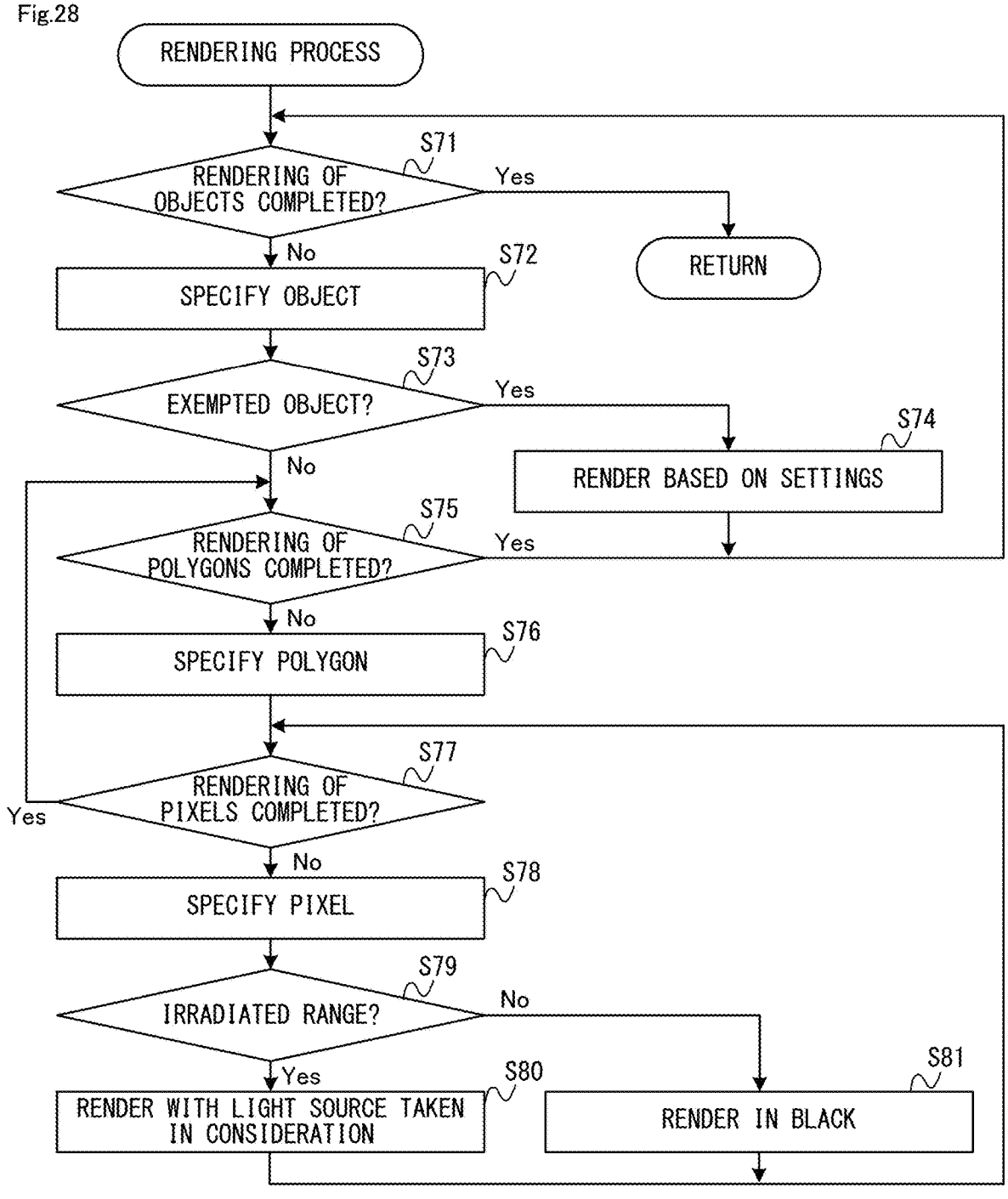
FIG. 28 is a sub-flowchart showing an example of the detailed flow of the rendering process according to another embodiment.

Note that as described above, the rendering process of step S10 may be executed by a method based on forward rendering. FIG. 28 is a sub-flowchart showing an example of the detailed flow of the rendering process executed by a method based on forward rendering. The game system 1 may execute the process shown in FIG. 28 instead of the process shown in FIG. 27 as the rendering process of step S10.

In the rendering process shown in FIG. 28, first, in step S71, the processor 81 determines whether rendering has been completed for objects to be rendered (e.g., objects within the field of view of the virtual camera). If the determination result from step S71 is affirmative, the processor 81 ends the rendering process shown in FIG. 28. On the other hand, if the determination result from step S71 is negative, the process of step S72 is executed.

In step S72, the processor 81 specifies one object from among objects to be rendered, which is the object to be the target of the process of subsequent steps S73 to S81. Note that in step S72, an object that has not been the target of the process in the current iteration of the process loop of steps S71 to S81 is specified. The process of step S73 is executed, following step S72.

In step S73, the processor 81 determines whether the object specified in step S72 is an exempted object described above. If the determination result from step S73 is affirmative, the process of step S74 is executed. On the other hand, if the determination result from step S73 is negative, the process of step S75 is executed.

In step S74, the processor 81 renders the object specified in step S52 (i.e., pixels corresponding to the object) based on the rendering settings pre-set for the object. By doing so, if the object is a self-luminous object, the object is rendered so that the object itself appears to glow, or if the object is a character of the predetermined type, the object is rendered so that it appears to be shaded. The process of step S71 is executed again, following step S74.

In step S75, the processor 81 determines whether rendering has been completed for polygons of the object specified in step S72. If the determination result from step S75 is affirmative, it means that rendering has been completed for the object, and the process of step S71 is executed again. On the other hand, if the determination result from step S75 is negative, the process of step S76 is executed.

In step S76, the processor 81 specifies one of the polygons of the object specified in step S72. Note that in step S76, a polygon that has not been the target of the process in the current iteration of the process loop of steps S75 to S81 is specified. The process of step S77 is executed, following step S76.

In step S77, the processor 81 determines whether rendering has been completed for pixels corresponding to the polygon specified in step S76. If the determination result from step S77 is affirmative, it means that rendering has been completed for the polygon, and the process of step S75 is executed again. On the other hand, if the determination result from step S77 is negative, the process of step S78 is executed.

In step S78, the processor 81 specifies one of the pixels corresponding to the polygon specified in step S76. Note that in step S78, a pixel that has not been the target of the process in the current iteration of the process loop of steps S77 to S81 is specified. The process of step S79 is executed, following step S78.

In step S79, the processor 81 determines whether the position (i.e., the position in the field) corresponding to the pixel specified in step S78 is within the irradiated range. Note that in the embodiment in which rendering is performed by the rendering process shown in FIG. 28, the processor 81 sets an irradiated range based on a liberation event in step S28, wherein the processor 81 sets an irradiated range based on the position of the player character when the player character is equipped with an illuminating garment in the menu display process of step S7, and sets an irradiated range based on the position of a light source item when a point light source is set in the process of step S45. If the determination result from step S79 is affirmative, the process of step S80 is executed. On the other hand, if the determination result from step S79 is negative, the process of step S81 is executed.

In step S80, the processor 81 renders the pixel specified in step S78 while reflecting light sources set in the field (i.e., ambient light and/or point light sources). Specifically, the processor 81 calculates the pixel value of the pixel, and writes the pixel value to the frame buffer, based on information such as information of the normal of the polygon corresponding to the pixel, information of the color set for the polygon corresponding to the pixel, and information of light sources set in the field. As a result, pixels corresponding to positions within the irradiated range are rendered while taking into consideration light sources. Note that the process in step S80 may be similar to the conventional rendering process based on forward rendering. The process of step S77 is executed again, following step S80.

On the other hand, in step S81, the processor 81 renders the pixel specified in step S78 in black. Thus, pixels corresponding to positions outside the irradiated range are rendered in black. The process of step S77 is executed again, following step S81.

Note that in the rendering process shown in FIG. 28, as in the rendering process shown in FIG. 27, rendering may be performed so that the black color gradually becomes darker toward the boundary of the irradiated range within the irradiated range. For example, in step S80, the processor 81 may calculate the darkness mask value for the pixel specified in step S78, and calculate the pixel value of the pixel by combining the pixel value reflecting the influence of light by light sources and the black color at a proportion in accordance with the darkness mask value.

[4. Functions and Effects of Present Embodiment and Variations]

The game program in the embodiment described above is configured to cause a computer (e.g., the processor 81) of an information processing device (e.g., the game apparatus 2) to execute the following processes:

a game process of controlling a player character in a virtual space (the field in the embodiment described above) based on an operation input (step S32);

a process of, when a predetermined event (e.g., a liberation event) occurs based on the game process, transitioning from a first state (e.g., an unliberated state) to a second state (e.g., a liberated state) a location that is associated with the event having occurred, from among a plurality of locations (e.g., reference locations) that are set in the virtual space (step S25);

a process of identifying an area (a liberated area in the embodiment described above) where a total decision value is equal to or greater than a predetermined value, wherein the total decision value is obtained by summing together first decision values for different positions based on one of more locations that are in the second state from among a plurality of locations, and wherein the first decision value is equal to a first reference value at a position corresponding to the location and that attenuates in accordance with a distance from the position (step S27); and a process of, in response to a map display instruction given by an operation input, displaying a map image showing field information of the virtual space, wherein field information of a portion corresponding to the area is shown (step S5).

According to the configuration described above, the range of the map image to be liberated (i.e., the range of the liberated area) can be changed in accordance with the presence/absence of the occurrence of a plurality of events. Since the total decision value at each position in the virtual space varies depending on which of the plurality of locations is in the second state, the liberated area can be changed in accordance with the state at each location (i.e., in accordance with the state of occurrence of an event at each location).

Note that the process of identifying the liberated area is executed at the timing when the event occurs in the embodiment described above (see step S27 in FIG. 25), but there is no limitation on the timing for executing the process. In other embodiments, the process of identifying the liberated area may be executed each time a map image is generated, or it may be executed at the timing when the map image is next generated after the event occurs.

In the embodiment described above, the predetermined event is an event that occurs when a predetermined operation input is performed when the player character is located at an event occurring position set in the virtual space corresponding to the location, and it is specifically a liberation event. Here, "an event that occurs when a predetermined operation input is performed when the player character is located at an event occurring position" is not limited to a liberation event, but may be any other event. For example, the predetermined event may be an event in which the player character arrives at an event occurring position in the virtual space (in this example, an operation input to move the player character to the event occurring position corresponds to the predetermined operation), or may be an event in which the player character uses a particular item at the event occurring position in the virtual space (in this example, an operation input to use an item corresponds to the predetermined operation). In other embodiments, the predetermined event is not limited to an event that occurs when a predetermined operation input is performed when the player character is located at the event occurring position, but may be an event of other types (e.g., an event that does not require a predetermined operation input).

The game program in the embodiment described above can be said to be configured to cause a computer (e.g., the processor 81) of an information processing device (e.g., the game apparatus 2) to execute the following processes:

a process of setting a target range (e.g., an irradiated range) in a virtual space when a predetermined event (e.g., an irradiation event) occurs based on the game process (step S28, step S59); and a process of, in a rendering process of rendering the virtual space, rendering a portion of at least some terrain objects in the virtual space included in the target range while reflecting a light source set in the virtual space, and rendering a portion thereof not included in the target range in a predetermined color (step S62).

According to the configuration described above, areas in the virtual space with low visibility and areas with ensured visibility can be changed dynamically in response to the occurrence of an event. Thus, it is possible to provide a game in which it is possible to increase the visible portion of the field by the occurrence of events. According to the configuration described above, the portion of the target range can be rendered while reflecting the light source to make it easier to see, whereas the portion outside the target range can be made invisible or hardly visible by rendering it in a predetermined color. Thus, according to the configuration described above, it is easy to adjust the visibility of areas in the game field.

The process of setting the target range may be a process of setting a range in a three-dimensional virtual space (e.g., a process of setting the character affected range and item affected range in the virtual space described above), or a process of setting a range in a two-dimensional plane corresponding to the virtual space (e.g., a process of generating two-dimensional range data in the field corresponding plane described above). Although the target range, as a concept, refers to a range in the virtual space, data representing the target range is not limited to data related to the position in the virtual space, but may be data related to the position on the two-dimensional plane corresponding to the virtual space (e.g., the two-dimensional range data) or data related to the position on the pixel plane corresponding to the virtual space (e.g., data of the darkness mask).

The phrase "at least some terrain objects" is intended to mean that it is not necessary to vary the rendering method for all terrain objects depending on the target range. For example, some terrain objects may be set as exempted objects described above.

Although the game system 1 renders objects of a portion that is not included in the target range in black in the embodiment described above, the game system 1 may render them in other colors. Similar effects to those of the embodiment described above can be obtained because the portion can be made invisible or hardly visible even when it is rendered in another color. For example, for an area that is to be made invisible or hardly visible because of fog due to story settings of the game, such an area may be rendered in white or gray. The "predetermined color" described above is a color that is set independently of the color set for the object corresponding to the pixel to be rendered, and it does not need to be a single color. A plurality of pixels corresponding to the portion not included in the target range may be rendered so that a pattern is formed by predetermined multiple colors. In other embodiments, the game system 1 may employ a configuration in which objects in the portion not included in the target range are rendered with reduced brightness. For example, the game system 1 may render objects in the portion with a brightness that is decreased from that for those pixels in the case where a light source is set. Specifically, for pixels corresponding to objects in the portion not included in the target range, the game system 1 may write, in the rendering process, pixel values whose brightness is decreased from that for pixel values that reflect the influence of light from the light source. There is no limitation on the specific method for decreasing the brightness, and the original brightness (i.e., the brightness obtained while taking into consideration the influence of light from the light source) may be decreased by a predetermined proportion, the original brightness may be decreased by a predetermined amount, or the brightness may be decreased to be less than or equal to a predetermined reference. Also with the configuration described above, similar effects to those of the embodiment described above can be obtained.

It can be said that the game program in the embodiment described above is configured to cause a computer (e.g., the processor 81) of an information processing device (e.g., the game apparatus 2) to execute the following processes:

a game process of controlling a player character in a virtual space based on an operation input (step S32);

a process of, when a predetermined event (e.g., a liberation event) occurs based on the game process, transitioning from a first state (e.g., an unliberated state) to a second state (e.g., a liberated state) a location that is associated with the event having occurred from among a plurality of locations (e.g., reference locations) set in the virtual space (step S25);
    a process of identifying an area (a liberated area in the embodiment described above) at least including a location that is in the second state from among a plurality of locations (step S27);
    a rendering process of rendering a portion of at least some terrain objects in the virtual space not included in a target range (e.g., an irradiated range) that includes at least a part of the area in a predetermined color (step S62); and
    a process of, in response to a map display instruction given by an operation input, displaying a map image showing field information of the virtual space, wherein field information of a portion corresponding to a liberated area is shown (step S5).

According to the configuration described above, the range in which visibility is ensured in the virtual space (i.e., the target range) can be changed in response to a change in the area where field information is not shown in the map image. That is, it is possible to display the virtual space in such a display manner that visibility is ensured for a liberated area where field information has newly started to be displayed in the map image. According to the configuration described above, the range in which visibility is ensured in the virtual space expands and the area in which field information is shown in the map image expands in response to the occurrence of events, and it is possible to provide a game that sufficiently achieves the gameplay of expanding the search range by the occurrence of events.

Note that in other embodiments, in the rendering process in the configuration described above, the game system 1 may render the portion not included in the target range to be darker than the portion included in the target range, instead of rendering the portion not included in the target range in a predetermined color. Specifically, in the rendering process, the game system 1 may write, to the frame buffer, pixel values whose brightness is decreased by a predetermined method with respect to the pixel values that reflect the influence of light from the light source. The predetermined method may be, for example, to decrease the original brightness by a predetermined proportion (or by a predetermined value), or to change the brightness so that it becomes less than or equal to a predetermined reference.

In the embodiment described above, as the target range, the game system 1 sets a range (a) that consists of positions at which a total decision value obtained by summing together at least one decision values based on one or more locations that are in the second state, from among a plurality of locations, and (b) such that the two-dimensional distance from the two-dimensional position corresponding to the location is less than or equal to a threshold value (i.e., within a range of a liberated area and within a location affected range). According to this, the range in which visibility is ensured in the virtual space can be prevented from becoming too large, thereby reducing the possibility of losing the gameplay of expanding the search range by the occurrence of events.

Note that in the embodiment described above, where a process is executed using data (which is meant to include programs) on an information processing device, a part of data necessary for the process may be transmitted from another information processing device that is different from the information processing device. In this case, the first information processing device may execute the process using data received from the second information processing device and data stored in the first information processing device.

Note that in other embodiments, the information processing system does not need to include some of the components of the embodiment described above and does not need to execute some of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the information processing system does not need to include other components and does not need to execute other processes.

The embodiment described above can be used as, for example, a game system or a game program, with the aim of dynamically changing an area of low visibility and an area of ensured visibility in the virtual space in response to occurrence of events, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable storage media having stored therein instructions that, when executed, cause one or more processors to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and render a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the rendering process is based on deferred rendering; and wherein the information processing comprises, in the rendering process:

in a first stage, writing to a G buffer and a depth buffer for at least some terrain objects in the virtual space;

in a second stage, for each pixel, generating the mask data based on a position corresponding to the pixel, a depth value stored in the depth buffer and the target range; and in a third stage, rendering to the frame buffer based at least on data stored in the G buffer and the mask data.

2. The one or more non-transitory computer-readable storage media according to claim 1, wherein in the rendering process, the information processing comprises:

in the first stage, for a predetermined object, writing to the G buffer and the depth buffer for each pixel, and generating exempt mask data indicating that pixels corresponding to the object are exempted from application of the mask data; and in the third stage, rendering pixels indicated by the exempt mask data by such a method that it is possible to visually distinguish between a portion of the at least some terrain objects not included in the target range and the predetermined object.

3. The one or more non-transitory computer-readable storage media according to claim 1, wherein at least a light source that is set with a predetermined brightness irrespective of the position in the virtual space is set as the light source in the virtual space.

4. The one or more non-transitory computer-readable storage media according to claim 3, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

5. One or more non-transitory computer-readable storage media having stored therein instructions that, when executed, cause one or more processors to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and render a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the mask data is data that indicates, for each pixel, a degree to which the predetermined color is rendered or a degree to which the brightness is reduced; and wherein the information processing comprises, in the rendering process, writing a pixel value to the frame buffer, wherein the pixel value is obtained by combining the predetermined color with a pixel value calculated while reflecting the light source in accordance with the degree or by reducing the brightness from the pixel value calculated while reflecting the light source in accordance with the degree.

6. The one or more non-transitory computer-readable storage media according to claim 5, wherein at least a light source that is set with a predetermined brightness irrespective of the position in the virtual space is set as the light source in the virtual space.

7. The one or more non-transitory computer-readable storage media according to claim 5, wherein the information processing comprises, in the rendering process:
    determining, for each pixel, whether the at least some terrain objects are included in the target range;
    rendering pixels included in the target range to a frame buffer while reflecting the light source; and
    rendering pixels not included in the target range to the frame buffer in the predetermined color or with reduced brightness.

8. One or more non-transitory computer-readable storage media having stored therein instructions that, when executed, cause one or more processors to execute information processing comprising:
    setting a target range in a virtual space when a predetermined event occurs based on a game process;
    in a rendering process of rendering the virtual space, rendering a portion of at least some terrain objects in the virtual space included in the target range while reflecting a light source set in the virtual space, and render a portion thereof not included in the target range in a predetermined color or with reduced brightness;
    in response to occurrence of the predetermined event, setting a point to be reference of the target range in the virtual space; and
    based on a distance from the point to be reference, setting the target range so as to include a range where the distance is less than or equal to a threshold value.

9. The one or more non-transitory computer-readable storage media according to claim 8, wherein the information processing comprises after the point to be reference is set in response to occurrence of the predetermined event, expanding the target range by increasing the threshold value over time.

10. The one or more non-transitory computer-readable storage media according to claim 8, wherein the information processing comprises further setting a point light source in the virtual space in response to occurrence of the predetermined event.

11. The one or more non-transitory computer-readable storage media according to claim 8, wherein:
    the event is an event of arranging a predetermined item in the virtual space; and
    the information processing comprises setting a position of the point to be reference based on a position at which the predetermined item is arranged.

12. The one or more non-transitory computer-readable storage media according to claim 8, wherein:
    the information processing further comprises controlling a player character in the virtual space based on an operation input;
    the predetermined event is an event in which a vicinity of the player character becomes the target range based on an operation input; and
    the information processing further comprises setting a position of the player character as a position of the point to be reference.

13. The one or more non-transitory computer-readable storage media according to claim 8, wherein at least a light source that is set with a predetermined brightness irrespective of the position in the virtual space is set as the light source in the virtual space.

14. The one or more non-transitory computer-readable storage media according to claim 8, wherein the information processing comprises, in the rendering process:
    determining, for each pixel, whether the at least some terrain objects are included in the target range;
    rendering pixels included in the target range to a frame buffer while reflecting the light source; and
    rendering pixels not included in the target range to the frame buffer in the predetermined color or with reduced brightness.

15. One or more non-transitory computer-readable storage media having stored therein instructions that, when executed, cause one or more processors to execute information processing comprising:
    setting a target range in a virtual space when a predetermined event occurs based on a game process; and
    in a rendering process of rendering the virtual space, rendering a portion of at least some terrain objects in the virtual space included in the target range while reflecting a light source set in the virtual space, and render a portion thereof not included in the target range in a predetermined color or with reduced brightness;
    wherein the information processing comprises, in the rendering process:
        for the at least some terrain objects, generating mask data that at least represents, for each pixel, whether a position corresponding to the pixel of the terrain objects is included in the target range;
        rendering to a frame buffer while reflecting the light source for a pixel indicating, in the mask data, that the position of the at least some terrain objects is included in the target range; and
        rendering to the frame buffer in the predetermined color or with reduced brightness for a pixel indicating, in the mask data, that the position of the at least some terrain objects is not included in the target range;
    wherein the information processing further comprises controlling a player character in the virtual space based on an operation input;
    wherein the event occurs in response to a predetermined operation input performed when the player character is located at an event occurring position set in the virtual space; and
    wherein the information processing comprises:
        in response to occurrence of the event, updating two-dimensional range data that represents the target range in the virtual space in a plan view so that at least a range of the virtual space that corresponds to the event occurring position becomes the target range; and
        generating the mask data based further on the two-dimensional range data.

16. The one or more non-transitory computer-readable storage media according to claim 15, wherein at least a light source that is set with a predetermined brightness irrespective of the position in the virtual space is set as the light source in the virtual space.

17. The one or more non-transitory computer-readable storage media according to claim 15, wherein the information processing comprises, in the rendering process:
    determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

18. An information processing system comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the rendering process is based on deferred rendering; and wherein the information processing comprises, in the rendering process:

in a first stage, writing to a G buffer and a depth buffer for at least some terrain objects in the virtual space;

in a second stage, for each pixel, generating the mask data based on a position corresponding to the pixel, a depth value stored in the depth buffer and the target range; and in a third stage, rendering to the frame buffer based at least on data stored in the G buffer and the mask data.

19. The information processing system according to claim 18, wherein the information processing comprises, in the rendering process:

in the first stage, for a predetermined object, writing to the G buffer and the depth buffer for each pixel, and generating exempt mask data indicating that pixels corresponding to the object are exempted from application of the mask data; and in the third stage, rendering pixels indicated by the exempt mask data by such a method that it is possible to visually distinguish between a portion of the at least some terrain objects not included in the target range and the predetermined object.

20. The information processing system according to claim 18, wherein at least a light source that is set with a predetermined brightness irrespective of the position in the virtual space is set as the light source in the virtual space.

21. The information processing system according to claim 18, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

22. An information processing system comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the mask data is data that indicates, for each pixel, a degree to which the predetermined color is rendered or a degree to which the brightness is reduced; and wherein the information processing comprises, in the rendering process, writing a pixel value to the frame buffer, wherein the pixel value is obtained by combining the predetermined color with a pixel value calculated while reflecting the light source in accordance with the degree or by reducing the brightness from the pixel value calculated while reflecting the light source in accordance with the degree.

23. The information processing system according to claim 22, wherein at least a light source that is set with a predetermined brightness irrespective of the position in the virtual space is set as the light source in the virtual space.

24. The information processing system according to claim 22, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

25. An information processing system comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

in response to occurrence of the predetermined event, setting a point to be reference of the target range in the virtual space; and based on a distance from the point to be reference, setting the target range so as to include a range where the distance is less than or equal to a threshold value.

26. The information processing system according to claim 25, wherein the information processing comprises after the point to be reference is set in response to occurrence of the predetermined event, expanding the target range by increasing the threshold value over time.

27. The information processing system according to claim 25, wherein the information processing comprises further setting a point light source in the virtual space in response to occurrence of the predetermined event.

28. The information processing system according to claim 25, wherein:

the event is an event of arranging a predetermined item in the virtual space; and the information processing comprises setting a position of the point to be reference based on a position at which the predetermined item is arranged.

29. The information processing system according to claim 25, wherein:

the information processing further comprises controlling a player character in the virtual space based on an operation input;

the predetermined event is an event in which a vicinity of the player character becomes the target range based on an operation input; and the information processing further comprises setting a position of the player character as a position of the point to be reference.

30. The information processing system according to claim 25, wherein at least a light source that is set with a predetermined brightness irrespective of the position in the virtual space is set as the light source in the virtual space.

31. The information processing system according to claim 25, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

32. An information processing system comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the information processing further comprises controlling a player character in the virtual space based on an operation input;

wherein the event occurs in response to a predetermined operation input performed when the player character is located at an event occurring position set in the virtual space; and wherein the information processing comprises:

in response to occurrence of the event, updating two-dimensional range data that represents the target range in the virtual space in a plan view so that at least a range of the virtual space that corresponds to the event occurring position becomes the target range; and generating the mask data based further on the two-dimensional range data.

33. The information processing system according to claim 32, wherein at least a light source that is set with a predetermined brightness irrespective of the position in the virtual space is set as the light source in the virtual space.

34. The information processing system according to claim 32, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

35. An information processing device comprising:

one or more processors; and one or more memories having stored therein computer-executable instructions to execute information processing comprising:

setting a target range in a virtual space when a predetermined event occurs based on a game process;

in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the rendering process is based on deferred rendering; and wherein the information processing comprises, in the rendering process:

in a first stage, writing to a G buffer and a depth buffer for at least some terrain objects in the virtual space;

in a second stage, for each pixel, generating the mask data based on a position corresponding to the pixel, a depth value stored in the depth buffer and the target range; and in a third stage, rendering to the frame buffer based at least on data stored in the G buffer and the mask data.

36. The information processing device according to claim 35, wherein the information processing comprises, in the rendering process:

in the first stage, for a predetermined object, writing to the G buffer and the depth buffer for each pixel, and generating exempt mask data indicating that pixels corresponding to the object are exempted from application of the mask data; and in the third stage, rendering pixels indicated by the exempt mask data by such a method that it is possible to visually distinguish between a portion of the at least some terrain objects not included in the target range and the predetermined object.

37. The information processing device according to claim 35, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

38. A computer-implemented method comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the computer-implemented method comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the rendering process is based on deferred rendering; and wherein the computer-implemented method comprises, in the rendering process:

in a first stage, writing to a G buffer and a depth buffer for at least some terrain objects in the virtual space;

in a second stage, for each pixel, generating the mask data based on a position corresponding to the pixel, a depth value stored in the depth buffer and the target range; and in a third stage, rendering to the frame buffer based at least on data stored in the G buffer and the mask data.

39. The computer-implemented method according to claim 38, comprising:

in the first stage, for a predetermined object, writing to the G buffer and the depth buffer for each pixel, and generating exempt mask data indicating that pixels corresponding to the object are exempted from application of the mask data; and in the third stage, rendering pixels indicated by the exempt mask data by such a method that it is possible to visually distinguish between a portion of the at least some terrain objects not included in the target range and the predetermined object.

40. The computer-implemented method according to claim 38, comprising, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

41. An information processing device comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and render a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the mask data is data that indicates, for each pixel, a degree to which the predetermined color is rendered or a degree to which the brightness is reduced; and wherein the information processing comprises, in the rendering process, writing a pixel value to the frame buffer, wherein the pixel value is obtained by combining the predetermined color with a pixel value calculated while reflecting the light source in accordance with the degree or by reducing the brightness from the pixel value calculated while reflecting the light source in accordance with the degree.

42. The information processing device according to claim 41, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

43. An information processing device comprising:

one or more processors; and one or more memories having stored therein computer-executable instructions to execute information processing comprising:

setting a target range in a virtual space when a predetermined event occurs based on a game process;

in a rendering process of rendering the virtual space, rendering a portion of at least some terrain objects in the virtual space included in the target range while reflecting a light source set in the virtual space, and render a portion thereof not included in the target range in a predetermined color or with reduced brightness;

in response to occurrence of the predetermined event, setting a point to be reference of the target range in the virtual space; and based on a distance from the point to be reference, setting the target range so as to include a range where the distance is less than or equal to a threshold value.

44. The information processing device according to claim 43, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

45. An information processing device comprising:

one or more processors; and one or more memories having stored therein computer-executable instructions to execute information processing comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and render a portion thereof not included in the target range in a predetermined color or with reduced brightness;

wherein the information processing comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the information processing further comprises controlling a player character in the virtual space based on an operation input;

wherein the event occurs in response to a predetermined operation input performed when the player character is located at an event occurring position set in the virtual space; and wherein the information processing comprises:

in response to occurrence of the event, updating two-dimensional range data that represents the target range in the virtual space in a plan view so that at least a range of the virtual space that corresponds to the event occurring position becomes the target range; and generating the mask data based further on the two-dimensional range data.

46. The information processing device according to claim 45, wherein the information processing comprises, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

47. A computer-implemented method comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the computer-implemented method comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the mask data is data that indicates, for each pixel, a degree to which the predetermined color is rendered or a degree to which the brightness is reduced; and wherein the wherein the computer-implemented method comprises, in the rendering process, writing a pixel value to the frame buffer, wherein the pixel value is obtained by combining the predetermined color with a pixel value calculated while reflecting the light source in accordance with the degree or by reducing the brightness from the pixel value calculated while reflecting the light source in accordance with the degree.

48. The computer-implemented method according to claim 47, comprising, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

49. A computer-implemented method comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

in response to occurrence of the predetermined event, setting a point to be reference of the target range in the virtual space; and based on a distance from the point to be reference, setting the target range so as to include a range where the distance is less than or equal to a threshold value.

50. The computer-implemented method according to claim 49, comprising, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

51. A computer-implemented method comprising:

setting a target range in a virtual space when a predetermined event occurs based on a game process; and in a rendering process of rendering the virtual space, rendering a portion of at least some terrain objects in the virtual space included in the target range while reflecting a light source set in the virtual space, and rendering a portion thereof not included in the target range in a predetermined color or with reduced brightness;

wherein the computer-implemented method comprises, in the rendering process:

for the at least some terrain objects, generating mask data that at least represents, for each pixel, whether a position corresponding to the pixel of the terrain objects is included in the target range;

rendering to a frame buffer while reflecting the light source for a pixel indicating, in the mask data, that the position of the at least some terrain objects is included in the target range; and rendering to the frame buffer in the predetermined color or with reduced brightness for a pixel indicating, in the mask data, that the position of the at least some terrain objects is not included in the target range;

wherein the wherein the computer-implemented method further comprises controlling a player character in the virtual space based on an operation input;

wherein the event occurs in response to a predetermined operation input performed when the player character is located at an event occurring position set in the virtual space; and wherein the computer-implemented method comprises:

in response to occurrence of the event, updating two-dimensional range data that represents the target range in the virtual space in a plan view so that at least a range of the virtual space that corresponds to the event occurring position becomes the target range; and generating the mask data based further on the two-dimensional range data.

52. The computer-implemented method according to claim 51, comprising, in the rendering process:

determining, for each pixel, whether the at least some terrain objects are included in the target range;

rendering pixels included in the target range to a frame buffer while reflecting the light source; and rendering pixels not included in the target range to the frame buffer in the predetermined color or with reduced brightness.

* * * * *